United States Patent [19]

Sandstrom et al.

[11] Patent Number: 5,619,571
[45] Date of Patent: Apr. 8, 1997

[54] METHOD FOR SECURELY STORING ELECTRONIC RECORDS

[76] Inventors: Brent B. Sandstrom, 942 Copperkey Ct.; Ernest R. Ewert, 261 W. Verano Pl., both of Gilbert, Ariz. 85233; Robert D. Reisch, 2036 E. Clipper Cir., Gilbert, Ariz. 85234

[21] Appl. No.: 457,835

[22] Filed: Jun. 1, 1995

[51] Int. Cl.⁶ ............................. H04L 9/00; H04K 1/00; G06F 11/00
[52] U.S. Cl. ........................... 380/4; 380/25; 395/188.01; 395/186
[58] Field of Search .................................. 380/4, 23–25; 395/186–188.01, 490, 491

[56] References Cited

U.S. PATENT DOCUMENTS

| | | | |
|---|---|---|---|
| 4,827,508 | 5/1989 | Shear | 380/4 |
| 4,933,969 | 6/1990 | Marshall et al. | 380/25 |
| 5,001,752 | 3/1991 | Fischer | 380/23 |
| 5,022,080 | 6/1991 | Durst et al. | 380/23 |
| 5,050,212 | 9/1991 | Dyson | 380/25 |
| 5,136,647 | 8/1992 | Haber et al. | 380/49 |
| 5,150,407 | 9/1992 | Chan | 380/4 |
| 5,163,091 | 11/1992 | Graziano et al. | 380/25 |
| 5,189,700 | 2/1993 | Blandford | 380/23 |
| 5,347,579 | 9/1994 | Blandford | 380/25 |
| 5,481,672 | 1/1996 | Okuno et al. | 395/188.01 |

*Primary Examiner*—Thomas H. Tarcza
*Assistant Examiner*—Pinchus M. Laufer
*Attorney, Agent, or Firm*—Banner & Witcoff, Ltd.

[57] ABSTRACT

An improved method of storing or retrieving electronic records. An image identification code and time data provided by a trusted source, as well as a password, are combined to generate a key. The image identification code and time data are stored in a public directory associated with the image data stream. Further, attributes of the image stream, such as its size and a hash of at least a segment of the image data, are determined. The attributes are then used to generated a verification code. The verification code is placed in a private area associated with the data image stream, and the private area is encrypted with the previously generated key.

41 Claims, 10 Drawing Sheets

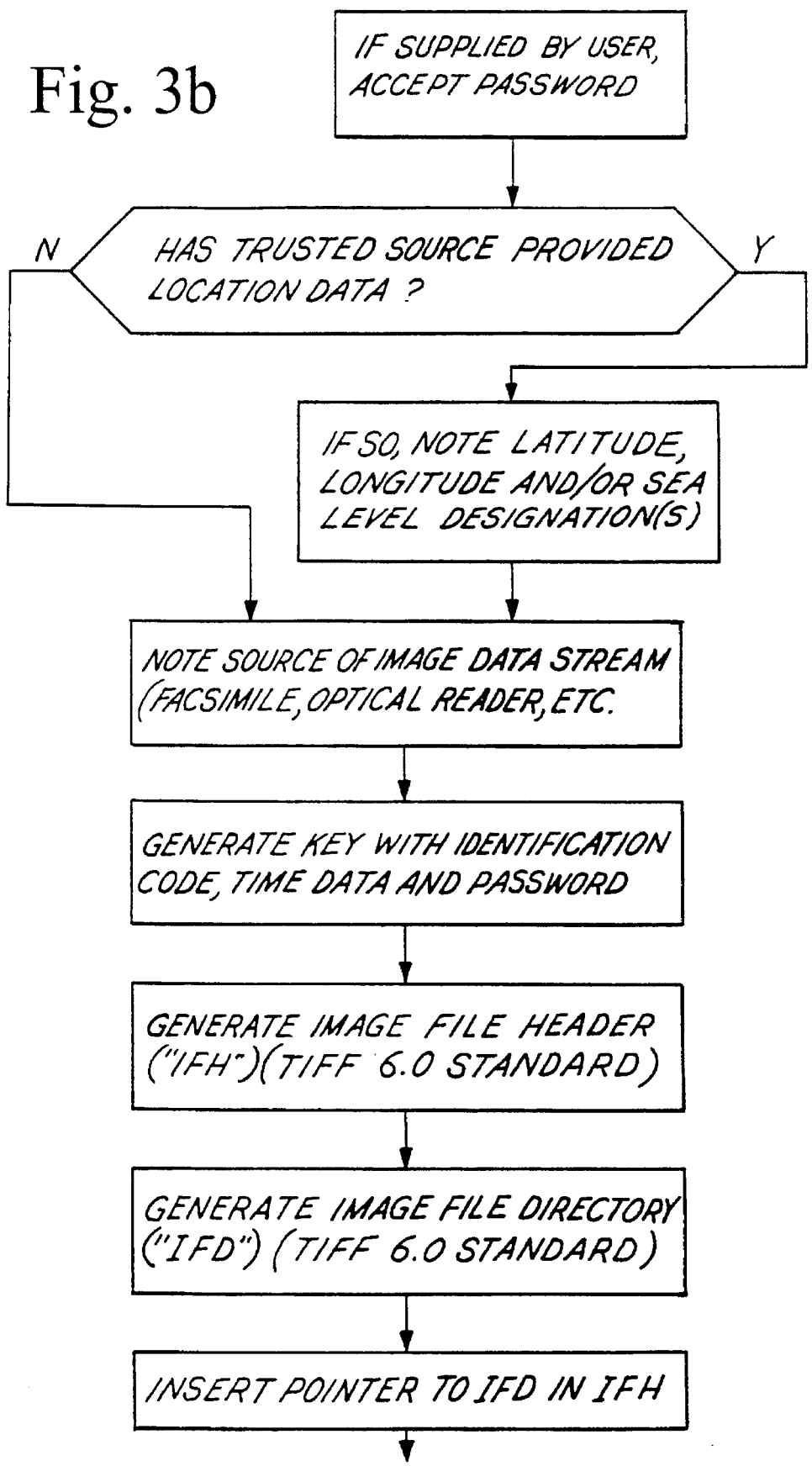

METHOD FOR SECURELY STORING ELECTRONIC RECORDS

COPYRIGHT

A portion of the disclosure of this patent document contains material that is subject to copyright protection. The copyright owner has no objection to the facsimile reproduction by anyone of this patent disclosure, as it appears in the Patent and Trademark Office file or records, but otherwise reserves all copyright rights whatsoever.

BACKGROUND OF THE INVENTION

The present invention relates generally to the storage of electronic files and, more particularly, to a more secure method of capturing, storing, retrieving, and presenting a stream of data. During the course of conducting business, managers are often required to maintain accurate records. To run a business smoothly and comply with regulatory and other legal requirements, business personnel must often be able to establish that a particular record was created or existed at a particular time. Also, they must be able to (1) confirm that the record has not been changed or (2) establish how the record has been changed over time.

For many years in the past, records were maintained, in the normal and ordinary course of business, on paper. Occasionally, a witness would sign and date a particular document to help establish that it existed as of the date of signing. The integrity of such files was generally assumed adequate, since it is often difficult to change paper documents without the paper showing signs of alteration.

Over the last several decades, however, computers and electronic files have become increasing ubiquitous. Business records are increasingly being maintained on electronic media, such as, for example, computer memories, floppy disks, magnetic tapes, and optical compact disks. Often, the dates and other data on such electronic media can be readily altered, without detection, even by operators who are not well-versed in digital technology. Many electronic documents can be copied and modified endlessly without obvious signs of the tampering, since it is often a trivial matter to change the date stamp on a computer file.

Thus, without precautions, stored digital files may often be easily tampered with. Various approaches have been taken to attempt to solve the problems associated with establishing the creation and existence of an electronic record at a particular point in time and confirming that the record has not been altered in the meantime. However, such procedures may prove cumbersome, expensive to implement, or unreliable.

One approach to maintaining electronic record integrity involves creating a "hash" of an electronic record: a check number representing the result performing computations on one or more digital representations of information fields in the document. To the extent someone alters a first digital document, the hash of the altered second document generally is different than the hash of the first document. Thus, after a document has been created, the hash of the document may, for example, be sent to witnesses or published in a newspaper. In this way, for example, the owner of the record may show that, since the hash of a particular record is the same as the hash published five years ago, the record must have been created and maintained in an unaltered state for five years.

Nonetheless, such a method still leaves open the possibility that two individuals may collude to falsely state the value of a hash. Also, with appropriate cryptographic techniques, undetected alterations may still be made. For example, one may alter a document as desired and then make other suppressed changes, such as a carriage return followed by a space-up command, such that the original and altered documents have the same hash value. See, for example, B. Schneier, *Applied Cryptography*, Chapter 3.8, Timestamping Services, pages 61–65 (John Wiley & Sons, Inc. 1994).

SUMMARY OF THE INVENTION

In a principal aspect, the present invention relates to an improved method of storing or retrieving an image data stream or electronic record. An image identification code and time data provided by a trusted source are combined to generate a key. The image identification code and time data are store in a public directory associated with the image data stream. Further, attributes of the image stream are determined and used to generated a verification code. The verification code is placed in a private area associated with the data image stream, and the private area is encrypted with the previously generated key.

In a related aspect of the invention, the key is generated using a user-supplied password as well as the time data and image identification code. The password is not stored in association with the data image stream, and, unless the password is again used, the key to decrypt the private area can not be generated. In another embodiment, at least a segment of the image data stream is encrypted in addition to the private area. In still another embodiment, the stored time data may be used to generate an audit trail of when the image data stream was modified.

Thus, an object of the present invention is an improved method for securely storing electronic records. A further object is a secure storage method for electronic records that is more reliable and easier to implement. Another object is a record storage method that is less prone to allow documents to be modified without detection. Still a further object is a storage method that provides an audit trail of changes that were made to the document since its creation. These other objects, features, and advantages of the present invention are apparent from the following detailed description.

DETAILED DESCRIPTION OF THE PREFERRED EMBODIMENT

Background

Figure 1:
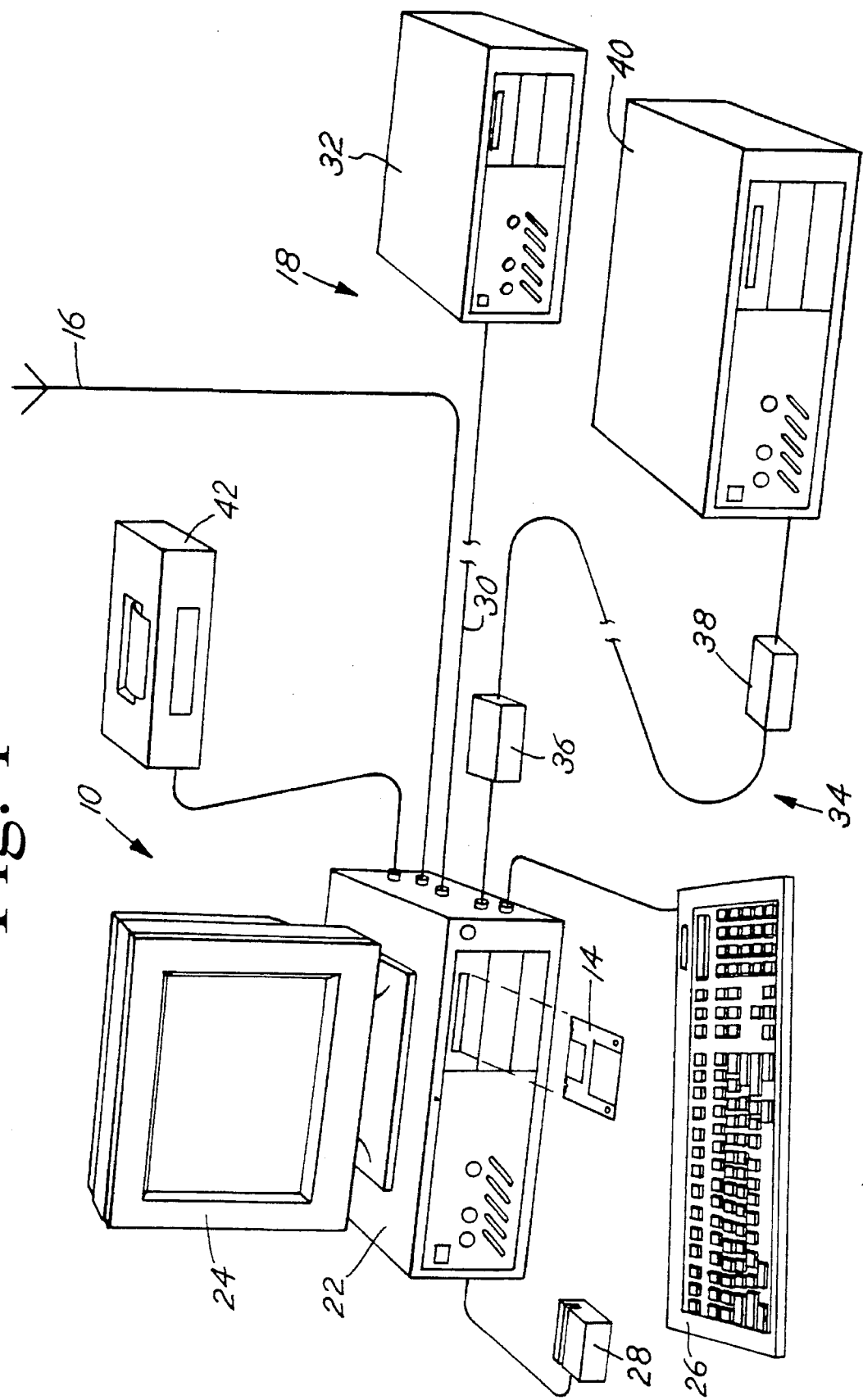
FIG. 1 is an isometric view of a computer system employing a present invention which receives time data from a trusted source.

Referring to FIGS. 1–4, a preferred embodiment of the present invention is shown as an improved method for securely capturing, storing, retrieving, and presenting a stream of data. As shown in FIG. 1, the method may be used with an electronic computer 10. The computer may be used to store an image data stream on a medium 14. The medium must be understood to encompass a wide variety of digital media, such as, for example, computer memories, floppy disks, magnetic tapes, and optical compact disks. An exemplary disk is shown in FIG. 1. In one embodiment, the computer 10 may be interconnect to an antenna 16, a communication network 18, and/or "smart" hardware, such as a dongle (not shown).

The computer 10 may include a processing unit 22, monitor 24, keyboard 26, and magnetic strip reader 28. See FIG. 1. Both the strip reader 28 and keyboard 26 allow a user (not shown) to supply data to the processing unit 22. The communication network 18 may include a cable 30 interconnected to a local or wide area network server computer 32. The network 18 may also include a telecommunication facility 34 that includes modems 36 and 38 and another computer 40. The computer 10 may also be interconnected to peripheral equipment, such as a paper printer 42.

For convenience, the server computer 32 and the remote computer 40 are both hereafter collectively referred to simply as the remote computer. In the most preferred embodiment, the remote computer is under the control of a third party, unassociated with the user who records an image data stream on the medium 14.

Protocol

The preferred embodiment utilizes an established tag-based file format for documents. The particular arrangement chosen is the Tagged Image Format File, or "TIFF," system described in the publicly available specification entitled: "TIFF Revision 6.0 (Jun. 3, 1992)." At present, the specification is distributed by Aldus Corporation, 411 First Avenue South, Seattle, Wash., 98104-2871.

TIFF is a useful and widely used format for storing, describing, and interchanging raster images. The TIFF specification states that TIFF describes image data that typically come from scanners, frame grabbers, and paint- and photo-retouching programs.

Overview

When the computer 10 is to store an image data stream on the medium 14, the computer 10 receives, from at least one trusted source, time data and an image identification code for the image data stream to be recorded. An image data stream may be, for example, a particular document, record, file, computer monitor image, or other collection of electronic information.

The present method depends upon receiving time data from a source that is trusted to be accurate. The computer 10 accepts the time data from a "trusted source" during the process of recording the image data stream on the medium 14. Of course, the more secure and trusted the source of the time data, the more assured the user may be that any recorded image data stream will be accurately recorded and retrieved, without alteration.

The data from a trusted source may be, for example, simply calendar and clock data, in terms of year, month, day, hour, and minute, received from the internal clock of the processing unit 22 of the computer 10. In a more preferred embodiment, such time data is provided by the clock of the remote computer.

Other, more precise time data may also be provided to the computer 10 via the communication network 18 or antenna 16. Such praise time data express time to the nearest tenth or one hundredth of a second. Such precise time data (measuring time in fractions of a second) may be noted and recorded by the computer 10. Such signals may be generated by, for example, global positioning system satellites.

In yet another embodiment, the global positioning system signals also provide to the antenna 16 a location signal that allows the computer 10 to determine the antenna's longitude and latitude position on the earth, as well as the height of the antenna 16 above sea level. At present, such positioning systems are accurate to within, for example, thirty meters.

The method described uses an image identification code, sometimes referred to the International Standard for Image Identification ("ISII"): a substantially unique number assigned to a particular image data stream to help protect its integrity. The unique number may be generated, for example, by a "hard lock" dongle or other intelligent hardware that generates a substantially unique number for each image recorded on the medium 14 by the computer 10.

In another embodiment the image identification code is provided by a trusted source, such as, for example, the processing unit 22 of the computer 10. In a more preferred embodiment, the image identification code is provided, upon the request of the computer 10, by the remote computer. In still another preferred embodiment, the antenna 16 receives the image identification code from a dedicated radio signal generator (not shown).

In such an environment, the computer 10 may issue a request to the remote computer, advising that it wishes to record an image data stream. After identifying itself and conducting the proper handshaking protocols to authenticate its request, the remote computer may then provide to the computer 10, via the communication network 18, a substantially unique code. The image data stream is then stored in conjunction with the image identification code.

When the remote computer issues the image identification code, it may also then record how the computer 10 identified itself, the time that the computer 10 made the request (as measured by the same or a different source than that used by the computer 10), and the unique image identification code that was provided to the computer 10. Of course, should any dispute over the integrity of an image data stream arise, the fact that the information stored by the remote computer is consistent with the information recorded by the computer 10 in association with the image data stream will help in establishing the integrity of the electronic record.

Upon receiving the necessary time data and image identification code, the computer 10 stores the image data stream on the medium 14, together with the image identification code and time data. A verification code that represents the image data stream is also stored in association with the image identification code. The verification code is generally stored in an encrypted, private area, but may also be broadcast back to the remote computer, so that the remote computer may record it in conjunction with the image identification code that the remote computer issued.

After being stored, a user may wish to review the stored image data stream on the monitor 24 or print it out with the printer 42. If the user wishes to alter the image data stream, the computer 10 may allow the changes to be made and record the changed document as a new image data stream. The computer 10 will also note the time of the change (and how the changes were made) and record such information in association with the new data image stream. In this way, the computer 10 may provide an audit trail of when (and how) the image data stream was altered.

MORE DETAILED DESCRIPTION

Figure 2:
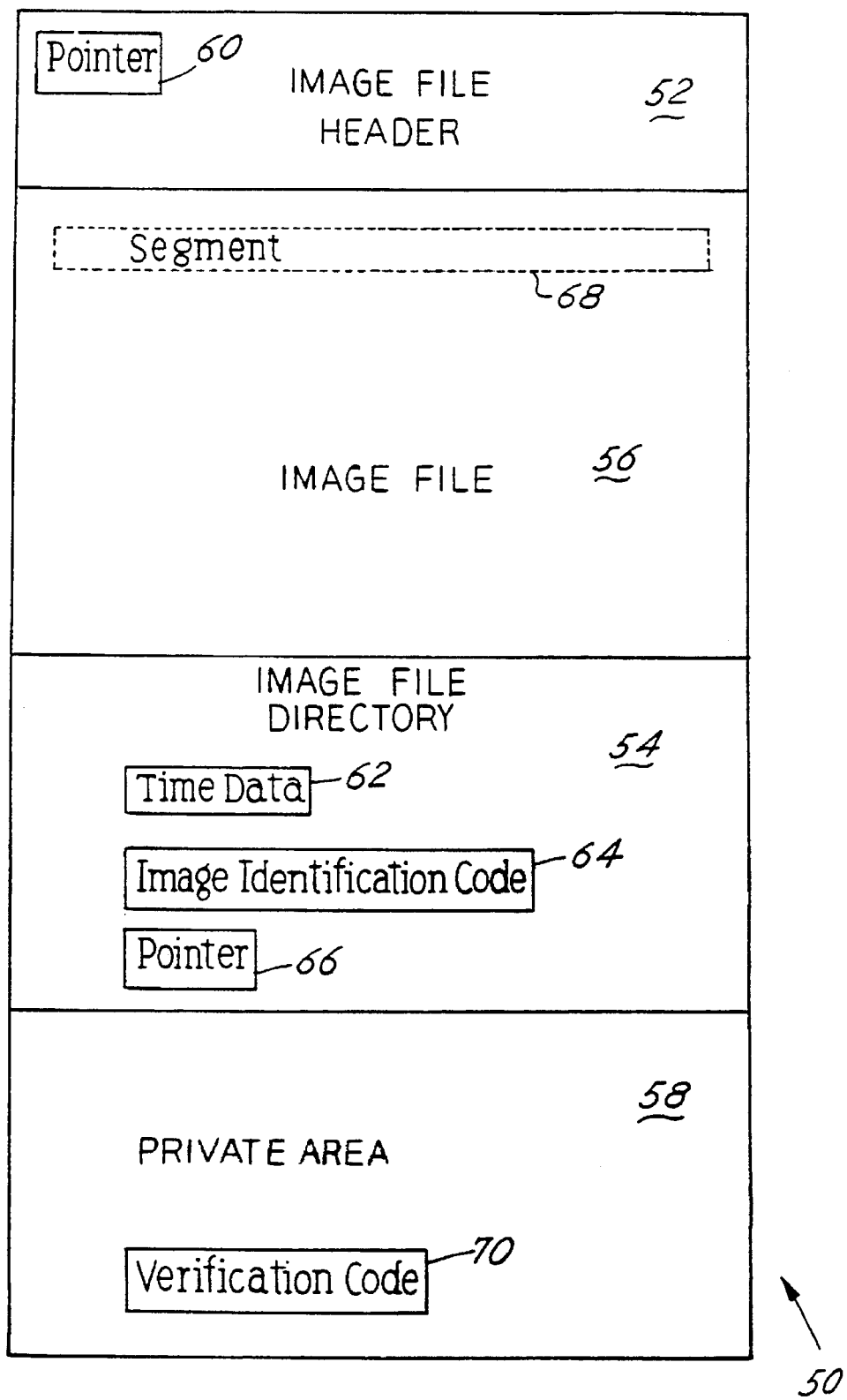
FIG. 2 is a representation of a document with a data image stream, image file header, image file directory, and private area that may be stored by the computer shown in FIG. 1.
Figure 3A:
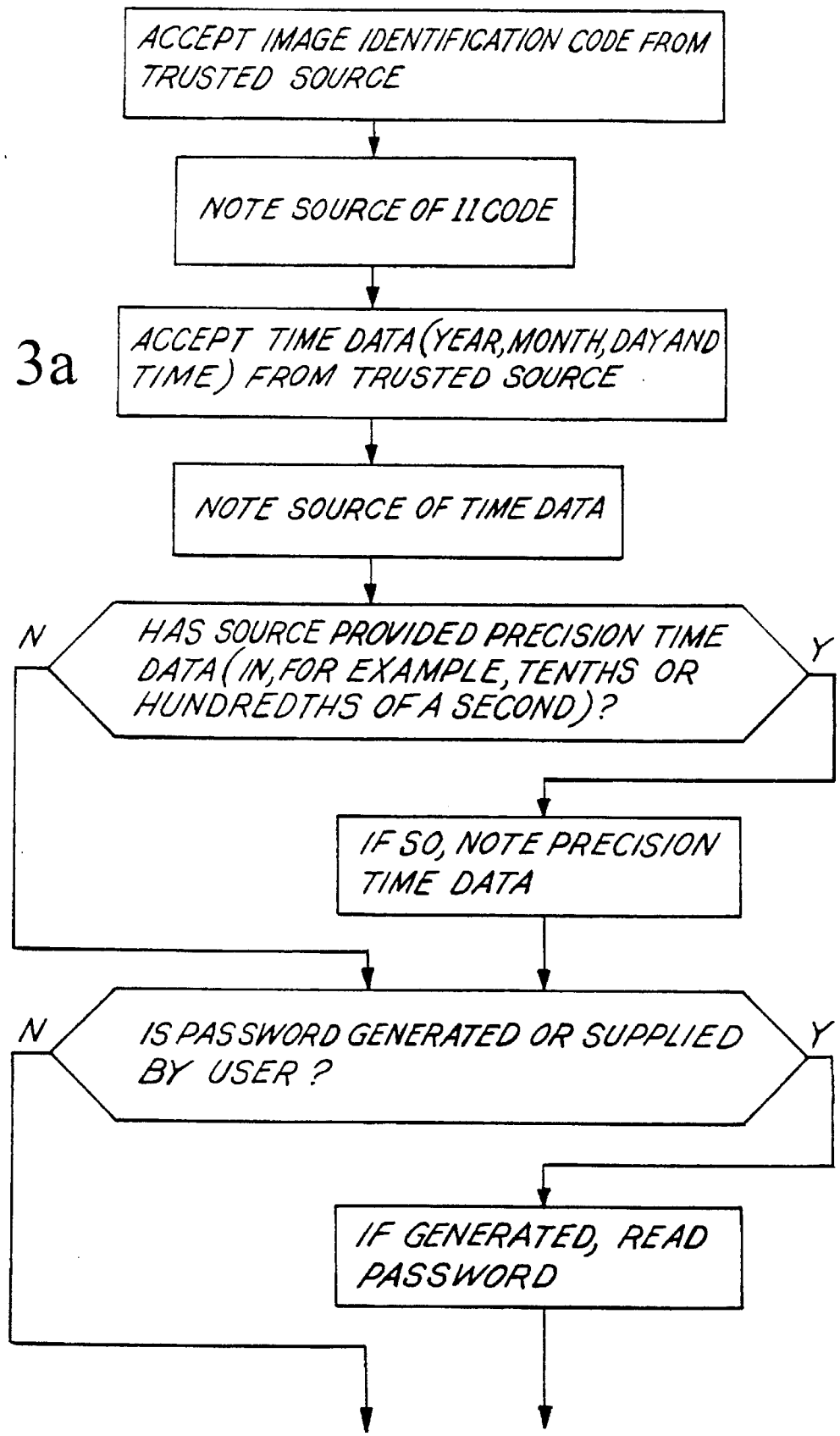
FIGS. 3 *a–e* are block diagram of a methodology employed to store the document shown in FIG. 2.
Figure 3C:
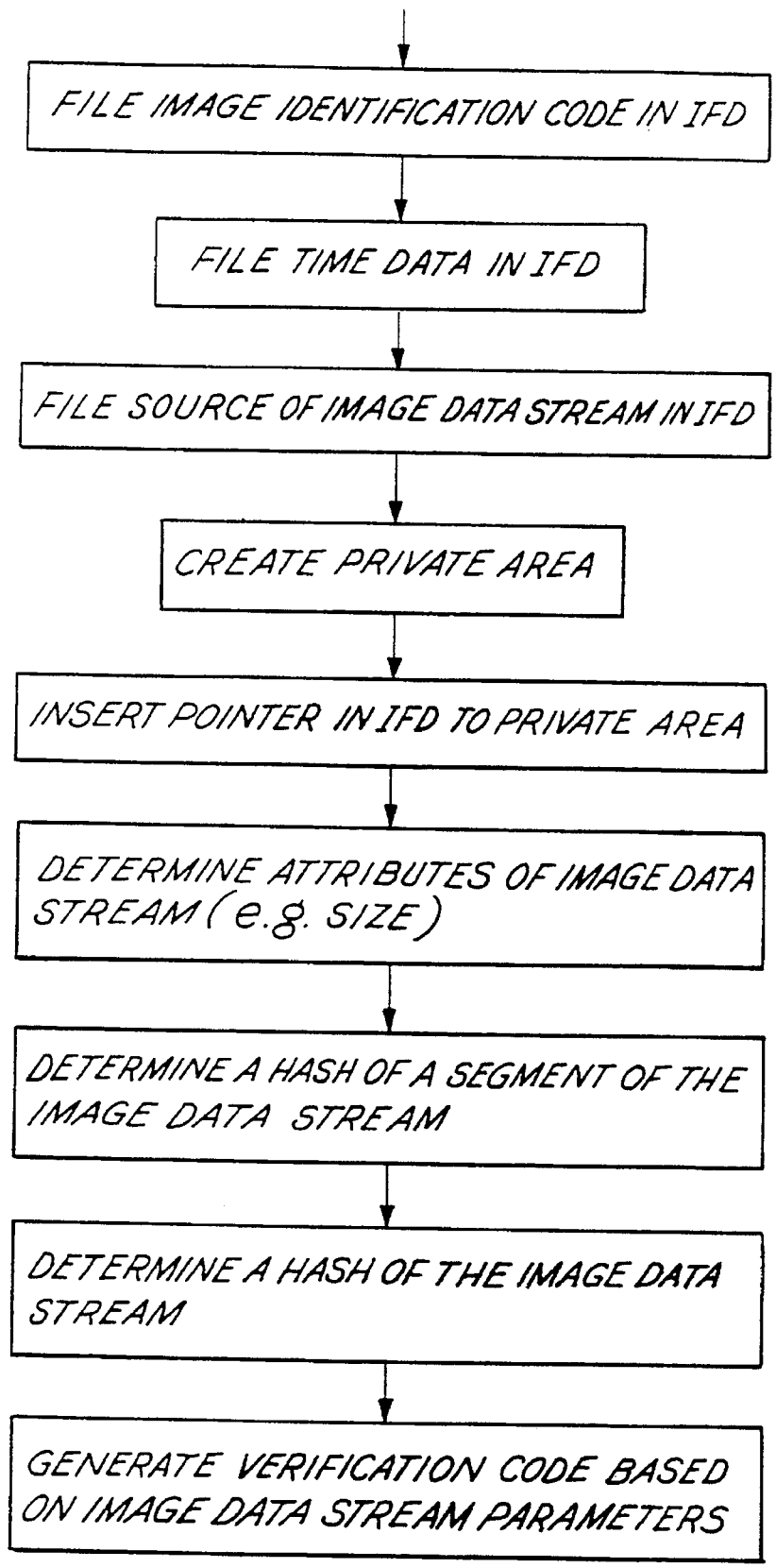
Figure 3D:
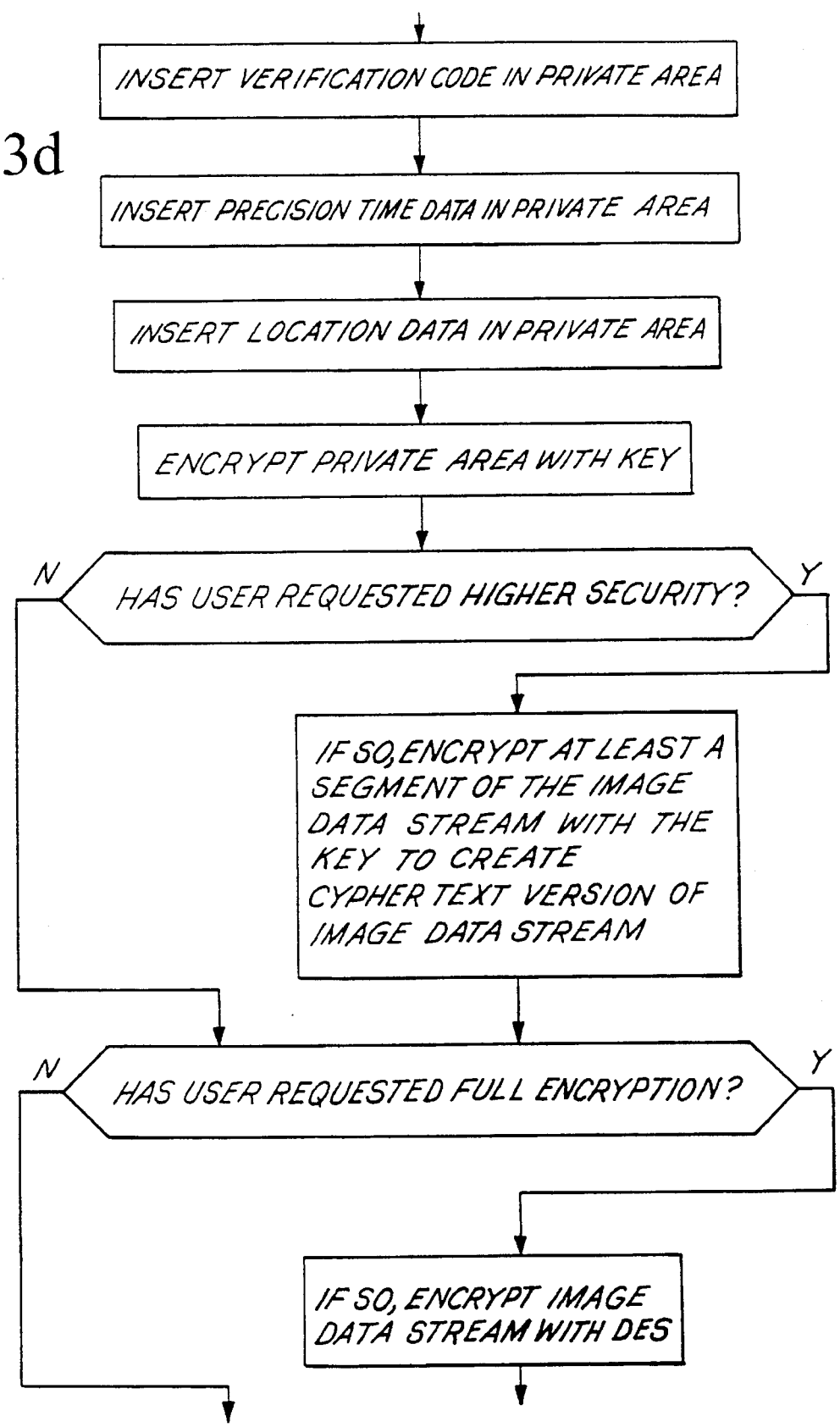
Figure 3E:
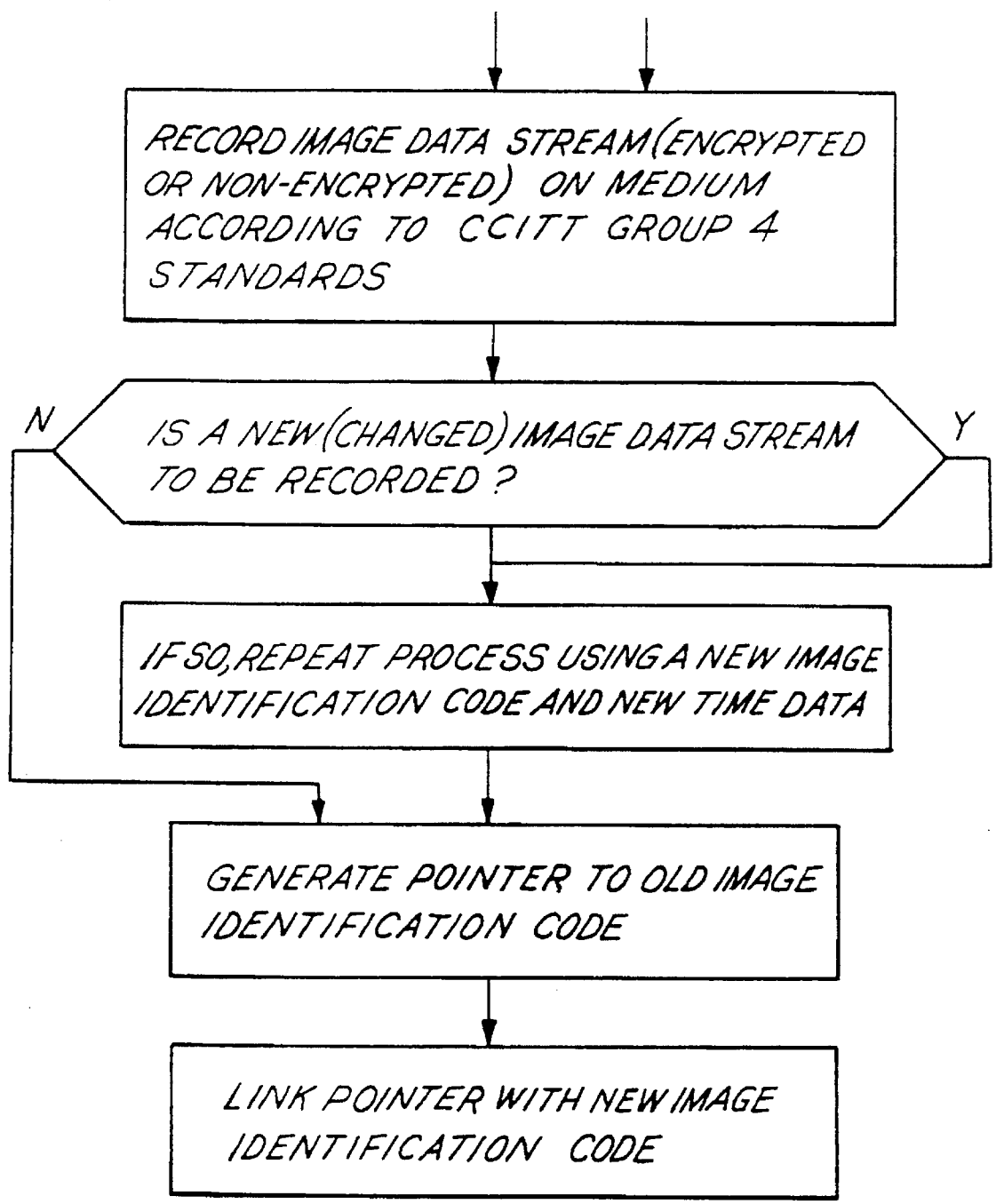

A schematic representation of information that is stored by the computer 10 according to the present method is shown in FIG. 2. The process followed by the computer 10 in recording the data image stream on the medium 14 is shown in FIG. 3.

The computer 10 accepts the image identification code from the trusted source, as well as accepting the time data. Any precision time data is also noted.

The user may elect to provide a password to the computer 10 to store and later retrieve the image data stream. In such a case, the user may supply a password via the keyboard 26 or by swiping a magnetic strip, such as a magnetic-strip credit card device (not shown), through the reader 28.

In the preferred embodiment, the user may elect not to supply a password. In such a case, the computer 10 itself supplies a "standard" password that is maintained by the computer 10. The standard password remains the same for all the image data streams recorded on media by the computer 10.

Still referring to FIGS. 2 and 3, the computer 10 may also note the format or "source" of the image data stream provided. Thus, the computer 10 may record a source indicator that the source of a particular image data stream is, for example a facsimile machine or optical reader, if the format of the image data stream meets the requirements for facsimile machine records or optical reader records.

Upon accepting the image data stream, time data, image identification number, precise time data, location data, password, and source indicator, the computer 10 generates a record 50, such as that shown in FIG. 2. The record 50 includes a public image file header 52 and public image file directory 52, as well as an image file 56 and a private area 58. The image file header 52 is consistent with TIFF standards and includes a pointer 60 to the image file directory 54.

The image file header 52 is initially read by a computer when an image data stream recorded on a medium is to be reviewed. The image file header 52 allows the computer 10 to determine the format used to record the image data stream and where to look for other information necessary to interpret the digital data recorded on the medium.

The computer 10 stores the time data and image identification code received from the trusted source in the image file directory 54. If available, location data and the source indicator for the data image stream are also recorded in the directory 54. A pointer 66 to the private area 58 is inserted in the image file directory 54.

The recorded time data and image identification code are illustratively labeled 62 and 64 in FIG. 2. It must be understood that such information inserted into the public image file header 52 or information file directory 54 may, of course, be inserted into the private area 58, rather than, or in addition to, being inserted into a public area.

The password is used, together with the time data and image identification code, to generate a key. Since a user-supplied password is generally not recorded on the record or otherwise generally known by the public, if the password is provided by the user, the key may be considered "private." Otherwise, the key may be considered "public."

The private area 58 cannot be read by a reader or other computer without constructing the key. Thus, the use of the user-provided key allows for a higher level of assurance of the integrity of the stored image. As a consequence of using such a password, however, should the password be forgotten, the image data stream may not easily be constructed (since the password is one element in the seed value for generating the key).

The attributes of the image data stream are then determined. Such attributes can include, for example, the size of the image data stream. Also, the computer 10 can compute a hash for a particular segment 68 of the image data stream and/or for the entire image data stream. The size of the image data stream, as well as any other hash values derived from all or part of the image data stream, may be considered image data stream parameters. These parameters may be combined to generate a verification code. The verification code is then inserted into the private area 58. The recorded verification code is illustratively labeled 70 in FIG. 2.

In an alternative embodiment, the verification code may also be transmitted back to the remote computer. The remote computer may then store the verification code in association with the corresponding image identification code issued for the image data stream. Of course, the corresponding time data may also be recorded by the remote computer in association with the image identification code.

Further, if the user has requested a higher security level, the computer 10 may note the precise time data and location data. Such data may also be inserted into the private area (or transmitted to the remote computer or recorded in the directory 54).

In the preferred embodiment, the private area is encrypted using the key previously generated. If the user has selected an even higher level of security, the segment 68, or the entire image data file, may also be encrypted with the key.

Thus, various levels of security for the image data stream are available. For example, with "Level 1" security, the password is not supplied by the user. A standard password is simply supplied by the computer 10. The key is generated from the image identification code, time data, and standard password. With "Level 2" security, again, the computer-provided password is used, but information regarding each version of the image data file are recorded in the image file directory. In this way, an audit trail regarding changes to the image data stream may be generated. With "Level 3" security, such audit trail data is also recorded. However, a user-supplied password is used, together with the time data and image identification code, to generate a private key to encrypt the private area 58. If further security is desired, all, or a segment 68, of the image data stream may also be encrypted with the private key to create a ciphertext.

If the user requires still further security, after the private area 58 (and possibly at least the segment 68 of the image data stream) have been encrypted using the key, the image data stream (or ciphertext) may be still further encrypted using any one of a variety of publicly known encryption methods. The files associated with the image data stream, such as the image file header 52, image file directory 54, and private area 56 may also be further encrypted.

A currently popular data encryption method, and the one used with the preferred embodiment, is the Data Encryption Standard, or, DES," which was developed and promulgated by the U.S. National Bureau of Standards. With this technique, data is enciphered in 64-bit blocks using a single 56-bit key, as described in NBS FIPS PUB 46, "*Data Encryption Standard,*" National Bureau of Standards (1977). The technique is symmetric, in that the same key is used for encryption and decryption. Alternative encryption techniques, include, for example, the RSA system (named for its developers, Messrs. Rivest, Shamir, and Adleman). The RSA system is described in U.S. Pat. No. 4,405,829 issued to Rivest et al.

After any such additional encryption, the resulting data stream, as well as the associated areas (such as the header 52, directory 54, and private area 58) are recorded on the medium. According to one embodiment, the recording is performed consistent with CCITT (Consultive Committee on International Telegraphy and Telephony) Group 4 standards for facsimile reproduction and transmission.

If a user should alter any image so recorded on the medium, the hash in the private area is unlikely to be the same as the hash or the revised image. In such a case, the present method will not certify that the parameters reflected in the verification code and the parameters of the retrieved document are the same and, thus, will not certify the retrieved image data stream as the original. In contrast, if the parameters of the recorded and retrieved image data streams do match, the present method will allow the computer 10 to certify the retrieved image data stream as an original: that it has not been changed since the time of its recordation on the medium.

Often, however, an author properly wishes to modify or alter a document. Thus, if an image data stream is altered, the entire process discussed above can be repeated, with the computer 10 obtaining a new image identification code and new time data from at least one trusted source. The new image identification code is then also recorded in an image file directory associated with the new image data stream. Further, the computer 10 adds a pointer associated with the new image data stream (preferably in the public directory associated with the new data image stream). The new pointer points to the older image identification code and time data.

Thus, when an older version exists, the directory 54 associated with every image data stream includes a pointer to time data for an earlier version. Consequently, the entire "lineage" of the image data stream may be shown by the computer 10 to the user, either on the screen or on a printout.

Figure 4A:
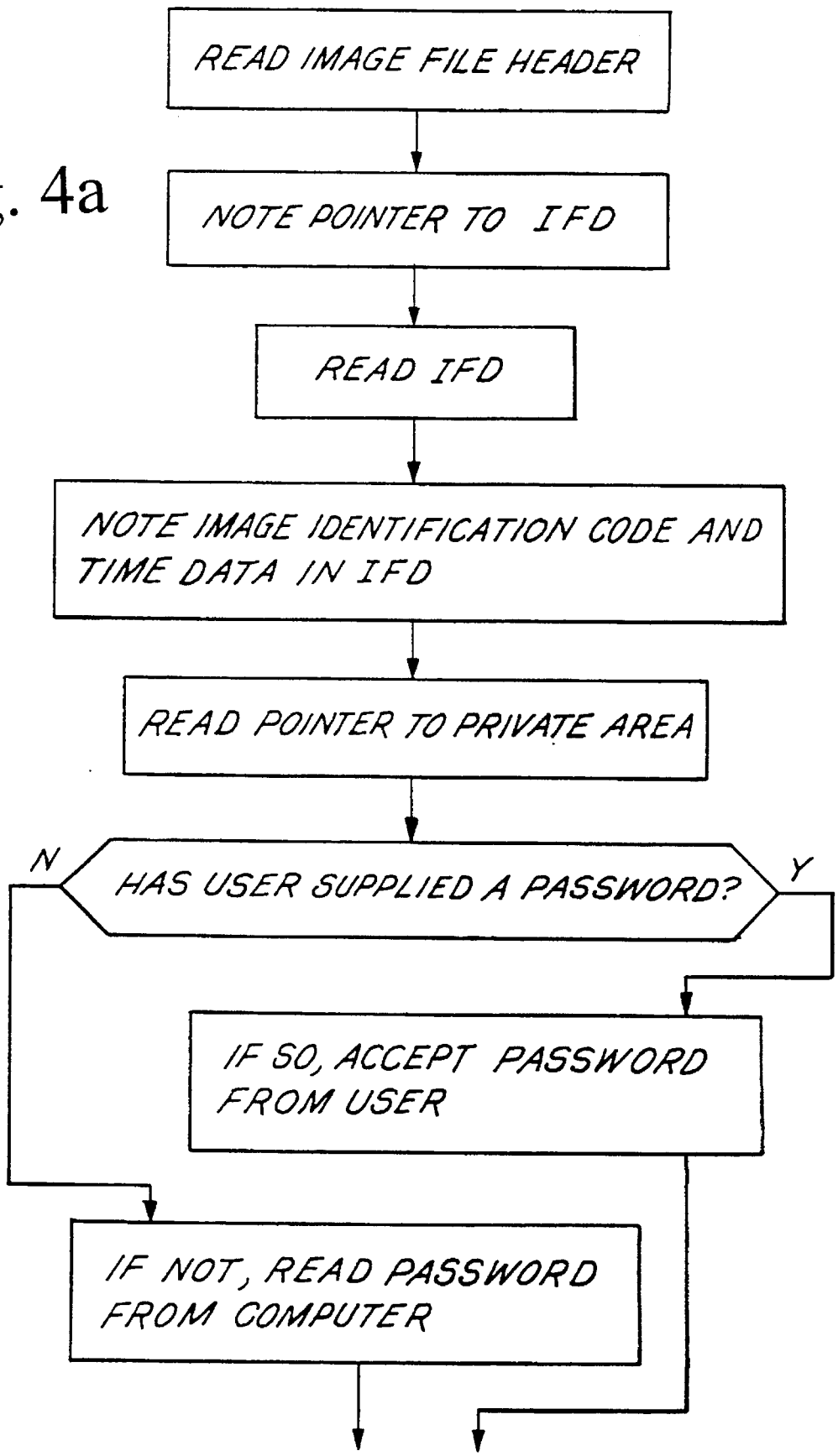
FIG. 4 *a–c* a block diagram of a methodology employed to retrieve the document shown in FIG. 2.
Figure 4B:
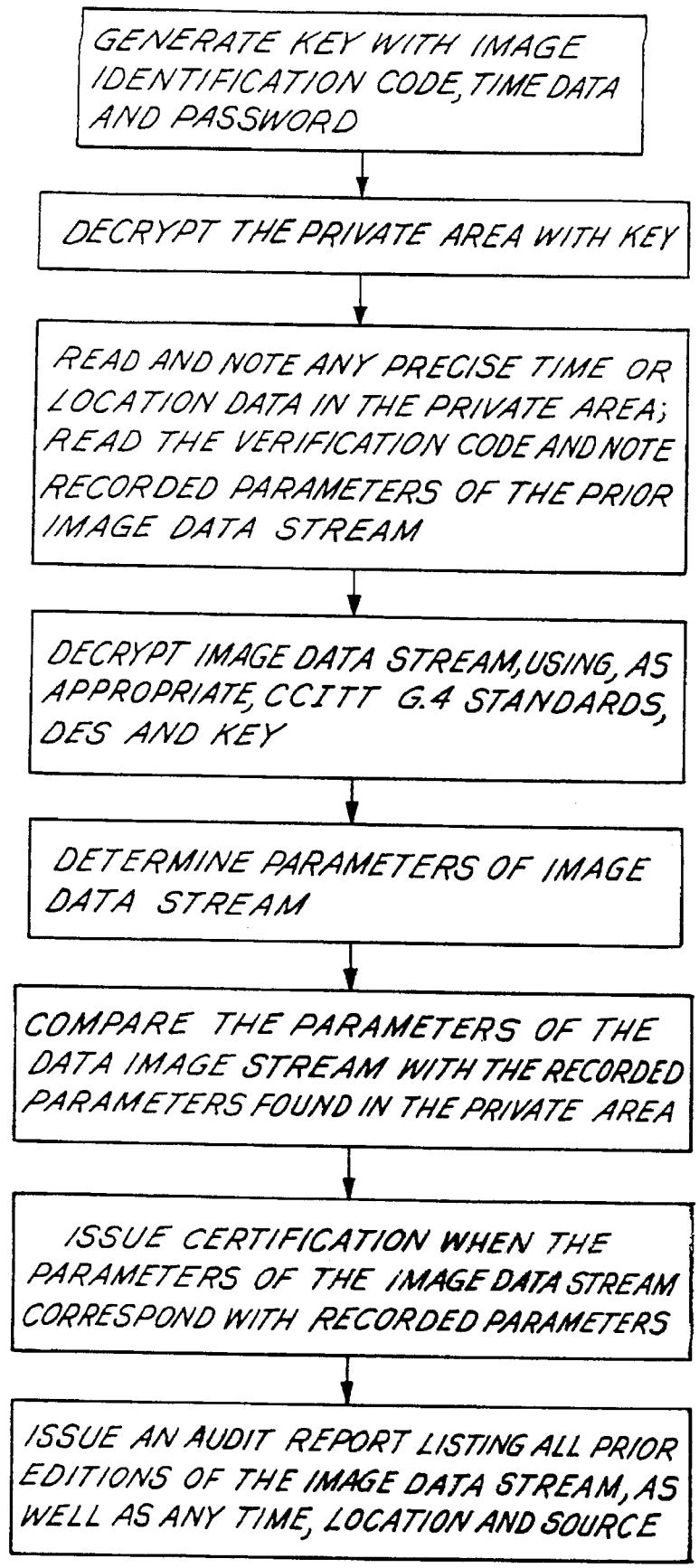
Figure 4C:
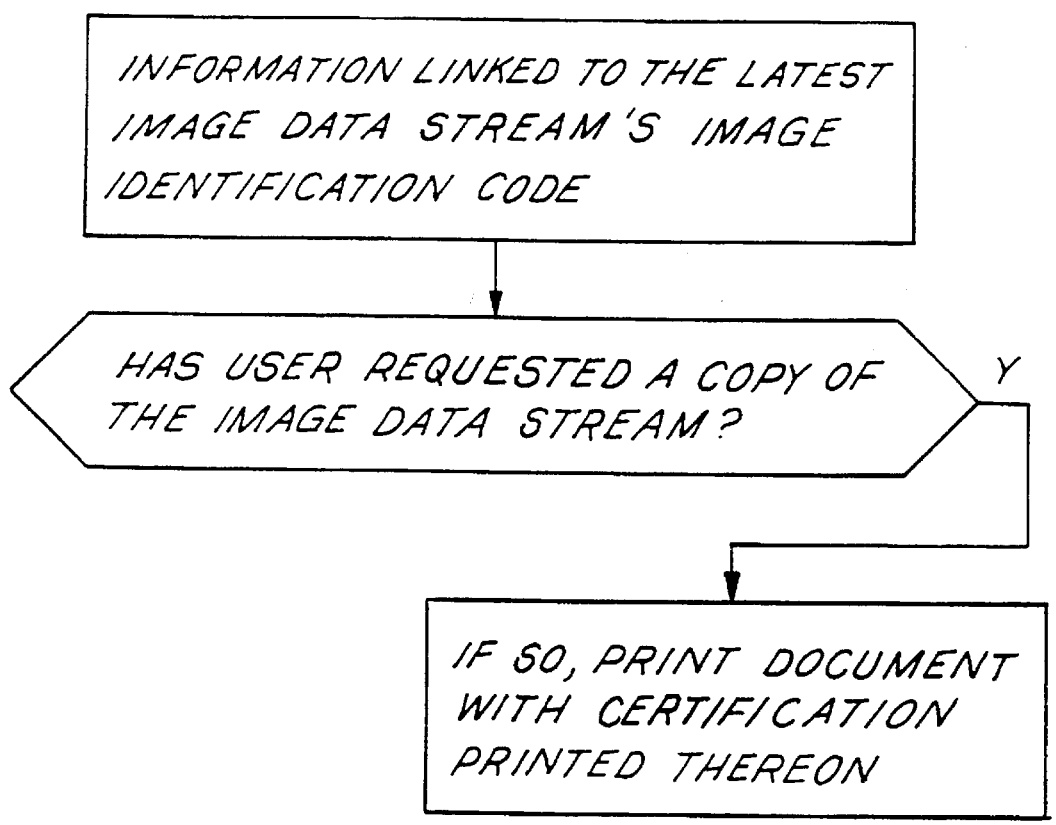

The method by which a computer may read a recorded image data stream and confirm that a particular image data stream has not been changed is shown in FIG. 4. The computer 10 initially reads the header 52 to determine the parameters that the computer 10 (or other reader) should use to interpret the document. Upon reading the pointer 60, the computer 10 may then read the image file directory 54. By reading the image file directory 54, the computer 10 knows the image identification code and time data, as well as the location of the private area associated with the image data stream.

If the user has supplied a password, it is accepted by the computer 10. Otherwise, the "standard" password is recalled. The password is then combined with the image identification code and time data to generate a key. The key may then be used to decrypt the private area 58.

The computer 10 also notes any recorded precise time and location data or source indicator. Upon deciphering the private area 58 with the key, the verification code is read. From the verification code, the computer 10 determines the parameters recorded for the previous, or "old," version of the image data stream. The recorded image is also decrypted using, as appropriate, the key, CCITT Group 4 standards, and DES.

After decryption, the image data stream parameters, such as its size and hash values for segments and/or the entire image data stream, may be computed. These parameters may then be compared with the parameters that are recorded in the verification code found in the private area 58. If all such parameters of the image data file stream and those parameters taken from the verification code in the private area are consistent, the computer 10 may then issue a certification that the parameters of the image data stream correspond with the recorded parameters.

Such certification of an image data stream may comprise simply flashing a notification on the monitor 24. In other embodiments, the certification may include printing a certification on the image data stream when it is printed by the printer 42, flashing a light for the operator to see, sounding an alarm, or activating another sensory transducer so as to communicate the certification to the user.

Further, the computer 10 may issue an audit report listing all the prior editions of the image data stream recorded. The report may show, for example, the time, location, or source of any change to the image data stream. As discussed earlier, dates and image identification codes are all linked to one another such that, by reading any one group of date data (and the corresponding image identification code), the computer 10 is pointed to earlier date data and an earlier image identification code. Consequently, the entire audit history may be conveyed to the user via, for example, the monitor 24 or printer 42.

While the present method utilizes a standard format, TIFF, the images are designed to be flexible and non-static entities. These images are an extension of TIFF style images. The image of the present method is designed such that any general Group 4 (facsimile) TIFF viewer should be able to decode the images when only "Level 1" security has been requested. The header, directory, and tags utilized to implement the TIFF format are described in greater detail below.

Image File Header

The header is identical to a TIFF 6.0 header, except that a "signature" added at the end of the header, as shown below.

| Byte | Content | Description |
| --- | --- | --- |
| 0–1 | "II" | Byte order indicator |
| 2–3 | 42 | Code identifying a TIFF format |
| 4–7 | DWORD Pointer | Pointer to Image File Directory (IFD) |
| 8–16 | Signature | Code to identify Image Identification security |

Image File Directory

The layout of the Image File Directory ("IFD") entries (or "tags") is as follows.

| Byte | Content |
| --- | --- |
| 0–1 | TAG--Value indicating content |
| 2–3 | Field Type |
| 4–7 | DWORD--Number of items |
| 8–11 | DWORD--Pointer of data item |

Baseline Tags

All TIFF version 6.0 required tags must be present for an image. This helps ensure that a non-secure image is viewable via a product capable of displaying compressed CCITT Group 4 TIFF records. The required tags for all TIFF images are as follows: Photometric interpretation, compression, image length, image width, resolution unit, X-resolution, Y-resolution, rows per strip, strip offsets, and strip byte counts.

The following additional tags are defined using the described method (in a subroutine entitle Production Link 3.0): FillOrder and ImageDescription. The high level interface includes these tags dynamically when the interface structure has data. ImageDescription contains the image identification code assigned at scan time.

Private Tags

The preferred embodiment uses two registered private use TIFF tags, shown below:

| (1) | 0 × 8732 | 34610 | Public ISII |
|-----|----------|-------|-------------|
| (2) | 0 × 8733 | 34611 | Image Tag   |

The first tag identified above is used to describe the ISII certification number. The field shall is a TIFF type ASCII sequence. The second tag shown above is used as the entry point for an internal image format description area. The presence of this tag indicates the present method was used to record the data image stream. This tag is in addition to the signature discussed above, which is located past the TIFF header.

ImageDescriptor

ImageDescriptor is a private "sub" image file directory ("IFD") and follows most of the same rules as a general TIFF IFD. This private IFD may be stored in an encrypted format. The following tags are defined for Group 4 ("G4VZN") images produced by Production Link 3.0:

| Hex | Decimal | Description |
|-----|---------|-------------|
| 0 × 1 | 1 | Image Type |
| 0 × 2 | 2 | Security Level |
| 0 × 3 | 3 | Verification Data Pointer |
| 0 × 5 | 5 | User Defined Text |

Each of the three tags is discussed further below.

| Image Type | |
|---|---|
| Tag | = 1 (vptImageType) |
| Type | = SHORT |

| Security Level | |
|---|---|
| Tag | = 2 (vptSecurityMethod) |
| Type | = SHORT |

| Verification Data Pointer | |
|---|---|
| Tag | = 3 (VptISIIVerficationData) |
| Type | = LONG |

| Value | Description |
|-------|-------------|
| 1 | ISII certified, but no encryption of image data |
| 2 | ISII "Public" encryption of image data |
| 3 | ISII "Keyed" encryption of image data |

This tag contains a pointer to the Image Identification checksum value block.

Checksum Generation (ISII Verification Data)

The verification data area is a checksum denoting the size of the image data stream, as well as a hash of a particular size segment of the image data stream and a hash of the entire image data stream.

Although the foregoing description will enable a person of ordinary skill in the art to utilize the present invention, a detailed C language source code listing is included as an Appendix. The listing provides detailed information concerning the operation of the overall system. Additionally, detailed features of the preferred embodiment will become apparent to those skilled in the art upon reviewing the source code listing and the detailed comments within it.

Preferred embodiments of the present invention have been described herein. It is to be understood, however, that changes and modifications can be made without departing from the true scope and spirit of the present invention. This true scope and spirit are defined by the following claims and their equivalents, to be interpreted in light of the foregoing specification.

Verification Data Pointer

Tag = 3 (vptISIIVerficationData)

Type = LONG

This tag contains a pointer to the Image Identification checksum value block.

5   Checksum Generation (ISII Verification Data)

The verification data area is a checksum denoting the size of the image data stream, as well as a hash of a particular size segment of the image data stream and a hash of the entire image data stream.

10  Although the foregoing description will enable a person of ordinary skill in the art to utilize the present invention, a detailed C language source code listing is included as an Appendix. The listing provides detailed information concerning the operation of the overall system. Additionally, detailed features of the preferred embodiment will become apparent to those skilled in the art upon reviewing the source code listing and the detailed comments within it.

APPENDIX
////////////////////////////////////////////////////////////
15  // ISL_VZN3.C
    //
    // Static Library functions for manipulating G4VZN3 type images.
    //
    //
20  // These routines are designed to be re-entrant. There are no static variables
    // and all data has been stored in the class.
    //
    //
////////////////////////////////////////////////////////////

```
    #if defined(_WINDOWS) || defined(_Windows)
    #include <windows.h>
    #endif if defined(__MSDOS__)
5   #if !defined (__HUGE__) && !defined(__LARGE__)
    #error Like hey, these routines must not be used with a segmented program!
    #endif
    #endif include <stdio.h>
10  #include <stdlib.h>
    #include <io.h>
    #include <fcntl.h>
    #include <string.h>
    #include <sys\types.h>
15  #include <sys\stat.h>
    #include <dos.h> ifdef __TUROBC__
    #include <dir.h>
    #elif defined(_MSC_VER)
20  #include <direct.h>
    #endif include "vzn3.h"         // New style VZN3 image
    #include "vzn2.h"         // Old Style PDA like images
    #include "cvt_vzn.h"      // Conversion Routines
25  #include "vzn3plug.h"     // ISII Device
    #include "encoder.h"      // DES interface /////////////////////////////////////////////////////////////////
    //
    /////////////////////////////////////////////////////////////////

30  PLATFORM Vzn3::Vzn3()
    {
      Init();
    };

/////////////////////////////////////////////////////////////////
```

```
        //
        ////////////////////////////////////////////////////////////////

PLATFORM Vzn3::~Vzn3()
        {
  5       Cleanup();
        };

////////////////////////////////////////////////////////////////
        // MapHeader :
        //
 10     //    Place static material in the TIFF header.
        //
        //////////////////////////////////////////////////////////////// void PLATFORM Vzn3::MapHeader(void * lpBuffer,DWORD dwIFDLocation)
        {
 15       ptrVZNTIFFHEADER pHeader = (ptrVZNTIFFHEADER) lpBuffer;

pHeader->cByteOrder[0]  = 'I';        // Intel Order me please...
          pHeader->cByteOrder[1]  = 'I';        // Little endian
          pHeader->uFortyTwo      = 42 ;        // Life the Universe and Everything.
          pHeader->dwFirstIFD     = dwIFDLocation; // IFD will exist AFTER the image data.

20       strcpy(pHeader->szSignature,VZN3_SIGNATURE);
        }

////////////////////////////////////////////////////////////////
        // CreatePrivateArea :
        //
 25     //    Maps the private area tags and data area into memory.
        //
        //////////////////////////////////////////////////////////////// int PLATFORM Vzn3::CreatePrivateArea()
        {
 30       // Much of this code is duplicated from MapIFDStream int      iRet      = VZN_ERROR_NONE;
```

```
        int      iTemp       = 0;     // A slight optimization for fixups char *   lpIFDStream = NULL;  // Used as base ptr for TAG mapping char *   lpPrivateMap = NULL; // walking pointer for copying to memory unsigned uIFDLength  = 0;     // Holds the entire size of the
5                                     // IFD int      iTagCount   = 0;     // Number of TAGS in IFD unsigned long ulFilePos = NULL; // File Pointer for FIXUP calculations ptrTAG   tagMap      = NULL;  // Base of the tagMap (2 bytes into
                                      // lpIFDStream)

10      ptrFIXUP fixupBase   = NULL;  // Base pointer for fixups
        ptrFIXUP fixupMap    = NULL;  // pointer used to "walk off of base"

FIXUP    IVFixup;             // ISII Verification fixup memset(&IVFixup,0,sizeof(FIXUP));

// Allocate a buffer to build the IFD  (If this fails we are F'd)

15      lpIFDStream = (char *) calloc(MAX_TAGS,sizeof(TAG));

if(!lpIFDStream) goto MEMORY_ERROR_EXIT;

// Point the tag map past the Signature and Entry count fields in the IFD tagMap   = (ptrTAG) (lpIFDStream+8+2);

// Place the signature in the private area 20      strcpy(lpIFDStream,VZN3_SIGNATURE);

// Create pointer fixup map fixupBase = (ptrFIXUP) calloc(MAX_TAGS,sizeof(FIXUP));
```

```
        if(!fixupBase) goto MEMORY_ERROR_EXIT;

fixupMap    = fixupBase;

//*********************************************************************
        //*********************************************************************
5       //*********************************************************************
        //
        // Map the tags
        //
        //

10      //----------------------------------------------------------------------
        tagMap->Tag      = (TiffTag) vptImageType;
        tagMap->Type     = ttShort;
        tagMap->Count    = 1;
        tagMap->VO.Short = typeG4VZN3;

15      iTagCount++; tagMap++;

//----------------------------------------------------------------------
        tagMap->Tag      = (TiffTag) vptSecurityMethod;
        tagMap->Type     = ttShort;
        tagMap->Count    = 1;
20      tagMap->VO.Short = vzn.iCertificationMethod;

iTagCount++; tagMap++;

//----------------------------------------------------------------------
        tagMap->Tag      = (TiffTag) vptISIIVerificationData;
        tagMap->Type     = ttLong;
25      tagMap->Count    = 1;
        tagMap->VO.Long  = 0;

IVFixup.tagFixup = tagMap;
        IVFixup.data     = 0;
        IVFixup.dwSize   = sizeof(ISIIVerification);

30      iTagCount++; tagMap++;

//----------------------------------------------------------------------
        //tagMap->Tag      = (TiffTag) vptThumbNail;
```

```
//tagMap->Type      = ttLong;
//tagMap->Count     = 1;
//tagMap->VO.Long   = 0;
//
//iTagCount++; tagMap++;

//-----------------------------------------------------------------
if(vzn.lpUserDefined)
 {
   tagMap->Tag     = (TiffTag) vptUserDefinedText;
   tagMap->Type    = ttUndefined;
   tagMap->Count   = vzn.dwUserDefined + 1;
   tagMap->VO.Long = 0;

fixupMap->tagFixup = tagMap;
   fixupMap->data     = calloc(1,vzn.dwUserDefined+4);
   fixupMap->dwSize   = vzn.dwUserDefined+1;

if(!fixupMap->data) goto MEMORY_ERROR_EXIT;

memcpy((char*)fixupMap->data,vzn.lpUserDefined,vzn.dwUserDefined);

iTagCount++; tagMap++; fixupMap++;
 }

//----------------------------------------------------------------- if(vzn.dwSoftwareVersion)
 {
   tagMap->Tag     = (TiffTag) vptSoftwareVersion;
   tagMap->Type    = ttLong;
   tagMap->Count   = 1;
   tagMap->VO.Long = vzn.dwSoftwareVersion;

iTagCount++; tagMap++;
 }
else
 {
   iRet = VZN_ERROR_NO_VERSION;
   goto MEMORY_ERROR_EXIT;
 }
```

```
     //--------------------------------------------------------------------
     tagMap->Tag      = (TiffTag) vptLibraryVersion;
     tagMap->Type     = ttShort;
     tagMap->Count    = 1;
5    tagMap->VO.Short = VZN3_LIBRARY_VERSION;

iTagCount++; tagMap++;

//--------------------------------------------------------------------
     if( (iTemp = strlen(vzn.szLegend)) != 0)
       {
10     tagMap->Tag      = (TiffTag) vptRequiredLegend;
       tagMap->Type     = ttASCII;
       tagMap->Count    = iTemp + 1;
       tagMap->VO.Long  = 0;

fixupMap->tagFixup = tagMap;
15     fixupMap->data     = calloc(1,iTemp+4);
       fixupMap->dwSize   = iTemp+1;

if(!fixupMap->data) goto MEMORY_ERROR_EXIT;

strcpy((char*)fixupMap->data,vzn.szLegend);

iTagCount++; tagMap++; fixupMap++;
20     }

//--------------------------------------------------------------------
     if( (iTemp = strlen(vzn.szFlags)) != 0)
       {
       tagMap->Tag      = (TiffTag) vptImageFlags;
25     tagMap->Type     = ttASCII;
       tagMap->Count    = iTemp + 1;
       tagMap->VO.Long  = 0;

fixupMap->tagFixup = tagMap;
       fixupMap->data     = calloc(1,iTemp+4);
30     fixupMap->dwSize   = iTemp+1;

if(!fixupMap->data) goto MEMORY_ERROR_EXIT;

strcpy((char*)fixupMap->data,vzn.szFlags);
```

```
            iTagCount++; tagMap++; fixupMap++;
          }

//-----------------------------------------------------------------
          if( (iTemp = strlen(vzn.szLLA)) != 0)
          {
            tagMap->Tag      = (TiffTag) vptLLA;
            tagMap->Type     = ttASCII;
            tagMap->Count    = iTemp + 1;
            tagMap->VO.Long  = 0;

fixupMap->tagFixup = tagMap;
            fixupMap->data     = calloc(1,iTemp+4);
            fixupMap->dwSize   = iTemp+1;

if(!fixupMap->data) goto MEMORY_ERROR_EXIT;

strcpy((char*)fixupMap->data,vzn.szLLA);

iTagCount++; tagMap++; fixupMap++;
          }

//-----------------------------------------------------------------
          if( vzn.iTimeSource )
          {
            WORD wHundreths;

wHundreths = atoi(&vzn.szImageTime[7]);

tagMap->Tag      = (TiffTag) vptTimeSource;
            tagMap->Type     = ttLong;
            tagMap->Count    = 1;
            tagMap->VO.Long  = MAKELONG(vzn.iTimeSource,wHundreths);

iTagCount++; tagMap++;
          }

//
          //
          //
          // END of TAG mapping
```

```
//
//************************************************************
//************************************************************
//************************************************************
```

5    // All offsets in the private IFD are from the START of the private
     // IFD. Note that the entire size of the InVzn private area is known.
     //    This allows the entire area to be read, decoded
     // and then utililized in memory as a "memory file."

ulFilePos  = 0;

10   // The +8 in the next line bypasses the signature

*((WORD*)(lpIFDStream+8)) = iTagCount;  // Place the number of tags

//
     // Calculate the total size of the IFD including Entry count and
     // the next IFD entry
15   // uIFDLength = 8 + 2;                      // Signature and Entry count
     uIFDLength += (iTagCount * sizeof(TAG)); // Tags
     uIFDLength += 4;                         // Next IFD Offset 0x0 from calloc //
20   // Add this size to the file pointer for calculation of where
     // the fixups belong
     // ulFilePos += uIFDLength;

//
25   // Handle Generic fixups
     // for(fixupMap = fixupBase;fixupMap->tagFixup;fixupMap++)
     {
        fixupMap->tagFixup->VO.Long = ulFilePos;

BANNER & ALLEGRETTI, LTD.
10 South Wacker Drive
Suite 3000
Chicago, Illinois 60606                - 30 -

```
        ulFilePos += fixupMap->dwSize;

if(ulFilePos % 2)
          {
            // Uh, the next offset won't be WORD aligned, so make it so!
            fixupMap->dwSize++;
            ulFilePos++;
          }
      }

//
    // Map the ISIIVerification Fixup
    //
    IVFixup.tagFixup->VO.Long = ulFilePos;
    ulFilePos += IVFixup.dwSize;

if(vzn.iCertificationMethod != secGenericTIFF)
      {
        //
        // The size of the Private IFD MUST be divisible by 16.  The Encode and
        // decode routines work off of buffers of that size.
        // dwPrivateIFDSize = (ulFilePos%16) ? ((ulFilePos/16) + 1) * 16 : ulFilePos;
        lpPrivateIFD    = calloc(1, (WORD) (dwPrivateIFDSize + 10l));

if(!lpPrivateIFD)
          {
            iRet = VZN_ERROR_NO_MEMORY;
            goto MEMORY_ERROR_EXIT;
          }

//
        // Copy private tag area to "memory stash"
        // memcpy(lpPrivateIFD,lpIFDStream,uIFDLength);

//
```

```
       // Set CheckBlock reference pointer into the allocated region
       // pCheckBlockData =
           (ptrISIIVerification) ( ((char*)lpPrivateIFD) + (IVFixup.tagFixup->VO.Long));
 5     }

//
       // Map Fixup data into the buffer
       // for(fixupMap = fixupBase;fixupMap->tagFixup;fixupMap++)
10     {
         if( fixupMap->data )
         {
           lpPrivateMap = ( ((char*)lpPrivateIFD) + fixupMap->tagFixup->VO.Long);

memcpy(lpPrivateMap,fixupMap->data,(WORD)fixupMap->dwSize);

15         lpPrivateMap += fixupMap->dwSize;

free(fixupMap->data);    // Free data
           fixupMap->data = NULL;   // indicate that data is free incase of error
         }
       }

20     free(lpIFDStream);
       free(fixupBase);

return(iRet);

//===============================================
25     =============================
       //===============================================
       =============================
       //*******=
30     // Because C does not have some of the exceptional handling
```

```
    // mechanisims, like, for example, C++ this goto helps
    // handle memory allocation errors and the like.
    //
    // Notice : This code is now a class, but, in this embodiment,
5   // the code has stayed with the goto.
    //

MEMORY_ERROR_EXIT :

if(lpIFDStream) free(lpIFDStream);

if(fixupBase)
10      {
          for(fixupMap = fixupBase;fixupMap->tagFixup;fixupMap++)
            {
              if( fixupMap->data)
                {
15                free(fixupMap->data);
                }
            } free(fixupBase);
        }

20    return(iRet);
    }

//////////////////////////////////////////////////////////////
// MapIFDStream : Assemble the Image File Description
//                TIFF Tag stream.
25  //
////////////////////////////////////////////////////////////// int PLATFORM Vzn3::MapIFDStream()
    {
```

```
            // All automatic varibles are initialized.

int         iRet        = VZN_ERROR_NONE;

int         iTemp       = 0;     // A slight optimization for fixups char  *     lpIFDStream = NULL;  // Used as base ptr for TAG mapping 5           char  *     lpHeaderMap = NULL;  // Used to walk the header buffer unsigned    uIFDLength  = 0;     // Holds the entire size of the
                                             // IFD int         iTagCount   = 0;     // Number of TAGS in IFD unsigned long ulFilePos = NULL;  // File Pointer for FIXUP calculations 10          ptrTAG      tagMap      = NULL;  // Base of the tagMap (2 bytes into
                                             // lpIFDStream)

ptrFIXUP    fixupBase   = NULL;  // Base pointer for fixups
            ptrFIXUP    fixupMap    = NULL;  // pointer used to "walk off of base"

FIXUP       ImageFixup; // Special fixup for Image data    (see note below)
15          FIXUP       InVznFixup; //    "      "    "   Private data   "    "    "

memset(&ImageFixup,0,sizeof(ImageFixup));
            memset(&InVznFixup,0,sizeof(InVznFixup));

// This function is written to be as easy to modify tags
            // as possible and add new tags without effecting other
20          // tags.
            //
            // All fixup allocations must have at least one extra byte
            // of null data at the end incase the data is odd.  TIFF
            // requires that Offset values be word aligned.  If during
25          // a fixup mapping it is detected that a fixup is odd, a
            // padding byte will be added.
            //
            //
```

```
    // Allocate a buffer to build the IFD  (If this fails we are F'd)

lpIFDStream = (char *) calloc(MAX_TAGS,sizeof(TAG));

if(!lpIFDStream) goto MEMORY_ERROR_EXIT;

// Point the tag map past the Entry count field in the IFD 5   tagMap      = (ptrTAG) (lpIFDStream+2);

// Create pointer fixup map fixupBase   = (ptrFIXUP) calloc(MAX_TAGS,sizeof(FIXUP));

if(!fixupBase) goto MEMORY_ERROR_EXIT;

fixupMap    = fixupBase;

10  //*********************************************************
    //*********************************************************
    //*********************************************************
    //
    // Map the tags
15  //
    //

//---------------------------------------------------------
    tagMap->Tag       = tagNewSubfileType;
    tagMap->Type      = ttLong;
20  tagMap->Count     = 1;
    tagMap->VO.Long   = 2;

iTagCount++; tagMap++;

//---------------------------------------------------------
    tagMap->Tag       = tagSubfileType;
25  tagMap->Type      = ttShort;
    tagMap->Count     = 1;
    tagMap->VO.Long   = 1;

iTagCount++; tagMap++;
```

```
        //------------------------------------------------------------
        tagMap->Tag      = tagImageWidth;
        tagMap->Type     = ttLong;
        tagMap->Count    = 1;
5       tagMap->VO.Long  = vzn.dwWidth;

iTagCount++; tagMap++;

//------------------------------------------------------------
        tagMap->Tag      = tagImageLength;
        tagMap->Type     = ttLong;
10      tagMap->Count    = 1;
        tagMap->VO.Long  = vzn.dwLength;

iTagCount++; tagMap++;

//------------------------------------------------------------
        tagMap->Tag      = tagBitsPerSample;
15      tagMap->Type     = ttLong;
        tagMap->Count    = 1;
        tagMap->VO.Long  = 1;

iTagCount++; tagMap++;

//------------------------------------------------------------
20      tagMap->Tag      = tagCompression;
        tagMap->Type     = ttShort;
        tagMap->Count    = 1;
        tagMap->VO.Short = compCCITTG4_T6;

iTagCount++; tagMap++;

25      //------------------------------------------------------------
        tagMap->Tag      = tagPhotometricInterp;
        tagMap->Type     = ttShort;
        tagMap->Count    = 1;
        tagMap->VO.Short = (WORD)vzn.dwPhotoMetricInterpretation;

30      iTagCount++; tagMap++;

//------------------------------------------------------------
        tagMap->Tag      = tagFillOrder;
```

```
         tagMap->Type      = ttShort;
         tagMap->Count     = 1;
         tagMap->VO.Short  = (WORD) (vzn.dwFillOrder ? vzn.dwFillOrder : 1);

iTagCount++; tagMap++;

5        //------------------------------------------------------------------
         if( (iTemp = strlen(vzn.szDocumentId)) != 0)
         {
            tagMap->Tag      = tagDocumentName;
            tagMap->Type     = ttASCII;
10          tagMap->Count    = iTemp + 1;
            tagMap->VO.Long  = 0;

fixupMap->tagFixup = tagMap;
            fixupMap->data     = calloc(1,iTemp+4);
            fixupMap->dwSize   = iTemp+1;

15          if(!fixupMap->data) goto MEMORY_ERROR_EXIT;

strcpy((char*)fixupMap->data,vzn.szDocumentId);

iTagCount++; tagMap++; fixupMap++;
         }

//------------------------------------------------------------------
20       if( (iTemp = strlen(vzn.szDescription)) != 0)
         {
            tagMap->Tag      = tagImageDescription;
            tagMap->Type     = ttASCII;
            tagMap->Count    = iTemp + 1;
25          tagMap->VO.Long  = 0;

fixupMap->tagFixup = tagMap;
            fixupMap->data     = calloc(1,iTemp+4);
            fixupMap->dwSize   = iTemp+1;

if(!fixupMap->data) goto MEMORY_ERROR_EXIT;

30          strcpy((char*)fixupMap->data,vzn.szDescription);

iTagCount++; tagMap++; fixupMap++;
```

```
           }

//------------------------------------------------------------
           tagMap->Tag      = tagStripOffsets;
           tagMap->Type     = ttLong;
   5       tagMap->Count    = 1;
           tagMap->VO.Long  = 0;

ImageFixup.tagFixup = tagMap;
           ImageFixup.data     = 0;
           ImageFixup.dwSize   =
  10          vzn.dwImageDataSize == 0xFFFFFFFF ? dwImagePos : vzn.dwImageDataSize;

iTagCount++; tagMap++;

//------------------------------------------------------------
           if(vzn.cRotation)
           {
  15         tagMap->Tag      = tagOrientation;
             tagMap->Type     = ttShort;
             tagMap->Count    = 1;
             tagMap->VO.Short = vzn.cRotation;

iTagCount++; tagMap++;
  20       }

//------------------------------------------------------------
           tagMap->Tag      = tagRowsPerStrip;
           tagMap->Type     = ttLong;
           tagMap->Count    = 1;
  25       tagMap->VO.Long  = vzn.dwLength;

iTagCount++; tagMap++;

//------------------------------------------------------------
           tagMap->Tag      = tagStripByteCounts;
           tagMap->Type     = ttLong;
  30       tagMap->Count    = 1;
           tagMap->VO.Long  = vzn.dwImageDataSize;

iTagCount++; tagMap++;
```

```
//-----------------------------------------------------------------
    tagMap->Tag       = tagXResolution;
    tagMap->Type      = ttRational;
    tagMap->Count     = 1;
 5  tagMap->VO.Long   = 0;

fixupMap->tagFixup = tagMap;
    fixupMap->data     = calloc(2,sizeof(DWORD));
    fixupMap->dwSize   = 8;

if(!fixupMap->data) goto MEMORY_ERROR_EXIT;

10  *(long *)fixupMap->data        = vzn.dwResolution;
    *((long *)(fixupMap->data)+1) = 1l;

iTagCount++; tagMap++; fixupMap++;

//-----------------------------------------------------------------
    tagMap->Tag       = tagYResolution;
15  tagMap->Type      = ttRational;
    tagMap->Count     = 1;
    tagMap->VO.Long   = 0;

fixupMap->tagFixup = tagMap;
    fixupMap->data     = calloc(2,sizeof(DWORD));
20  fixupMap->dwSize   = 8;

if(!fixupMap->data) goto MEMORY_ERROR_EXIT;

*(long *)fixupMap->data        = vzn.dwResolution;
    *((long *)(fixupMap->data)+1) = 1l;

iTagCount++; tagMap++; fixupMap++;

25  //-----------------------------------------------------------------
    if( (iTemp = strlen(vzn.szImageId)) != 0)
    {
      tagMap->Tag       = tagPageName;
      tagMap->Type      = ttASCII;
30    tagMap->Count     = iTemp + 1;
      tagMap->VO.Long   = 0;
```

```
        fixupMap->tagFixup = tagMap;
        fixupMap->data     = calloc(1,iTemp+4);
        fixupMap->dwSize   = iTemp+1;

if(!fixupMap->data) goto MEMORY_ERROR_EXIT;

5       strcpy((char*)fixupMap->data,vzn.szImageId);

iTagCount++; tagMap++; fixupMap++;
        }

//------------------------------------------------------------
        tagMap->Tag     = tagSoftware;
10      tagMap->Type    = ttASCII;
        tagMap->Count   = 8;
        tagMap->VO.Long = 8;

iTagCount++; tagMap++;

//------------------------------------------------------------
15      tagMap->Tag     = tagDateTime;
        tagMap->Type    = ttASCII;
        tagMap->Count   = 20;
        tagMap->VO.Long = 0;

fixupMap->tagFixup = tagMap;
20      fixupMap->data     = calloc(1,(WORD)(tagMap->Count+10));
        fixupMap->dwSize   = 20;

if(!fixupMap->data) goto MEMORY_ERROR_EXIT;

sprintf
        (
25        (char *)fixupMap->data,
          "%4.4s:%2.2s:%2.2s %2.2s:%2.2s:%2.2s",
          &vzn.szImageDate[0],
          &vzn.szImageDate[4],
          &vzn.szImageDate[6],
30        &vzn.szImageTime[0],
          &vzn.szImageTime[2],
          &vzn.szImageTime[4]
        );
```

```
        iTagCount++; tagMap++; fixupMap++;

//----------------------------------------------------------------
        if( (iTemp = strlen(vzn.szCreator)) != 0)
        {
 5         tagMap->Tag       = tagArtist;
           tagMap->Type      = ttASCII;
           tagMap->Count     = iTemp+1;
           tagMap->VO.Long   = 0;

fixupMap->tagFixup = tagMap;
10         fixupMap->data     = calloc(1,iTemp+4);
           fixupMap->dwSize   = iTemp+1;

if(!fixupMap->data) goto MEMORY_ERROR_EXIT;

strcpy((char*)fixupMap->data,vzn.szCreator);

iTagCount++; tagMap++; fixupMap++;
15      }

//----------------------------------------------------------------
        if( (iTemp = strlen(vzn.szISII)) != 0 )
          if(vzn.iCertificationMethod != secGenericTIFF)
          {
20         tagMap->Tag       = tagINVZNISII;
           tagMap->Type      = ttASCII;
           tagMap->Count     = iTemp + 1;
           tagMap->VO.Long   = 0;

fixupMap->tagFixup = tagMap;
25         fixupMap->data     = calloc(1,iTemp+4);
           fixupMap->dwSize   = iTemp+1;

if(!fixupMap->data) goto MEMORY_ERROR_EXIT;

strcpy((char*)fixupMap->data,vzn.szISII);

iTagCount++; tagMap++; fixupMap++;
30        }

//----------------------------------------------------------------
```

```
       if( vzn.iCertificationMethod != secGenericTIFF )
       {
         tagMap->Tag      = tagINVZNPrivateArea;
         tagMap->Type     = ttUndefined;
5        tagMap->Count    = dwPrivateIFDSize;
         tagMap->VO.Long  = sizeof(VZNTIFFHEADER) + vzn.dwImageDataSize;

InVznFixup.tagFixup = tagMap;
         InVznFixup.data     = 0;
         InVznFixup.dwSize   = dwPrivateIFDSize;

10       iTagCount++;  tagMap++;
       }

//
       //
       // END of TAG mapping
15     //
       //********************************************************************
       //********************************************************************
       //******************************************************************** ulFilePos = sizeof(VZNTIFFHEADER) + vzn.dwImageDataSize + dwPrivateIFDSize;

20     *((WORD*)lpIFDStream) = iTagCount;   // Place the number of tags

//
       // Calculate the total size of the IFD including Entry count and
       // the next IFD entry
       //

25     uIFDLength  = 2;                          // Entry count
       uIFDLength += (iTagCount * sizeof(TAG));  // Tags
       uIFDLength += 4;                          // Next IFD Offset 0x0 from calloc //
       // Add this size to the file pointer for calculation of where
30     // the fixups belong.
       // ulFilePos += uIFDLength;
```

```
//
// Handle Generic fixups (Calculate storage requirements)
// for(fixupMap = fixupBase;fixupMap->tagFixup;fixupMap++)
  {
    fixupMap->tagFixup->VO.Long = ulFilePos;

ulFilePos += fixupMap->dwSize;

if(ulFilePos % 2)
      {
        // Uh, the next offset won't be WORD aligned, so make it so!
        fixupMap->dwSize++;
        ulFilePos++;
      }
  }

// Allocate storage for header lpIFD = calloc
            (
              1,  // sizeof(VZNTIFFHEADER) extra allocated
              (WORD)(ulFilePos - dwImagePos)
            );

dwIFDSize =
        ulFilePos        -
        sizeof(VZNTIFFHEADER) -
        dwImagePos       -
        dwPrivateIFDSize;

if(!lpIFD) goto MEMORY_ERROR_EXIT;

lpHeaderMap = (char *) lpIFD;

// wait untill after ImageFixup is calculated to copy IFD Stream ...

//
// Handle the image data fixup
//
//   This is the place to add Tile support and Stripp support for images
```

```
      //
      //
      // At present, there is only one strip.
      // That strip will always follow the VZNTIFFHEADER struct in the file.

5    ImageFixup.tagFixup->VO.Long = sizeof(VZNTIFFHEADER);
      ulFilePos += ImageFixup.dwSize;

if(vzn.iCertificationMethod != secGenericTIFF)
        {
          //
10        // Handle the Private Area fixup
          //

InVznFixup.tagFixup->VO.Long = sizeof(VZNTIFFHEADER)+vzn.dwImageDataSize;
        }

//
15    // Copy nearly completed for header into storage buffer
      // memcpy(lpHeaderMap,lpIFDStream,uIFDLength);

lpHeaderMap += uIFDLength;

//
20    // Map Fixup data into the buffer
      // for(fixupMap = fixupBase;fixupMap->tagFixup;fixupMap++)
        {
          if( fixupMap->data )
25          {
              memcpy(lpHeaderMap,fixupMap->data,(WORD)fixupMap->dwSize);

lpHeaderMap += fixupMap->dwSize;

free(fixupMap->data);    // Free data
              fixupMap->data = NULL;   // indicate that data is free incase of error
30          }
        }
```

```
        free(fixupBase);    // oops Thanks Bounds Checker!!!! (I forgot to free
                            // this one.  (BC pays for its self!!!!!!!!)
        free(lpIFDStream);

return(iRet);

5
    //==========================================
    ==============================

//==========================================
10  ==============================
    //****=
    // This goto helps
    // handle memory allocation errors and the like.
    //

15  MEMORY_ERROR_EXIT :

if(!iRet) iRet = VZN_ERROR_NO_MEMORY;

if(lpIFDStream) free(lpIFDStream);

if(fixupBase)
          {
20        for(fixupMap = fixupBase;fixupMap->tagFixup;fixupMap++)
            {
              if( fixupMap->data)
                {
                  free(fixupMap->data);
25              }
            } free(fixupBase);
          } return(iRet);
30  }

//////////////////////////////////////////////////////////////////
    // BuildPrivateAreaKey :
```

BANNER & ALLEGRETTI, LTD.
10 South Wacker Drive
Suite 3000
Chicago, Illinois 60606

```
//
// Build a component Key value from
//
//    szPassword + szDate + szTime + szISII
//
// Decode and Encode operate on a hash of all of the above values.
// If any of the items have changed, the hash should evaluate to
// a different value and cause the Private Area to be invalid.
// If the private area can not be decoded, ISII Certification
// can not be performed.  The image may still be viewable, but it will
// not provide ISII Certification or extensions.
//
//////////////////////////////////////////////////////////////// void PLATFORM Vzn3::BuildPrivateAreaKey(char * szPassword,char * szKeyBase)
{
  strncpy(szKeyBase,vzn.szImageTime,6);
  szKeyBase[6] = 0;
  strcat(szKeyBase,vzn.szImageDate);
  strcat(szKeyBase,szPassword);
  strcat(szKeyBase,vzn.szISII);
  strupr(szKeyBase);
}

////////////////////////////////////////////////////////////////
// RTrim : Trims the right most spaces from a zero terminated character
//         string.
//////////////////////////////////////////////////////////////// void PLATFORM Vzn3::RTrim(char * szData)
{
  int iLength = strlen(szData);

szData += (iLength-1);

while(iLength--)
    {
      if(*szData == ' ')
        {
          *szData = '\0';
          szData--;
```

```
            }
          else
            {
              break;
            }
        }
    }

//////////////////////////////////////////////////////////////////
// WritePrivateArea :
//
// This function writes the Private Area. For this function to
// be called, the image data must have been streamed. The WriteImage
// data functions cull data from the stream to handle the image fixups.
//
////////////////////////////////////////////////////////////////// int PLATFORM Vzn3::WritePrivateArea()
   {
     char szKey[VZN_KEY_SIZE];
     int  iRet = VZN_ERROR_NONE;

if(vzn.iCertificationMethod != secGenericTIFF)
       {
         switch(vzn.iCertificationMethod)
           {
             case secISIIVerification :
             case secISIIPublicKey :
                 BuildPrivateAreaKey(VZN3_SIGNATURE,szKey);
                 break;

case secISIIPrivateKey :
                 BuildPrivateAreaKey(vzn.szPassword,szKey);
                 break;
           }

Encode(szKey,lpPrivateIFD,(WORD)dwPrivateIFDSize);

if( write(hFile,lpPrivateIFD,(WORD)dwPrivateIFDSize) < 0)
           {
             iRet = VZN_ERROR_WRITE;
```

```
      }
    }
    return(iRet);
  }

//////////////////////////////////////////////////////////////////
  // ReadTiffData :
  //
  //
  //
  ////////////////////////////////////////////////////////////////// int PLATFORM Vzn3::ReadTiffData
          (
            DWORD    dwFilePointer,
            DWORD    dwTagDataLength,
            void *   lpBuffer,
            int      iBufferLength
          )
  {
    int iRet       = VZN_ERROR_NONE;
    int iReadBytes;

if(dwTagDataLength > (WORD)iBufferLength)
      {
        iReadBytes = iBufferLength;
      }
    else
      {
        iReadBytes = (WORD)dwTagDataLength;
      } if(hFile)
      {
        if( lseek(hFile,dwFilePointer,SEEK_SET) >= 0 )
          {
            if( read(hFile,lpBuffer,iReadBytes) != iReadBytes )
              {
                iRet = VZN_ERROR_READ_STRING;
              }
```

```
        }
      else
        {
          iRet = VZN_ERROR_SEEK;
        }
    }
  else if(lpImageData)
    {
      memcpy(lpBuffer,((char*)lpImageData)+dwFilePointer,iReadBytes);
    }
  else
    {
      iRet = VZN_ERROR_NODATA;
    } return(iRet);
}

////////////////////////////////////////////////////////////////
// ReadPrivateTags:
//
//  Reads the private tag area into the structure.
//
//////////////////////////////////////////////////////////////// int PLATFORM Vzn3::ReadPrivateTags()
{
  int    iRet      = VZN_ERROR_NONE;
  ptrTAG tagWalk   = NULL;
  int    iTagCount = 0;

iTagCount = *(WORD*) ((char*)lpPrivateIFD + 8);  // bypass Signature
  tagWalk = (ptrTAG)((char*)lpPrivateIFD + 10);    // bypass Signature and tag count for(;iTagCount--;tagWalk++)
    {
      switch(tagWalk->Tag)
        {
          case vptImageType :
```

```
            vzn.iImageType = (IMAGETYPE)tagWalk->VO.Short;
            break;

case vptSecurityMethod :
            vzn.iCertificationMethod = (SECURITYMETHOD) tagWalk->VO.Short;
            break;

case vptISIIVerificationData :

pCheckBlockData =
                (ptrISIIVerification) ((char*)lpPrivateIFD + tagWalk->VO.Long);

break;

case vptThumbnail :
            break;

case vptLibraryVersion :
            vzn.wLibraryVersion    = tagWalk->VO.Short;
            break;

case vptSoftwareVersion :
            vzn.dwSoftwareVersion = tagWalk->VO.Long;
            break;

case vptRequiredLegend :
                    strncpy(vzn.szLegend,(char*)lpPrivateIFD +
tagWalk->VO.Long,sizeof(vzn.szLegend));
            break;

case vptLLA :
            strncpy(vzn.szLLA,(char*)lpPrivateIFD+tagWalk->VO.Long,sizeof(vzn.szLLA));
            break;

case vptTimeSource :
            vzn.iTimeSource = (TIMESOURCE) LOWORD(tagWalk->VO.Long);
            sprintf(&vzn.szImageTime[6],".%02u",HIWORD(tagWalk->VO.Long));
            break;

case vptImageFlags :
            strncpy(vzn.szFlags,(char*)lpPrivateIFD+tagWalk->VO.Long,sizeof(vzn.szFlags));
            break;
```

```
              default :

vzn.uUpgradeNotice++;
              } if(iRet) goto EXIT_ERROR;
5         }

EXIT_ERROR :

return(iRet);
       }

//////////////////////////////////////////////////////////////////
10     // CertifyPrimarySegment
       //
       // The first segment of image data must hash to the same value.
       //
       // Primary Segment Certification will be different based on the
15     // image data content.
       //
       ////////////////////////////////////////////////////////////////// int PLATFORM Vzn3::CertifyPrimarySegment()
       {
20       int iRet = VZN_ERROR_NONE;

if(!pImp)
           {
             PTRACE("iRet = SelectImplementation();");
             iRet = SelectImplementation();
25         } if(!iRet)
           {
             PTRACE("iRet = pImp->CertifyPrimarySegment(this);");
             iRet = pImp->CertifyPrimarySegment(this);
30         }
```

BANNER & ALLEGRETTI, LTD.
10 South Wacker Drive
Suite 3000
Chicago, Illinois 60606            - 51 -

```
        return(iRet);
    } int PLATFORM Vzn3::SelectImplementation()
    {
5     int iRet = VZN_ERROR_NONE;

switch(vzn.iImageType)
        {
          case typeG4VZN2 :
              pImp = new G4VZN2Imp;
10            break;

case typeG4_Intel :
          case typeG4VZN3 :
              pImp = new G4VZN3Imp;
              break;

15        case typeCOLORVZN3 :
          case typeJPEGVZN3 :
          case typeMPEGVZN3 :
          default :
              iRet = VZN_ERROR_UNSUPPORTED_IMAGE_FORMAT;
20            break;
        } return iRet;
    }

//+++++++++++++++++++++++++++++++++++++++++++++++++
25  +++++++++++++++++++++++++++++++++++
    //+++++++++++++++++++++++++++++++++++++++++++++++++
    +++++++++++++++++++++++++++++++++++
    //+++++++++++++++++++++++++++++++++++++++++++++++++
    +++++++++++++++++++++++++++++++++++
30  //+++++++++++++++++++++++++++++++++++++++++++++++++
    +++++++++++++++++++++++++++++++++++
    //++++++++++++++++++++++++++++++++++   PUBLIC   AREA
    +++++++++++++++++++++++++++++++++++
```

BANNER & ALLEGRETTI, LTD.
10 South Wacker Drive
Suite 3000
Chicago, Illinois 60606

```
//+++++++++++++++++++++++++++++++++++++++++++++
+++++++++++++++++++++++++++++++++++
//+++++++++++++++++++++++++++++++++++++++++++++
+++++++++++++++++++++++++++++++++++
//+++++++++++++++++++++++++++++++++++++++++++++
+++++++++++++++++++++++++++++++++++
//+++++++++++++++++++++++++++++++++++++++++++++
+++++++++++++++++++++++++++++++++++

///////////////////////////////////////////////////////////////////
// Vzn3::Init :
//
// Explicitly Set all members to NULL.
//
/////////////////////////////////////////////////////////////////// int PLATFORM Vzn3::Init()
{
  int iRet = VZN_ERROR_NONE;

memset(&vzn,0,sizeof(VznData));

lpImageData       = NULL;
  lpRawData         = NULL;
  hFile             = NULL;
  dwImagePos        = NULL;
  lpIFD             = NULL;
  dwIFDSize         = NULL;
  lpPrivateIFD      = NULL;
  dwPrivateIFDSize  = NULL;
  pCheckBlockData   = NULL;
  vznOld            = NULL;

pImp              = NULL;

vzn.iLibraryError = iRet;

return(iRet);
```

```
        }
        ///////////////////////////////////////////////////////////////
        // Vzn3::Cleaup :
        //
   5    //   De-allocates any memory utilized.
        //
        /////////////////////////////////////////////////////////////// int PLATFORM Vzn3::Cleanup()
        {
  10      int iRet = VZN_ERROR_NONE;

if(lpIFD)
            {
              free(lpIFD);

lpIFD = NULL;
  15        } if(lpPrivateIFD)
            {
              free(lpPrivateIFD);

lpPrivateIFD = NULL;
  20        } if(pImp)
            {
              delete pImp;

pImp = NULL;
  25        } if(hFile)
            {
              if(hFile > 0) close(hFile);

hFile = NULL;
  30        }
```

BANNER & ALLEGRETTI, LTD.
10 South Wacker Drive
Suite 3000
Chicago, Illinois 60606

```
        vzn.iLibraryError = iRet;

return(iRet);
    }
    //////////////////////////////////////////////////////////////
 5  // Vzn3::MakeVznIFDStream : Makes a IFD and stores the value
    //                         in the structure.
    ////////////////////////////////////////////////////////////// int PLATFORM Vzn3::MakeVznIFDStream()
    {
10    int       iRet    = VZN_ERROR_NONE;

if(!iRet) iRet = MapIFDStream();

vzn.iLibraryError = iRet;

return(iRet);
    }

15  //////////////////////////////////////////////////////////////
    // Vzn3::GetVznHeader : Returns a mapped header in buffer provided.
    //                     (This one is primaraly for VB users because
    //                     VB doesn't have a pointer type.)
    //                     The Header is all of the data required
20  //                     for a TIFF Header/IFD pair.
    //
    //                     This function is useful for
    //                     formatting a TIFF IFD for
    //                     sending data to a printer, etc.
25  //
    ////////////////////////////////////////////////////////////// int PLATFORM Vzn3::GetVznHeader
              (
                void *   lpDestBuffer,
30              int      iBufferLength
              )
    {
      int iRet = VZN_ERROR_NONE;
```

```
        if(!lpIFD) iRet = MakeVznIFDStream();

if(!iRet)
          {
            memcpy(lpDestBuffer,lpIFD,iBufferLength);
          } vzn.iLibraryError = iRet;

return(iRet);
      }

///////////////////////////////////////////////////////////////
// Vzn3::Reset:
//
//    Resets varibles used for the ReadVznImageData function so that with
//    out re-opening the file an image can be re-read.
//
/////////////////////////////////////////////////////////////// int PLATFORM Vzn3::Reset()
      {
        int iRet = VZN_ERROR_NONE;

dwImagePos      = 0;
        vzn.bCertified  = FALSE;

if(pImp)
          {
            delete pImp;
            iRet = SelectImplementation();
          } if(hFile) lseek(hFile,vzn.dwImageDataOffset,SEEK_SET);

return(iRet);
      }

///////////////////////////////////////////////////////////////
// Vzn3::ReadImageData :
//
```

```
//
// This function reads image data from the file handling any
// image transformation required by the security method invoked.
//
/////////////////////////////////////////////////////////////// int PLATFORM Vzn3::ReadImageData
        (
            void       *  lpReadBuffer,
            DWORD         dwLength,
            DWORD      *  dwBytesRead
        )
{
    int iRet = VZN_ERROR_NONE;

if(!pImp)
    {
        iRet = SelectImplementation();
    } if(!iRet)
    {
        iRet = pImp->ReadData(this,lpReadBuffer,dwLength,dwBytesRead);
    } vzn.iLibraryError = iRet;

return(iRet);
}

///////////////////////////////////////////////////////////////
// Vzn3::ReadFileData :
//
//
// This function reads data from the file.
//
/////////////////////////////////////////////////////////////// int PLATFORM Vzn3::ReadFileData
        (
```

```
                    void     * lpReadBuffer,
                    DWORD      dwOffset,
                    DWORD      dwLength,
                    DWORD    * dwBytesRead
 5              )
          {
            int iRet = VZN_ERROR_NONE;

iRet = ReadTiffData
                   (
10                    dwOffset,
                      dwLength,
                      lpReadBuffer,
                      dwLength
                   );

15         if(!iRet)
             {
               *dwBytesRead = dwLength;
             }
           else
20          {
               *dwBytesRead = 0;
             } vzn.iLibraryError = iRet;

return(iRet);
25       }

//////////////////////////////////////////////////////////////
         // Vzn3::WriteVznIFDStream :
         //
         //
30       ////////////////////////////////////////////////////////////// int PLATFORM Vzn3::WriteVznIFDStream()
         {
           int iRet = VZN_ERROR_NONE;

if( write(hFile,lpIFD,(WORD)dwIFDSize) < 0 )
35          {
```

BANNER & ALLEGRETTI, LTD.
10 South Wacker Drive
Suite 3000
Chicago, Illinois 60606

```
                    iRet = VZN_ERROR_WRITE;
                } if(!iRet)
                {
 5              VZNTIFFHEADER header;

MapHeader(&header,sizeof(VZNTIFFHEADER)  +  vzn.dwImageDataSize  +
                dwPrivateIFDSize);

// Time to update the header to point to our IFD
                lseek(hFile,0,SEEK_SET);

10              if( write(hFile,&header,sizeof(VZNTIFFHEADER)) < 0 )
                    {
                      iRet = VZN_ERROR_WRITE;
                    }
                }

15      vzn.iLibraryError = iRet;

return(iRet);
    }

//////////////////////////////////////////////////////////////////
    // Vzn3::WriteImageData :
20  //
    //      Writes image data handling any transformation required to
    //      secure the image based on security method and file data type.
    //
    //////////////////////////////////////////////////////////////////

25  int PLATFORM Vzn3::WriteImageData
                (
                    void     * lpBuffer,
                    DWORD       dwLength
                )
30  {
       int iRet = VZN_ERROR_NONE;
```

- 59 -

```
        if(!pImp)
          {
            iRet = SelectImplementation();
          }
5       if(!iRet)
          {
          #if !defined(__WIN32__)
          #define SEGMENT_SIZE (16l*1024l)
            if(dwLength <= SEGMENT_SIZE)
10            {
          #endif
              iRet = pImp->WriteData(this,lpBuffer,dwLength);
          #if !defined(__WIN32__)
            }
15          else
            {
              DWORD    dwSegments = dwLength/SEGMENT_SIZE;
              DWORD    dwRemainder = dwLength%SEGMENT_SIZE;
              char huge * lpData   = (char huge *)lpBuffer;

20            while(dwSegments)
                {
                  iRet = pImp->WriteData(this,lpData,SEGMENT_SIZE);

lpData += SEGMENT_SIZE;
                  dwSegments--;
25              } if(dwRemainder)
                {
                  iRet = pImp->WriteData(this,lpData,dwRemainder);
                }
30          #undef SEGMENT_SIZE
            }
          #endif
          } if(!iRet)
35        {
            if(dwImagePos == vzn.dwImageDataSize)
```

```
            {
              if(!lpIFD)
                {
                  iRet = MakeVznIFDStream();
5               } if(!iRet)
                {
                  iRet = WritePrivateArea();
                }
10            if(!iRet)
                {
                  iRet = WriteVznIFDStream();
                }
              }
15          } vzn.iLibraryError = iRet;

return(iRet);
        }

/////////////////////////////////////////////////////////////
20      // G4VZN3_WriteVznImage_file:
        //
        // This routine writes RAW data from the file specified. The file pointer
        // should be pointing to the start of the data.
        //
25      ///////////////////////////////////////////////////////////// int PLATFORM Vzn3::WriteImageData_file(int fhSource)
        {
          #define READ_BUFFER_SIZE 8*1024 int    iRet = VZN_ERROR_NONE;
30        char   * buffer;
          int    iRead;

buffer = (char *)malloc(READ_BUFFER_SIZE);
```

- 61 -

```
            if(buffer)
            { do
              {
 5              iRead = read(fhSource,buffer,READ_BUFFER_SIZE);

if(iRead > 0) iRet = WriteImageData(buffer,iRead);
              }
              while( (iRead == READ_BUFFER_SIZE) && !iRet);

free(buffer);
10          }
            else
            {
              iRet = VZN_ERROR_NO_MEMORY;
            }

15        vzn.iLibraryError = iRet;

return(iRet);
        }

//////////////////////////////////////////////////////////////
        // Vzn3::WriteImage_mem :
20      //
        // If a memory buffer contains the ENTIRE raw image data, write
        // the data from the buffer.
        //
        //////////////////////////////////////////////////////////////

25      int PLATFORM Vzn3::WriteImageData_mem()
        {
          #define WRITE_SEGMENT_SIZE 16*1024 int      iRet     = VZN_ERROR_NONE;
          DWORD    dwBytePos = 0;

30        if(!lpIFD) iRet = MakeVznIFDStream();

if(!iRet)
          {
```

```
        do
        {
          if( (vzn.dwImageDataSize - dwBytePos) < WRITE_SEGMENT_SIZE)
          {
            iRet  = WriteImageData
                  (
                    (char*)lpRawData + dwBytePos,
                    vzn.dwImageDataSize - dwBytePos
                  );

dwBytePos = vzn.dwImageDataSize;
          }
          else
          {
            iRet = WriteImageData
                  (
                    (char*)lpRawData + dwBytePos,
                    WRITE_SEGMENT_SIZE
                  );

dwBytePos += WRITE_SEGMENT_SIZE;
          }
        }
        while( (dwBytePos < vzn.dwImageDataSize) && !iRet);

if(!iRet)
        {
          iRet = WriteVznIFDStream();
        }
      } vzn.iLibraryError = iRet;

return(iRet);
    }

/////////////////////////////////////////////////////////////////
    // Vzn3::DecodeTiffTags :
    //
    //    Decodes tiff tags into the structure from a memory buffer containing
    //    the TIFF tag area.
    //
```

```
        //////////////////////////////////////////////////////////////////// int PLATFORM Vzn3::DecodeTiffTags(ptrTAG tags,int iTagCount)
        {
            int       iRet       = VZN_ERROR_NONE;
 5          ptrTAG    tagWalk    = NULL;

// The certification method is GenericTIFF until the tagINVZNPrivateArea
            // is found.

vzn.iCertificationMethod = secGenericTIFF;

for(tagWalk = tags;iTagCount--;tagWalk++)
10          {
              switch(tagWalk->Tag)
                {
                  case tagNewSubfileType  : // We don't care
                      break;

15                case tagSubfileType     : // We don't care
                      break;

case tagImageWidth      :
                      vzn.dwWidth = tagWalk->VO.Long;
                      break;

20                case tagImageLength     :
                      vzn.dwLength = tagWalk->VO.Long;
                      break;

case tagBitsPerSample   : // Doesn't matter for us...
                      break;

25                case tagCompression     :
                      vzn.dwCompression = tagWalk->VO.Short;
                      break;

case tagPhotometricInterp :
                      vzn.dwPhotoMetricInterpretation = tagWalk->VO.Short;
30                    break;

case tagFillOrder       :
```

BANNER & ALLEGRETTI, LTD.
10 South Wacker Drive
Suite 3000
Chicago, Illinois 60606

- 64 -

```
            vzn.dwFillOrder = tagWalk->VO.Short;
            break;

case tagDocumentName    :
            iRet = ReadTiffData
                (
                    tagWalk->VO.Long,
                    tagWalk->Count,
                    vzn.szDocumentId,
                    sizeof(vzn.szDocumentId) - 1  // NULL Terminator
                );
            break;

case tagImageDescription :
            iRet = ReadTiffData
                (
                    tagWalk->VO.Long,
                    tagWalk->Count,
                    vzn.szDescription,
                    sizeof(vzn.szDescription) - 1  // NULL Terminator
                );
            break;

case tagStripOffsets    :
            vzn.dwImageDataOffset = tagWalk->VO.Long;
            break;

case tagOrientation     :
            vzn.cRotation = (char)tagWalk->VO.Short;
            break;

case tagRowsPerStrip    : // We don't care.. (Yet)
            break;

case tagStripByteCounts :
            vzn.dwImageDataSize = tagWalk->VO.Long;
            break;

case tagXResolution     : // Uh we really don't care (Yet) but....
            iRet = ReadTiffData
                (
                    tagWalk->VO.Long,
```

- 65 -

```
                          tagWalk->Count * 8,
                          &vzn.dwResolution,
                          sizeof(DWORD)
                     );
                 break;

case tagYResolution    : // See XResolution
                 break;

case tagPageName       :
                 iRet = ReadTiffData
                     (
                         tagWalk->VO.Long,
                         tagWalk->Count,
                         vzn.szImageId,
                         sizeof(vzn.szImageId) - 1 // NULL Terminator
                     );
                 break;

case tagSoftware       : // We really don't care! (INVZN94)
                 break;

case tagDateTime       : // This is fun...
                 {
                     char szDateTime[20]; // TIFF Date/Time size iRet = ReadTiffData
                         (
                             tagWalk->VO.Long,
                             tagWalk->Count,
                             szDateTime,
                             sizeof(szDateTime)
                         );

vzn.szImageDate[0] = szDateTime[0];
                     vzn.szImageDate[1] = szDateTime[1];
                     vzn.szImageDate[2] = szDateTime[2];
                     vzn.szImageDate[3] = szDateTime[3];
                     vzn.szImageDate[4] = szDateTime[5];
                     vzn.szImageDate[5] = szDateTime[6];
                     vzn.szImageDate[6] = szDateTime[8];
                     vzn.szImageDate[7] = szDateTime[9];
```

```
                    vzn.szImageTime[0] = szDateTime[11];
                    vzn.szImageTime[1] = szDateTime[12];
                    vzn.szImageTime[2] = szDateTime[14];
                    vzn.szImageTime[3] = szDateTime[15];
                    vzn.szImageTime[4] = szDateTime[17];
                    vzn.szImageTime[5] = szDateTime[18];
                }
                break;

case tagArtist        :
                iRet = ReadTiffData
                    (
                        tagWalk->VO.Long,
                        tagWalk->Count,
                        vzn.szCreator,
                        sizeof(vzn.szCreator) - 1 // NULL Terminator
                    );
                break;

case tagINVZNISII     :
                iRet = ReadTiffData
                    (
                        tagWalk->VO.Long,
                        tagWalk->Count,
                        vzn.szISII,
                        sizeof(vzn.szISII)
                    );
                break;

case tagINVZNPrivateArea :

vzn.bISII = TRUE;  // The presense of this tag indicates that
                                   // the image has ISII certification data.
                {
                    lpPrivateIFD = calloc(1,(WORD)(tagWalk->Count + 10));

if(lpPrivateIFD)
                    {
                        char szKey[VZN_KEY_SIZE];

// Read the data into the allocated buffer
```

```
iRet = ReadTiffData
    (
        tagWalk->VO.Long,
        tagWalk->Count,
        lpPrivateIFD,
        (WORD)tagWalk->Count
    );

if(!iRet)
{
    // Attempt to decode the buffer.  If the buffer
    // cannot be decoded one of three things
    // are known.
    // 1) The user typed in an incorrect password.
    // 2) The time stamp has been altered
    // 3) The ISII number has been altered dwPrivateIFDSize = tagWalk->Count;

if(strlen(vzn.szPassword))
    {
        BuildPrivateAreaKey(vzn.szPassword,szKey);
    }
    else
    {
        BuildPrivateAreaKey(VZN3_SIGNATURE,szKey);
    }

Decode(szKey,lpPrivateIFD,(WORD)tagWalk->Count);

if(!strcmp((char*)lpPrivateIFD,VZN3_SIGNATURE))
    {
        // At this point we know that the ISII number
        // and the TimeDate stamp are ok, but the
        // image is still not fully certified.

vzn.bPasswordValid = TRUE;

iRet = ReadPrivateTags();
    }
    else
    {
```

- 68 -

```
                Cleanup();
                iRet = VZN_ERROR_CANNOT_CERTIFY;
            }
          }
        }
        else
        {
          iRet = VZN_ERROR_NO_MEMORY;
        }
      }
      break;

// Reserved tags.

case tagINVZNReserved1   :
      case tagINVZNReserved2   :
      case tagINVZNReserved3   :
          vzn.uUpgradeNotice++;

// Notice : No Break on purpose!

// These are tags that are known, but not substantially
      // used.

case tagSamplesPerPixel  :
      case tagXPosition        :
      case tagYPosition        :
      case tagPageNumber       :

default :
          vzn.uUnHandledTags++;
    } if(iRet) goto EXIT_ERROR;

} if(vzn.bISII && vzn.bPasswordValid && vzn.bInVzn && hFile)
  {
    // Well, this is a good sign. The image has passed all tests
    // until this point. We know a lot, but lets look into the
```

```
         // image its self...

iRet = CertifyPrimarySegment();
         }

EXIT_ERROR:

5       vzn.iLibraryError = iRet;

return(iRet);
       }

/////////////////////////////////////////////////////////////
       // Vzn3::ReadHeader :
10     //
       // Reads a TIFF style image header from a file.
       //
       // Sets flags if Image is an ISII Certified image; tests for
       // image changes and generally gets things ready.
15     //
       ///////////////////////////////////////////////////////////// int PLATFORM Vzn3::ReadHeader()
       {
         VZNTIFFHEADER header;
20       ptrTAG     tags       = NULL;
         int        iTagCount  = 0;
         int        iRet       = VZN_ERROR_NONE;

// Read in header and check for InVzn Signature lseek(hFile,0,SEEK_SET);

25       if( read(hFile,&header,sizeof(VZNTIFFHEADER)) != sizeof(VZNTIFFHEADER) )
           {
             iRet = VZN_ERROR_READ_HEADER;
             goto EXIT_ERROR;
           }
30       else
```

- 70 -

```
        {
          if(!strcmp(header.szSignature,VZN3_SIGNATURE))
          {
            vzn.bInVzn = TRUE;
5         }
          else if(!strncmp(header.cByteOrder,"2000",4) )
          {
            VZN_HEADER oldImage;

lseek(hFile,0,SEEK_SET);

10          PTRACE("iRet = VznGetHeader(hFile,&oldImage);");
            iRet = VznGetHeader(hFile,&oldImage);

if(!iRet)
            {
              vzn.bInVzn    = TRUE;
15            vzn.iImageType = typeG4VZN2;

PTRACE("iRet = Vzn2Hdr_2_Vzn3Hdr(this,&oldImage);");
              iRet = Vzn2Hdr_2_Vzn3Hdr(this,&oldImage);

vzn.dwImageDataOffset = oldImage.lImageDataOffset;
            }

20          if(!iRet)
            {
              PTRACE("iRet = CertifyPrimarySegment();");
              iRet = CertifyPrimarySegment();
            }

25          goto EXIT_OLD_FORMAT;
          }
        } if(header.uFortyTwo == 0x2A)
        {
30        // Intel order TIFF
          vzn.iImageType = typeG4_Intel;
        }
        else
        {
```

- 71 -

```
        if(header.uFortyTwo == 0x2A00)
          {
            // Motorola order TIFF
            vzn.iImageType = typeG4_Motorola;

5           iRet = VZN_ERROR_UNSUPPORTED_IMAGE_FORMAT;
            goto EXIT_ERROR;
          }
        else
          {
10          iRet = VZN_ERROR_UNSUPPORTED_IMAGE_FORMAT;
            goto EXIT_ERROR;
          }
        }

// Position file pointer to IFD 15      if( lseek(hFile,header.dwFirstIFD,SEEK_SET) < 0)
          {
            iRet = VZN_ERROR_SEEK;
            goto EXIT_ERROR;
          }

20      // Get number of Tags if( read(hFile,&iTagCount,sizeof(WORD)) != sizeof(WORD) )
          {
            iRet = VZN_ERROR_READ_HEADER;
            goto EXIT_ERROR;
25        }

// Allocate Tag buffer tags = (ptrTAG) calloc(iTagCount+1,sizeof(TAG));

if(!tags)
          {
30          iRet = VZN_ERROR_NO_MEMORY;
            goto EXIT_ERROR;
          }
```

```
       if( (WORD)read(hFile,tags,sizeof(TAG) * iTagCount) != sizeof(TAG) * iTagCount)
         {
           iRet = VZN_ERROR_READ_HEADER;
           goto EXIT_ERROR;
 5       }

PTRACE("iRet = DecodeTiffTags(tags,iTagCount);");
       iRet = DecodeTiffTags(tags,iTagCount);

EXIT_ERROR:
     EXIT_OLD_FORMAT:

10     if(tags) free(tags);

vzn.iLibraryError = iRet;

return(iRet);
     }
     /////////////////////////////////////////////////////////////////
15   // Vzn3::Open :
     //
     // Opens an InVzn TIFF based file or a generic TIFF.
     //
     // szFileName : The actual file name (Fully qualified DOS file)
20   //              Drive:\PATH\FILE.EXT
     //
     // iMode : _____
     //          openCreate
     //
25   //          Opens the image in create mode.  Image attributes such as
     //          Description and Page ID should be set prior to calling this
     //          function.  A typical order of operation is:
     //
     //                  SetAttributes
30   //                  Open
     //                  Write ... Write  (Raw image data)
     //                  Flush
     //                  Close
     //
35   //
     //          Open create is resposible for Time-Stamping and ISII stamping
     //          an image.
```

```
//
//
//         openRead
//
//         Opens an already existing VZN image file.  The file can be
//         a VZN2, VZN3, or Intel Ordered Group4 Tiffs.
//         Once a file has been opened attributes are set.  Therefore a
//         typical usage sequence would look like this:
//
//         Open
//         GetAttribute ....   (VZN3_ATTR_...)
//         ReadImageData ....  (Provides RAW image data)
//         Close
//
//
//
//         openUpdate
//
//         This mode is provided to allow changes to image attributes
//         that do not effect the integrity of the image data.  If you
//         must change image data, you MUST create a new image.
//         Order of operation:
//
//         Open
//         GetAttribute ...
//         SetAttribute ...
//         Update
//         Close
//
//         Note that you may not set read only attributes
//         like the image idenfification ("ISII") number.  The library
//         will not allow you to change them.
//
// **************************
//
// NOTE : If this function is called, there must also be a call for Vzn3::Close regardless
//        of the error return status from this function.
//
// **************************
//
///////////////////////////////////////////////////////////////
```

```
int PLATFORM Vzn3::Open(char * szFileName,OpenMode iMode)
{
  int iRet = VZN_ERROR_NONE;

switch(iMode)
5   {
    default :
        iRet = VZN_ERROR_UNKNOWN_OPEN_MODE;
        State = Error;
        break;

10  case openCreate:
        _fmode = O_BINARY;
        hFile = open(szFileName,O_BINARY|O_CREAT|O_RDWR,S_IREAD|S_IWRITE);

if(hFile > 0)
        {
15        if(vzn.iCertificationMethod)
          {
            #if !defined(DISABLE_SECURED_IMAGE_CREATION)
            ISIIDevice * Plug = GetISIIDevice();
            iRet = Plug->GetError();
20          if(!iRet)
              {
                iRet = Plug->GetISIINumber((ptrISII)&vzn.szISII,FALSE);
              }
            #else
25          iRet = VZN_ERROR_FEATURE_NOT_SUPPORTED;
            #endif
          } if(!iRet)
          {
30          AssembleImageTimeAndPositionCodings();

if(vzn.iCertificationMethod != secGenericTIFF)
            {
              iRet = CreatePrivateArea();
            }
35        }
        }
        else
```

```
                {
                  iRet = VZN_ERROR_FILE_CREATE;
                } if(iRet)
 5              {
                  State = Error;
                }
                else
                {
10                State = CreateOperation;
                }
                break;

case openRead:
                _fmode = O_BINARY;
15              PTRACE("hFile = open(szFileName,O_BINARY,S_IREAD);");
                    hFile = open(szFileName,O_BINARY,S_IREAD);

if(hFile > 0)
                {
                  PTRACE("iRet = ReadHeader();");
20                iRet = ReadHeader();
                }
                else
                {
                  iRet = VZN_ERROR_FILE_OPEN;
25              } if(iRet)
                {
                  State = Error;
                }
30              else
                {
                  State = ReadOperation;
                }
                break;

35          case openUpdate:
                _fmode = O_BINARY;
                    hFile = open(szFileName,O_BINARY|O_RDWR,S_IREAD|S_IWRITE);
```

```
                if(hFile > 0)
                {
                  iRet = ReadHeader();
                }
                else
                {
                  iRet = VZN_ERROR_FILE_OPEN;
                } if(!iRet)
                {
                  iRet = CertifyImage();
                } if(!iRet)
                {
                  vznOld = new VznData;

if(vznOld)
                   {
                     *vznOld = vzn;
                   }
                  else
                   {
                     iRet = VZN_ERROR_NO_MEMORY;
                   }
                } if(!iRet)
                {
                  if(lseek(hFile,sizeof(VZNTIFFHEADER)+vzn.dwImageDataSize,SEEK_SET)<0)
                   {
                     iRet = VZN_ERROR_SEEK;
                   }
                } if(iRet)
                {
                  State = Error;
                }
                else
                {
```

```
                    State = UpdateOperation;
                }
              break;
         }
5      vzn.iLibraryError = iRet;

return(iRet);
    }

//////////////////////////////////////////////////////////////
    // Vzn3::Flush :
10  //
    //  Flush write and update VZN Tiff header with image data size.
    //
    //  This function is called upon when the user doesn't know the size of
    //  the fully compressed image prior to writing the data out.
15  //
    ////////////////////////////////////////////////////////////// int PLATFORM Vzn3::Flush()
    {
      int iRet = VZN_ERROR_NONE;

20    if(vzn.dwImageDataSize == 0xFFFFFFFF)
         {
           vzn.dwImageDataSize = dwImagePos;

if(pImp)
              {
25              iRet = pImp->FlushWrite(this);
              }
           else
              {
                iRet = 200;  // This is a major error;
30            } if(!lpIFD)
              {
                iRet = MakeVznIFDStream();
              }
```

```
            if(!iRet)
              {
                iRet = WritePrivateArea();
              }

5           if(!iRet)
              {
                iRet = WriteVznIFDStream();
              }

}

10      vzn.iLibraryError = iRet;

return(iRet);
      }

//////////////////////////////////////////////////////////////
      // Vzn3::Update:
15    //
      //   Update Image file tags/User Security.
      //
      ////////////////////////////////////////////////////////////// int PLATFORM Vzn3::Update()
20    {
        int iRet = VZN_ERROR_NONE;

if(vznOld->iCertificationMethod == vzn.iCertificationMethod)
          if(vznOld->iImageType == vzn.iImageType)
            {
25            if(!lpIFD)
                {
                  iRet = MakeVznIFDStream();
                } if(!iRet)
30              {
                  iRet = WritePrivateArea();
                } if(!iRet)
```

```
          {
            iRet = WriteVznIFDStream();
          }
          return iRet;
 5      } return VZN_ERROR_CANNOT_UPDATE_SECURITY;
      }

///////////////////////////////////////////////////////////////
      // Vzn3::Close :
10    //
      //   Close Image file and de-allocate any memory allocated.
      //
      //
      ///////////////////////////////////////////////////////////////

15    int PLATFORM Vzn3::Close()
      {
        int iRet = VZN_ERROR_NONE;

// Free any memory allocated iRet = Cleanup();

20      if(!iRet)
          {
            // Close the file
            if(hFile > 0) close(hFile);

hFile = 0;
25        } vzn.iLibraryError = iRet;

return(iRet);
      }
```

```
//////////////////////////////////////////////////////////////
// Vzn3::CertifyImage :
//
//      Reads an open image for image hash verification.
//
////////////////////////////////////////////////////////////// int PLATFORM Vzn3::CertifyImage()
{
  int   iRet = VZN_ERROR_NONE;
  DWORD dwBytesRead = 0;
  DWORD dwTotal     = 0;
  char  szBuffer[8*1024];

do
  {
    iRet = ReadImageData
            (
              szBuffer,
              sizeof(szBuffer),
              &dwBytesRead
            );

dwTotal+=dwBytesRead;
  }
  while( (dwTotal < vzn.dwImageDataSize) && !iRet );

if(iRet == VZN_WARNING_READ_OVERFLOW) iRet = VZN_ERROR_NONE;

vzn.iLibraryError = iRet;

return(iRet);
} int PLATFORM Vzn3::internalSetImageAttribute(DWORD dwAttribute,DWORD dwValue,DWORD)
{
  int iRet = VZN_ERROR_NONE;

switch(dwAttribute)
  {
    // Read/Write Attributes
```

```
            case VZN3_ATTR_IMAGE_ID :
                strcpy(vzn.szImageId,(char*)dwValue);
                break;

case VZN3_ATTR_DOCUMENT_ID :
 5              strcpy(vzn.szDocumentId,(char*)dwValue);
                break;

case VZN3_ATTR_DESCRIPTION :
                strcpy(vzn.szDescription,(char*)dwValue);
                break;

10          case VZN3_ATTR_CREATOR :
                strcpy(vzn.szCreator,(char*)dwValue);
                break;

case VZN3_ATTR_REQUIRED_LEGEND :
                strcpy(vzn.szLegend,(char*)dwValue);
15              break;

case VZN3_ATTR_IMAGE_FLAGS :
                strcpy(vzn.szFlags,(char *)dwValue);
                break;

case VZN3_ATTR_ROTATION :
20              vzn.cRotation = (char)dwValue;
                break;

case VZN3_ATTR_IMAGE_DATA_SIZE :
                vzn.dwImageDataSize = dwValue;
                break;

25          case VZN3_ATTR_IMAGE_WIDTH :
                vzn.dwWidth = dwValue;
                break;

case VZN3_ATTR_IMAGE_LENGTH :
                vzn.dwLength = dwValue;
30              break;

case VZN3_ATTR_RESOLUTION :
                vzn.dwResolution = dwValue;
```

```
              break;

case VZN3_ATTR_IMAGE_TYPE :
              vzn.iImageType = (VznImageType) dwValue;
              break;

5         case VZN3_ATTR_SECURITY_METHOD :
              vzn.iCertificationMethod = (VznSecurity) dwValue;
              break;

case VZN3_ATTR_SOFTWARE_VERSION :
              vzn.dwSoftwareVersion = dwValue;
10            break;

case VZN3_ATTR_FILLORDER :
              vzn.dwFillOrder = dwValue;
              break;

case VZN3_ATTR_PHOTOMETRICINTERP :
15            vzn.dwPhotoMetricInterpretation = dwValue;
              break;

// Write Only Attributes case VZN3_ATTR_PASSWORD :
              strcpy(vzn.szPassword,(char*)dwValue);
20            break;

// Read Only Attributes
          case VZN3_ATTR_ISII_STRING :
              if(vzn.iImageType == typeG4VZN2) strcpy(vzn.szISII,(char*)dwValue);
              break;

25        case VZN3_ATTR_DATE :
              if(vzn.iImageType == typeG4VZN2) strcpy(vzn.szImageDate,(char*)dwValue);
              break;

case VZN3_ATTR_TIME :
              if(vzn.iImageType == typeG4VZN2) strcpy(vzn.szImageTime,(char*)dwValue);
30            break;
```

```
              case VZN3_ATTR_IMAGE_DATA_OFFSET :
              case VZN3_ATTR_LIBRARY_VERSION :
              case VZN3_ATTR_IS_PASSWORD_VALID :
              case VZN3_ATTR_IS_ISII_IMAGE :
  5           case VZN3_ATTR_IS_IMAGE_CERTIFIED :
              case VZN3_ATTR_IS_INVZN_IMAGE :
              case VZN3_ATTR_LAST_LIBRARY_ERROR :
              case VZN3_ATTR_UNHANDLED_TAGS :
              case VZN3_ATTR_UPGRADE_NOTICE :
 10           case VZN3_ATTR_COMPRESSION :
              case VZN3_ATTR_LLA :
              case VZN3_ATTR_TIME_SOURCE :
                  iRet = VZN_WARNING_READ_ONLY_ARRITBUTE_SET;
                  break;

15       default :
              iRet = VZN_WARNING_INVALID_ATTRIBUTE;
          } vzn.iLibraryError = iRet;

return iRet;
 20   } int PLATFORM Vzn3::SetImageAttribute(DWORD dwAttribute,char * szValue)
      {
        return internalSetImageAttribute(dwAttribute,(DWORD)szValue);
      }
 25   int PLATFORM Vzn3::SetImageAttribute(DWORD dwAttribute,DWORD dwValue,DWORD
      dwLength)
      {
        return internalSetImageAttribute(dwAttribute,dwValue,dwLength);
      }

30   int PLATFORM Vzn3::CopyAttributes(Vzn3 & Source)
      {
          memcpy(vzn.szImageId       ,Source.vzn.szImageId,sizeof(vzn.szImageId));
          memcpy(vzn.szDocumentId    ,Source.vzn.szDocumentId,sizeof(vzn.szDocumentId));
          memcpy(vzn.szDescription   ,Source.vzn.szDescription,sizeof(vzn.szDescription));
 35       memcpy(vzn.szCreator       ,Source.vzn.szCreator,sizeof(vzn.szCreator));
          memcpy(vzn.szFlags         ,Source.vzn.szFlags,sizeof(vzn.szFlags));
```

```
            vzn.cRotation       = Source.vzn.cRotation;

vzn.dwWidth                      = Source.vzn.dwWidth;
            vzn.dwLength                     = Source.vzn.dwLength;
            vzn.dwResolution                 = Source.vzn.dwResolution;
5           vzn.dwFillOrder                  = Source.vzn.dwFillOrder;
            vzn.dwPhotoMetricInterpretation  = Source.vzn.dwPhotoMetricInterpretation;

vzn.iImageType      = Source.vzn.iImageType;

if(vzn.iImageType == typeG4VZN2)
              {
10              vzn.iImageType = typeG4VZN3;
              } return VZN_ERROR_NONE;
          } int  PLATFORM   Vzn3::internalGetImageAttribute(DWORD   dwAttribute,DWORD
15        dwValue,DWORD dwLength)
          {
            int iRet = VZN_ERROR_NONE;

switch(dwAttribute)
              {
20            // Read/Write Attributes
              case VZN3_ATTR_IMAGE_ID :
                  strncpy((char*)dwValue,vzn.szImageId,(WORD)dwLength);
                  break;

case VZN3_ATTR_DOCUMENT_ID :
25                strncpy((char*)dwValue,vzn.szDocumentId,(WORD)dwLength);
                  break;

case VZN3_ATTR_ISII_STRING :
                  strncpy((char*)dwValue,vzn.szISII,(WORD)dwLength);
                  break;

30            case VZN3_ATTR_DESCRIPTION :
                  strncpy((char*)dwValue,vzn.szDescription,(WORD)dwLength);
                  break;
```

```
        case VZN3_ATTR_CREATOR :
            strncpy((char*)dwValue,vzn.szCreator,(WORD)dwLength);
            break;

case VZN3_ATTR_REQUIRED_LEGEND :
            strncpy((char*)dwValue,vzn.szLegend,(WORD)dwLength);
            break;

case VZN3_ATTR_LLA :
            strncpy((char*)dwValue,vzn.szLLA,(WORD)dwLength);
            break;

case VZN3_ATTR_DATE :
            strncpy((char*)dwValue,vzn.szImageDate,(WORD)dwLength);
            break;

case VZN3_ATTR_TIME :
            strncpy((char*)dwValue,vzn.szImageTime,(WORD)dwLength);
            break;

case VZN3_ATTR_IMAGE_FLAGS :
            strncpy((char*)dwValue,vzn.szFlags,(WORD)dwLength);
            break;

case VZN3_ATTR_ROTATION :
            *(DWORD*) dwValue = vzn.cRotation;
            break;

case VZN3_ATTR_IMAGE_DATA_SIZE :
            *(DWORD*) dwValue = vzn.dwImageDataSize;
            break;

case VZN3_ATTR_IMAGE_WIDTH :
            *(DWORD*) dwValue = vzn.dwWidth;
            break;

case VZN3_ATTR_IMAGE_LENGTH :
            *(DWORD*) dwValue = vzn.dwLength;
            break;

case VZN3_ATTR_RESOLUTION :
            *(DWORD*) dwValue = vzn.dwResolution;
```

```
            break;

case VZN3_ATTR_IMAGE_TYPE :
            *(DWORD*) dwValue = vzn.iImageType;
            break;

5      case VZN3_ATTR_SECURITY_METHOD :
            *(DWORD*) dwValue = vzn.iCertificationMethod;
            break;

case VZN3_ATTR_SOFTWARE_VERSION :
            *(DWORD*) dwValue = vzn.dwSoftwareVersion;
10          break;

// Write Only Attributes case VZN3_ATTR_PASSWORD :
            iRet = VZN_WARNING_WRITE_ONLY_ATTRIBUTE_READ;
            break;

15      // Read Only Attributes case VZN3_ATTR_IMAGE_DATA_OFFSET :
            *(DWORD*) dwValue = vzn.dwImageDataOffset;
            break;

case VZN3_ATTR_LIBRARY_VERSION :
20          *(DWORD*) dwValue = vzn.wLibraryVersion;
            break;

case VZN3_ATTR_IS_PASSWORD_VALID :
            *(DWORD*) dwValue = vzn.bPasswordValid;
            break;

25      case VZN3_ATTR_IS_ISII_IMAGE :
            *(DWORD*) dwValue = vzn.bISII;
            break;

case VZN3_ATTR_IS_IMAGE_CERTIFIED :
            *(DWORD*) dwValue = vzn.bCertified;
30          break;
```

```
            case VZN3_ATTR_IS_INVZN_IMAGE :
                *(DWORD*) dwValue = vzn.bInVzn;
                break;

case VZN3_ATTR_LAST_LIBRARY_ERROR :
 5              *(DWORD*) dwValue = vzn.iLibraryError;
                break;

case VZN3_ATTR_UNHANDLED_TAGS :
                *(DWORD*) dwValue = vzn.uUnHandledTags;
                break;

10          case VZN3_ATTR_UPGRADE_NOTICE :
                *(DWORD*) dwValue = vzn.uUpgradeNotice;
                break;

case VZN3_ATTR_COMPRESSION :
                *(DWORD*) dwValue = vzn.dwCompression;
15              break;

case VZN3_ATTR_PHOTOMETRICINTERP :
                *(DWORD*) dwValue = vzn.dwPhotoMetricInterpretation;
                break;

case VZN3_ATTR_FILLORDER :
20              *(DWORD*) dwValue = vzn.dwFillOrder;
                break;

case VZN3_ATTR_TIME_SOURCE :
                *(DWORD*) dwValue = vzn.iTimeSource;
                break;

25          default :
                iRet = VZN_WARNING_INVALID_ATTRIBUTE;
        } return iRet;
    }

30  int PLATFORM Vzn3::GetImageAttribute(DWORD dwAttribute,char * szValue,DWORD dwLength)
    {
```

```
        return internalGetImageAttribute(dwAttribute,(DWORD)szValue,dwLength);
    }
    int PLATFORM Vzn3::GetImageAttribute(DWORD dwAttribute,DWORD * dwValue,DWORD
    dwLength)
5   {
        return internalGetImageAttribute(dwAttribute,(DWORD)dwValue,dwLength);
    }
    DWORD PLATFORM Vzn3::GetImageAttribute(DWORD dwAttribute)
    {
10      DWORD dwValue;

internalGetImageAttribute(dwAttribute,(DWORD)&dwValue);

return dwValue;
    }

////////////////////////////////////////////////////////////////////
15  // Vzn3::GetErrorString :
    //
    // Returns a user readable string indicating the nature of an error
    //
    ////////////////////////////////////////////////////////////////////

20  #if defined(_Windows) || defined(_WINDOWS)
    extern "C" HINSTANCE _hInstance;
    #endif int PLATFORM Vzn3::GetErrorString(int iCode,char * szBuffer,int iLength)
    {
25      #if !defined(_Windows) && !defined(_WINDOWS)
        int iWalk = 0;
        do
        {
            if(__ISL_VZN3_ErrorTable[iWalk].uiErrorCode == iCode)
30          {
                strncpy(szBuffer,__ISL_VZN3_ErrorTable[iWalk].szErrorText,iLength);
                break;
            } iWalk++;
35      }
```

- 89 -

```
          while(__ISL_VZN3_ErrorTable[iWalk].uiErrorCode  <  0xFFFF);
       #else
          LoadString(_hInstance,VZN_ERROR_BASE + iCode,szBuffer,iLength);
       #endif 5        return(FALSE);
       }

/////////////////////////////////////////////////////////////////
       /////////////////////////////////////////////////////////////////
       /////////////////////////////////////////////////////////////////

10     /////////////////////////////////////////////////////////////////
       // VZN3.H
       //
       //    Describes the interface to inVzn file format class.
       //
15     ///////////////////////////////////////////////////////////////// ifndef __VZN3_H
       #define __VZN3_H
       #include <platform.h> if !defined(_Windows)
20        struct __ErrorTable
          {
            unsigned int   uiErrorCode;
            char        * szErrorText;
          };

25        extern
          #if defined(__cplusplus)
          "C"
          #endif
          struct __ErrorTable __ISL_VZN3_ErrorTable[];
30     #endif if !defined(__VZNTIFF_H)
       #    include <vzntiff.h>
       #endif
```

- 90 -

```
#if !defined(__ISL_HASH_H)
#    include <isl_hash.h>
endif if !defined(RC_INVOKED) && defined(__cplusplus)
////////////////////////////////////////////////////////////////
// Vzn3Internal
//
//    Base class used to represent the specific data handlers for each of
//    the image data contents.
//
//////////////////////////////////////////////////////////////// class Vzn3Internal
{
  private :

public :

virtual int   ReadData(class VZN_CLASS Vzn3 * pVzn,void * lpBuffer,DWORD
dwLength,DWORD * lpdwBytesRead) = 0;
       virtual int   WriteData(class VZN_CLASS Vzn3 * pVzn,void * lpBuffer,DWORD
dwLength)                = 0;
       virtual int CertifyPrimarySegment(class VZN_CLASS Vzn3 * pVzn)
              = 0;
       virtual int GetSecurityData(class VZN_CLASS Vzn3 * pVzn)
              = 0;
       virtual int SetSecuirytData(class VZN_CLASS Vzn3 * pVzn)
              = 0;
       virtual int FlushWrite(class VZN_CLASS Vzn3 * pVZn)
              = 0;
};

class G4VZN3Imp : public Vzn3Internal
{
  private :

HASH            hashRead;       // Used when reading image file.
```

```
        HASH         hashCache;      // Storage area for inter-buffer
                                     // hash storage: i.e., assume
                                     // a buffer with 48 bytes.  The
                                     // buffer contains 2 full HASH
                                     // segments and 2 extra DWORDS that
                                     // can not be used yet; the extra data
                                     // is stored here until
                                     // the next call.
                                     // The size of this member is int          iCacheCount;    // Number of items in the
                                     // "Hash cache"

DWORD        dwOffDWORDStore;   // Place to stash buffer bytes
                                     // that do not fall into a DWORD:
                                     // i.e., assume a buffer with
                                     // 42 bytes.  The buffer contains
                                     // two full HASH segments and 2
                                     // Overflow bytes.  The extra bytes
                                     // are stored here until the
                                     // next call.

int          iByteCount;     // number of items in the
                                     // dwOffDWORDStore area char    *    lpsPrimarySegment; // Storage area for primary segment
                                     // data.

int          iPSByteCount;   // Primary Segment usage byte count enum SegmentBufferStatus
        {
           segWrite     = 0,   // Just write it ....
           segInPlace   = 1,   // Buffer has been altered in stream
           segPartial   = 2,   // Buffer contained only some of the data
           segFull      = 3,   // Segment1 data is full ... write it

};

void   Init();
```

```
            void    BuildImageDataSegment1Key(class VZN_CLASS Vzn3 * pVzn,char *
        szPassword,char * szKeyBase);
            DWORD   CreateSegment1Hash(DWORD * lpBuffer,int iLength);
            void    MangleSegmentOne(class Vzn3 * pVzn,void * lpBuffer,DWORD dwSegmentSize);
            int     HandlePrimarySegment(class VZN_CLASS Vzn3 * pVzn,void * lpBuffer,DWORD
        dwLength,SegmentBufferStatus & Stat,DWORD & dwUsed);

public :
            int     ReadData(class VZN_CLASS Vzn3 * pVzn,void * lpBuffer,DWORD
        dwLength,DWORD * lpdwBytesRead);
            int WriteData(class VZN_CLASS Vzn3 * pVzn,void * lpBuffer,DWORD dwLength);
            int CertifyPrimarySegment(class VZN_CLASS Vzn3 * pVzn);
            int GetSecurityData(class VZN_CLASS Vzn3 * pVzn);
            int SetSecuirytData(class VZN_CLASS Vzn3 * pVzn);
            int FlushWrite(class VZN_CLASS Vzn3 * pVZn);

G4VZN3Imp();
            ~G4VZN3Imp();
        };

class G4VZN2Imp : public Vzn3Internal
        {
        private :
            char    sBufferStash[4096];  // Storage for a read buffer
            int     iBufferContent;      // Start position in buffer for data
            int     iBufferSize;         // Number of total bytes in buffer
            BOOL    bReading;
            BOOL    bFirstSector;
            DWORD   dwLogicalLocation;

void    Init();
            int     ReadSectorBlock(int hFile,void * lpBuffer,int * iRet);
            DWORD   CalcImageDataSize(class VZN_CLASS Vzn3 * pVzn);

public :
            int     ReadData(class VZN_CLASS Vzn3 * pVzn,void * lpBuffer,DWORD
        dwLength,DWORD * lpdwBytesRead);
            int WriteData(class VZN_CLASS Vzn3 * pVzn,void * lpBuffer,DWORD dwLength);
            int CertifyPrimarySegment(class VZN_CLASS Vzn3 * pVzn);
            int GetSecurityData(class VZN_CLASS Vzn3 * pVzn);
            int SetSecuirytData(class VZN_CLASS Vzn3 * pVzn);
            int FlushWrite(class VZN_CLASS Vzn3 * pVZn);
```

```
            G4VZN2Imp();
            ~G4VZN2Imp();

};

///////////////////////////////////////////////////////////
  5     // ISIIVerification :
        //
        // This structure defines the content of the ISII verification
        // section.
        //
 10     /////////////////////////////////////////////////////////// typedef struct __ISIIVerificationData
        {
            DWORD dwSegment1Hash;     // 32 bit Hash of 1st 1k of image data HASH  hashImage;          // 160 bit Hash of Entire Image 15     } ISIIVerification, * ptrISIIVerification;
        #endif /* !defined(RC_INVOKED) && defined(__cplusplus) */

///////////////////////////////////////////////////////////
        // Vzn3
        //
 20     //
        //    Interface representing all images based on the TIFF 6.0 spec.
        //
        //    This class handles only the functions of reading and writing
        //    VZN3 type images.
 25     //
        ///////////////////////////////////////////////////////////

//
        // Used for defining the size of various fields
        //

30     #define VZN_IMAGEID_WIDTH      12
        #define VZN_DOCUMENT_WIDTH     12
        #define VZN_ISII_WIDTH         17
        #define VZN_IMAGE_FLAGS_WIDTH  10
```

```
#define VZN_DESCRIPTION_WIDTH  40
#define VZN_CREATOR_WIDTH      40
#define VZN_DATE_WIDTH         8
#define VZN_TIME_WIDTH         9
#define VZN_LLA_WIDTH          80
#define VZN_PASSWORD_WIDTH     41
#define VZN_LEGEND_WIDTH       128
define VZN_CHECK_BLOCK        20 define VZN_KEY_SIZE VZN_ISII_WIDTH+VZN_DATE_WIDTH+VZN_TIME_WIDTH+VZN_PASSWORD_WIDTH + 1

///////////////////////////////////////////////////////////////
// VznData
//
// This structure holds the internal representation of the image
// information
//
/////////////////////////////////////////////////////////////// if defined(_MSC_)
prgama pack (1)
endif if defined(_BORLANDC_)
typedef struct _VznData
#else if defined(_MSC_VER)
typedef struct VZN_CLASS _VznData
#endif
{
  char szImageId    [ VZN_IMAGEID_WIDTH+1    ];  // Page ID
  char szDocumentId [ VZN_DOCUMENT_WIDTH +1  ];  // Document ID
  char szISII       [ VZN_ISII_WIDTH+1       ];  // ISII "Number"
  char szDescription[ VZN_DESCRIPTION_WIDTH+1 ]; // User descriptive Text
  char szCreator    [ VZN_CREATOR_WIDTH+1    ];  // Service Bureau Name
  char szLegend     [ VZN_LEGEND_WIDTH+1     ];  // Court Legend // Date and Time Should BOTH have values, or neither will be
  // mapped.
```

```
        char    szImageDate   [ VZN_DATE_WIDTH+1    ]; // YYYYMMDD format
        char    szImageTime   [ VZN_TIME_WIDTH+1    ]; // HHMMSS[.HH] format char    szLLA         [ VZN_LLA_WIDTH +1    ]; // GPS Lat Lon Alt TIMESOURCE iTimeSource;                       //

5       // Flags char    szFlags       [ VZN_IMAGE_FLAGS_WIDTH + 1]; // What ever // TIFF Values char    cRotation;          // tagOrientation
        DWORD   dwImageDataSize;    // Compressed Data Size
10      DWORD   dwWidth;            // Width in pixels
        DWORD   dwLength;           // Length in pixels
        DWORD   dwResolution;       // In DPI // Options IMAGETYPE       iImageType;           // typeG4VZN3, typeCOLORVZN3, etc...
15      SECURITYMETHOD  iCertificationMethod; //

DWORD           dwSoftwareVersion;   // HIBYTE = Software Code (BCD)
                                             // LOBYTE - Software Version (BCD)

// User Defined Area Storage
        void *          lpUserDefined;
20      DWORD           dwUserDefined;

//-----------------------------------------------------------
        // Instance Stuff (Write Only)
        // char szPassword[VZN_PASSWORD_WIDTH+1]; // Key for secure images

25      //-----------------------------------------------------------
        // Read Only Data Area  (Filled in by read routines)
        //

DWORD dwImageDataOffset;     // Offset of image data in file
```

BANNER & ALLEGRETTI, LTD.
10 South Wacker Drive
Suite 3000
Chicago, Illinois 60606

```
            WORD    wLibraryVersion;            // Version of image library
                                                // That produced this image BOOL    bPasswordValid;             // Password is correct BOOL    bISII;                      // Image is ISII type 5           BOOL    bCertified;                 // Image Passed ISII
                                                // Certification check BOOL    bInVzn;                     // Image was produced
                                                // by InVzn int     iLibraryError;              // Alternate return path
10                                              // for errors unsigned uUnHandledTags;            // Number of tags encountered
                                                // That didn't get used unsigned uUpgradeNotice;            // If new tags are
                                                // present, this field will
15                                              // indicate the count of
                                                // new tags // TIFF Values DWORD   dwCompression;
            DWORD   dwPhotoMetricInterpretation;
20          DWORD   dwFillOrder;

} VznData,* ptrVznData;

// Read/Write Attributes
        #define VZN3_ATTR_IMAGE_ID           100ul
        #define VZN3_ATTR_DOCUMENT_ID        101ul
25      #define VZN3_ATTR_DESCRIPTION        102ul
        #define VZN3_ATTR_CREATOR            103ul
        #define VZN3_ATTR_IMAGE_FLAGS        104ul define VZN3_ATTR_ROTATION           107ul
        #define VZN3_ATTR_IMAGE_DATA_SIZE    108ul
```

BANNER & ALLEGRETTI, LTD.
10 South Wacker Drive
Suite 3000
Chicago, Illinois 60606

```
       #define VZN3_ATTR_IMAGE_WIDTH            109ul
       #define VZN3_ATTR_IMAGE_LENGTH           110ul
       #define VZN3_ATTR_RESOLUTION             111ul
       #define VZN3_ATTR_IMAGE_TYPE             112ul
 5     #define VZN3_ATTR_SECURITY_METHOD        113ul
       #define VZN3_ATTR_SOFTWARE_VERSION       114ul
       #define VZN3_ATTR_FILLORDER              115ul
       #define VZN3_ATTR_PHOTOMETRICINTERP      116ul
       #define VZN3_ATTR_REQUIRED_LEGEND        117ul 10     // Write Only Attributes
       #define VZN3_ATTR_PASSWORD               200ul // Read Only Attributes define VZN3_ATTR_ISII_STRING            300ul
       #define VZN3_ATTR_DATE                   301ul
15     #define VZN3_ATTR_TIME                   302ul
       #define VZN3_ATTR_IMAGE_DATA_OFFSET      303ul
       #define VZN3_ATTR_LIBRARY_VERSION        304ul
       #define VZN3_ATTR_IS_PASSWORD_VALID      305ul
       #define VZN3_ATTR_IS_ISII_IMAGE          306ul
20     #define VZN3_ATTR_IS_IMAGE_CERTIFIED     307ul
       #define VZN3_ATTR_IS_INVZN_IMAGE         308ul
       #define VZN3_ATTR_LAST_LIBRARY_ERROR     309ul
       #define VZN3_ATTR_UNHANDLED_TAGS         310ul
       #define VZN3_ATTR_UPGRADE_NOTICE         311ul
25     #define VZN3_ATTR_COMPRESSION            312ul
       #define VZN3_ATTR_TIME_SOURCE            313ul
       #define VZN3_ATTR_GENERATION_NUMBER      314ul
       #define VZN3_ATTR_GENERATION_ISII_ORIGIN 315ul
       #define VZN3_ATTR_LLA                    316ul 30     #define VZN_ATTRIBUTE DWORD if !defined(RC_INVOKED) && defined(__cplusplus)

class VZN_CLASS Vzn3
       {
```

```
        friend class G4VZN3Imp;
        friend class G4VZN2Imp;
        friend class ColorVZN3Imp;
        friend class JPEGVZN3Imp;
        friend class MPEGVZN3Imp;
        friend class Vzn2_2_Vzn3;

private :
            VznData   vzn;
            VznData * vznOld;

//-----------------------------------------------------------------
        // Private Data Area
        //
        //
        // The members defined here should be considered private to users and
        // should not be touched between calls to different manipulation
        // functions.
        //
        // void *      lpImageData;    // Pointer to image data (header
                                        // and all) in memory (Read
                                        // functions)

void *      lpRawData;      // Pointer to raw data in mem
                                        // May point into lpImageData int         hFile;          // File handle DWORD       dwImagePos;     // Count of image bytes written
                                        // in file void *      lpIFD;          // Pointer to buffer containing
                                        // the formated
                                        // portion of the image file
                                        // (Write Functions,
                                        // Allocated Memory)

DWORD       dwIFDSize;      // Size of VZN IFD
                                        // (Write Functions)
```

- 99 -

```
          void *         lpPrivateIFD;       // Pointer to buffer containing
                                             // the formated Private "IFD"
                                             // portion of the image file
                                             // (Allocated Memory)

5         DWORD          dwPrivateIFDSize;   // Size of Private IFD

ISIIVerification* pCheckBlockData;  // Buffer containing
                                              // checksum block (this gets
                                              // built durring the write
                                              // functions or read in during
10                                            // read functions)
                                              // This pointer points
                                              // into the Private IFD area.

private :

Vzn3Internal * pImp;

15        enum UsageState
          {
             ReadOperation    = 100,    // Open to read image data
             ReadEnd          = 199, CreateOperation  = 200,    // Open to create file
20           CreateEnd        = 299, UpdateOperation  = 300,    // Open to update image header
             UpdateEnd        = 399, Error            = 1000
          };

25        UsageState State;

int  PLATFORM  SelectImplementation();

int  PLATFORM  CreatePrivateArea();
          int  PLATFORM  MapIFDStream();
          void PLATFORM  MapHeader(void * lpBuffer,DWORD dwIFDLocation);
```

```
            void    PLATFORM  BuildPrivateAreaKey(char * szPassword,char * szKeyBase);
            void    PLATFORM  CreateDirectory(char * szDir);
            void    PLATFORM  BuildImageDataSegment1Key(char * szPassword,char * szKeyBase);
            DWORD   PLATFORM  CreateSegment1Hash(DWORD * lpBuffer,int iLength);
 5          int     PLATFORM  WritePrivateArea();
            int     PLATFORM  ReadTiffData(DWORD dwFilePointer,DWORD dwTagDataLength,void
      * lpBuffer,int iBufferLength);
            int     PLATFORM  ReadPrivateTags();
            int     PLATFORM  CertifyPrimarySegment();

10          int     PLATFORM  MakeVznIFDStream();
            int     PLATFORM  GetVznHeader(void * lpDestBuffer,int iBufferLength);
            int     PLATFORM  WriteVznIFDStream();
            int     PLATFORM  WriteImageData_mem();
            int     PLATFORM  DecodeTiffTags(ptrTAG tags,int iTagCount);
15          int     PLATFORM  ReadHeader();
            int     PLATFORM  AssembleImageTimeAndPositionCodings(); // in ISL_TIME.CPP
            int     PLATFORM  internalGetImageAttribute(DWORD dwAttribute,DWORD dwValue
      ,DWORD dwLength = 0);
            int     PLATFORM  internalSetImageAttribute(DWORD dwAttribute,DWORD dwValue
20    ,DWORD dwLength = 0);

public :

enum OpenMode
      {
        openRead   = 1,    // Open to read image data
25      openCreate = 2,    // Open to create file
        openUpdate = 3     // Open to update image header
      };

int     PLATFORM  Open(char * szFileName,OpenMode iMode);
            int     PLATFORM  Init();
30          int     PLATFORM  Cleanup();
            int     PLATFORM  Reset();
            int     PLATFORM  ReadImageData(void * lpReadBuffer,DWORD dwLength,DWORD *
      dwBytesRead);
            int     PLATFORM  ReadFileData(void * lpReadBuffer,DWORD dwOffset,DWORD
35    dwLength,DWORD * dwBytesRead);
            int     PLATFORM  WriteImageData_file(int fhSource);
            int     PLATFORM  WriteImageData(void * lpWriteBuffer,DWORD dwLength);
            void    PLATFORM  RTrim(char * szData);
```

```
        int  PLATFORM Flush();
        int  PLATFORM Update();
        int  PLATFORM Close();
        int  PLATFORM CertifyImage();
5       int  PLATFORM GetErrorString(int iCode,char * szBuffer,int iLength);

DWORD PLATFORM GetImageAttribute(DWORD dwAttribute);
        int  PLATFORM GetImageAttribute(DWORD dwAttribute,DWORD * dwValue ,DWORD
     dwLength = 0);
        int   PLATFORM GetImageAttribute(DWORD dwAttribute,char   * szValue ,DWORD
10   dwLength);

int  PLATFORM CopyAttributes(Vzn3 & Source);

int  PLATFORM SetImageAttribute(DWORD dwAttribute,DWORD  dwValue,DWORD
     dwLength = 0);
        int  PLATFORM SetImageAttribute(DWORD dwAttribute,char * szValue);

15      PLATFORM Vzn3();
        PLATFORM ~Vzn3();
     };
     #elif !defined(RCINVOKED)

#define openRead    1
20   #define openCreate  2
     #define openUpdate  3 endif // RCINVOKED && (__cplusplus)

// Describes the C style interface into the Vzn3 Class if !defined(RC_INVOKED)
25   #if defined(__cplusplus)
     extern "C" {
     #endif // Please see the appropriate member function documentation for
     // how to use the C interface.

30   DWORD PLATFORM Vzn3_Create(void);
```

- 102 -

```
    void PLATFORM Vzn3_Delete(DWORD dwVznHandle);
    int  PLATFORM Vzn3_Open(DWORD dwVznHandle,char * szFileName,int iMode);
    int  PLATFORM Vzn3_Init(DWORD dwVznHandle);
    int  PLATFORM Vzn3_Cleanup(DWORD dwVznHandle);
5   int  PLATFORM Vzn3_Reset(DWORD dwVznHandle);
    int  PLATFORM Vzn3_ReadImageData(DWORD dwVznHandle,void * lpReadBuffer,DWORD
    dwLength,DWORD * dwBytesRead);
    int  PLATFORM Vzn3_ReadFileData(DWORD dwVznHandle,void * lpReadBuffer,DWORD
    dwOffset,DWORD dwLength,DWORD * dwBytesRead);
10  int      PLATFORM  Vzn3_WriteImageData(DWORD   dwVznHandle,void  *
    lpWriteBuffer,DWORD dwLength);
    int  PLATFORM Vzn3_Flush(DWORD dwVznHandle);
    int  PLATFORM Vzn3_Close(DWORD dwVznHandle);
    int  PLATFORM Vzn3_CertifyImage(DWORD dwVznHandle);
15  int  PLATFORM Vzn3_GetErrorString(DWORD dwVznHandle,int iCode,char * szBuffer,int
    iLength);
    int     PLATFORM  Vzn3_GetImageAttribute(DWORD   dwVznHandle,VZN_ATTRIBUTE
    attr,DWORD dwValue,DWORD dwLength);
    int     PLATFORM  Vzn3_SetImageAttribute(DWORD   dwVznHandle,VZN_ATTRIBUTE
20  attr,DWORD dwValue,DWORD dwLength);
    int  PLATFORM Vzn3_Update(DWORD dwVznHandle);
    int  PLATFORM Vzn3_CopyAttributes(DWORD dwDestHandle,DWORD dwSourceHandle);

#if defined(__cplusplus)
    }
25  #endif endif (RC_INVOKED)

//
    // General Errors
    //

30  #define VZN_ERROR_NONE              0
    #define VZN_ERROR_NO_MEMORY              100
    #define VZN_ERROR_WRITE             101
    #define VZN_ERROR_FILE_CREATE            102
    #define VZN_ERROR_SEGMENT1_TOO_SMALL          103
35  #define VZN_ERROR_READ_HEADER            105
    #define VZN_ERROR_SEEK              106
```

```
        #define VZN_ERROR_READ_STRING                107
        #define VZN_ERROR_FILE_OPEN                  108
        #define VZN_ERROR_INVALID_PASSWORD           110
        #define VZN_ERROR_UNSUPPORTED_TYPE           111
 5      #define VZN_ERROR_CERTIFICATION_DATA         112
        #define VZN_ERROR_READ_SEGMENT1              113
        #define VZN_ERROR_CERTIFICATION_SEGMENT1     114
        #define VZN_ERROR_NODATA                     115
        #define VZN_ERROR_CANNOT_CERTIFY             116
10      #define VZN_ERROR_NO_VERSION                 118
        #define VZN_ERROR_UNSUPPORTED_IMAGE_FORMAT   119
        #define VZN_ERROR_CANNOT_UPDATE_SECURITY     123
        #define VZN_ERROR_FEATURE_NOT_SUPPORTED      124
        #define VZN_ERROR_UNKNOWN_OPEN_MODE          125

15      #define VZN_WARNING_OLD_FORMAT               300
        #define VZN_WARNING_READ_OVERFLOW            301
        #define VZN_WARNING_IMAGE_DATA_OVERFLOW      302
        #define VZN_WARNING_INVALID_ATTRIBUTE        303
        #define VZN_WARNING_READ_ONLY_ARRITBUTE_SET  304
20      #define VZN_WARNING_WRITE_ONLY_ATTRIBUTE_READ 305 endif

/////////////////////////////////////////////////////////
        /////////////////////////////////////////////////////////
        /////////////////////////////////////////////////////////

25      /////////////////////////////////////////////////////////
        // G4VZN3IM.CPP
        //
        // Group 4 VZN3 Implementation. This file contains the code specific
        // to the G4VZN3 type of image. Please see the class definition in Vzn3.H
30      //
        //
        ///////////////////////////////////////////////////////// if !defined(__VZN3_H)
        #    include <vzn3.h>
```

```
    #endif if !defined(__ENCODER_H)
    #include "encoder.h"    // DES interface
    #endif 5   #include <isl_hash.h> include <stdio.h>
    #include <io.h>
    #include <string.h>

//
10  //
    #define G4VZN3_SEGMENT1_SIZE       1024
    #define G4VZN3_INITIAL_HASH_VALUE  0xEE1994EE /*Don't mess with this!*/

////////////////////////////////////////////////////////////////
    //
15  ////////////////////////////////////////////////////////////////

G4VZN3Imp::G4VZN3Imp()
    {
      Init();
    }
20  ////////////////////////////////////////////////////////////////
    //
    ////////////////////////////////////////////////////////////////

G4VZN3Imp::~G4VZN3Imp()
    {
25    if(lpsPrimarySegment)
        {
          free(lpsPrimarySegment);

lpsPrimarySegment = NULL;
        }
30  }
```

- 105 -

```
//////////////////////////////////////////////////////////////////
//
////////////////////////////////////////////////////////////////// void G4VZN3Imp::Init()
 5      {
            hashRead        = HASH(0,0,0,0,0);
            hashCache       = HASH(0,0,0,0,0);
            iCacheCount     = NULL;
            dwOffDWORDStore = NULL;
10          iByteCount      = NULL;
            lpsPrimarySegment = NULL;
            iPSByteCount    = NULL;
        }

//////////////////////////////////////////////////////////////////
15      // G4VZN3Imp::ReadData
        //
        //   Code for handling reading of data, converting the data stream into
        //   the raw reperesentation, and validating the image integrity.
        //
20      ////////////////////////////////////////////////////////////////// int  G4VZN3Imp::ReadData
            (
                class Vzn3 * pVzn,
                void       * lpBuffer,
25              DWORD        dwLength,
                DWORD      * lpdwBytesRead
            )
        {
            int iRet = VZN_ERROR_NONE;
30          char szKey[VZN_KEY_SIZE];

if( (pVzn->dwImagePos + dwLength) <= pVzn->vzn.dwImageDataSize )
            {
                iRet = pVzn->ReadTiffData
                    (
35                      pVzn->vzn.dwImageDataOffset + pVzn->dwImagePos,
                        dwLength,
                        lpBuffer,
```

- 106 -

```
                dwLength
            );

*lpdwBytesRead = dwLength;
    }
    else
    {
        // One should not try to read past the END
        // of the TIFF file.

iRet = pVzn->ReadTiffData
            (
                pVzn->vzn.dwImageDataOffset + pVzn->dwImagePos,
                pVzn->vzn.dwImageDataSize - pVzn->dwImagePos,
                lpBuffer,
                dwLength
            );

*lpdwBytesRead = pVzn->vzn.dwImageDataSize - pVzn->dwImagePos;

iRet = VZN_WARNING_READ_OVERFLOW;
        // goto EXIT_ERROR;
    } if(!pVzn->dwImagePos) // First buffer gets special treatment!
    {
        DWORD dwSegmentSize = G4VZN3_SEGMENT1_SIZE;

if(pVzn->vzn.dwImageDataSize < G4VZN3_SEGMENT1_SIZE)
        {
            dwSegmentSize = pVzn->vzn.dwImageDataSize;
        } switch(pVzn->vzn.iCertificationMethod)
        {
            case secISIIVerification :
            case secGenericTIFF :
                break;

case secISIIPublicKey :
                BuildImageDataSegment1Key(pVzn,VZN3_SIGNATURE,szKey);
```

```
                    Decode(szKey,lpBuffer,(dwSegmentSize/16)*16);
                    break;

case secISIIPrivateKey :
                    BuildImageDataSegment1Key(pVzn,pVzn->vzn.szPassword,szKey);
                    Decode(szKey,lpBuffer,(dwSegmentSize/16)*16);
                    break;
            }
        } if(pVzn->vzn.iCertificationMethod != secGenericTIFF)
        {
            hashRead.AddBuffer
            (
                hashCache,
                iCacheCount,
                dwOffDWORDStore,
                iByteCount,
                (DWORD*)lpBuffer,
                *lpdwBytesRead
            );
        } pVzn->dwImagePos += *lpdwBytesRead;

if(pVzn->dwImagePos == pVzn->vzn.dwImageDataSize)
        {
            if(pVzn->vzn.iCertificationMethod != secGenericTIFF)
            {
                hashRead.Flush
                (
                    hashCache,
                    iCacheCount,
                    dwOffDWORDStore,
                    iByteCount
                );

if(!memcmp(&hashRead,&pVzn->pCheckBlockData->hashImage,sizeof(HASH)))
                {
                    pVzn->vzn.bCertified = TRUE;
                }
```

```
    }
  } return iRet;
} void G4VZN3Imp::MangleSegmentOne
    (
      class Vzn3 *      pVzn,
      void    *         lpBuffer,
      DWORD             dwSegmentSize
    )
{
  // Calculate the hash value for Segment1 of the image data.
  // This must be done prior to the call to
  // BuildImageDataSegment1Key, as this function sets a
  // value used by that function.

pVzn->pCheckBlockData->dwSegment1Hash =
      CreateSegment1Hash((DWORD*)lpBuffer,dwSegmentSize);

// Mangle data based on security mesures
  switch(pVzn->vzn.iCertificationMethod)
  {
    case secISIIPublicKey : // Use Public InVzn Coding
      {
        char szKey[VZN_KEY_SIZE];
        BuildImageDataSegment1Key(pVzn,VZN3_SIGNATURE,szKey);
        Encode(szKey,lpBuffer,(dwSegmentSize/16)*16);
      }
      break;

case secISIIPrivateKey : // Encode based on user PASSWORD
      {
        char szKey[VZN_KEY_SIZE];
        BuildImageDataSegment1Key(pVzn,pVzn->vzn.szPassword,szKey);
        Encode(szKey,lpBuffer,(dwSegmentSize/16)*16);
      }
        break;
  }
```

```
    }
    /////////////////////////////////////////////////////////////////
    // G4VZN3Imp::HandlePrimarySegment
    //
    //
    // Used to completely "get" all of the data for the primary segment.
    //
    // Function assumes that it will only be called when image is in need
    // of security checks.
    ///////////////////////////////////////////////////////////////// int G4VZN3Imp::HandlePrimarySegment
        (
            class Vzn3 *        pVzn,
            void       *        lpBuffer,
            DWORD               dwLength,
            SegmentBufferStatus & Stat,
            DWORD              & dwBytesUsed
        )
    {
      int iRet = VZN_ERROR_NONE;

if(!pVzn->dwImagePos)
        {
          // First buffer of data sent....

if(dwLength >= G4VZN3_SEGMENT1_SIZE)
            {
              // The length of the first write buffer contains all the
              // data required for the segment1 hash.  "Do the deed"
              // in-line.
              MangleSegmentOne(pVzn,lpBuffer,G4VZN3_SEGMENT1_SIZE);
              Stat = segInPlace;
            }
          else
            {
              lpsPrimarySegment = (char*)calloc(1,G4VZN3_SEGMENT1_SIZE);

if(lpsPrimarySegment)
                {
                  memcpy(lpsPrimarySegment,lpBuffer,dwLength);
```

- 110 -

```
                    iPSByteCount  = dwLength;
                    dwBytesUsed   = dwLength;
                    Stat          = segPartial;
                  }
5               else
                  {
                    iRet = VZN_ERROR_NO_MEMORY;
                    goto EXIT_ERROR;
                  }
10            }
            }
            else
            {
              if(lpsPrimarySegment)
15            {
                // First buffer of data sent did not contain enough for the primary
                // segment.
                if((iPSByteCount + dwLength) >= G4VZN3_SEGMENT1_SIZE)
                {
20                // This buffer completes the data needed for the primary segment.

memcpy(lpsPrimarySegment+iPSByteCount,lpBuffer,G4VZN3_SEGMENT1_SIZE-iPSByteCount);
                  MangleSegmentOne(pVzn,lpsPrimarySegment,G4VZN3_SEGMENT1_SIZE);

25                dwBytesUsed  = G4VZN3_SEGMENT1_SIZE-iPSByteCount;
                  iPSByteCount = G4VZN3_SEGMENT1_SIZE;
                  Stat         = segFull;
                }
                else
30              {
                  memcpy(lpsPrimarySegment+iPSByteCount,lpBuffer,dwLength);
                  iPSByteCount += dwLength;
                  Stat         = segPartial;
                  dwBytesUsed  = dwLength;
35              }
              }
            }

EXIT_ERROR:

return iRet;
```

```
            }
            ////////////////////////////////////////////////////////////////////
            //  G4VZN3Imp::WriteData
            //
  5         //
            //  Code for handling calculation of check-sum values and encrypting data
            //  stream.
            //
            ////////////////////////////////////////////////////////////////////

10         int G4VZN3Imp::WriteData
                (
                   class Vzn3 * pVzn,
                   void       * lpBuffer,
                   DWORD        dwLength
 15             )
            {
               int              iRet    = VZN_ERROR_NONE;
               SegmentBufferStatus SegStat = segWrite;

if(pVzn->vzn.iCertificationMethod != secGenericTIFF)
 20            {
                  // Add this write buffer to the hash of the entire image.

pVzn->pCheckBlockData->hashImage.AddBuffer
                     (
                        hashCache,
 25                     iCacheCount,
                        dwOffDWORDStore,
                        iByteCount,
                        (DWORD*)lpBuffer,
                        dwLength
 30                  );
               } if(!pVzn->dwImagePos)
               {
                  if(!pVzn->vzn.dwImageDataSize) pVzn->vzn.dwImageDataSize = 0xFFFFFFFF;

35               if( tell(pVzn->hFile) == 0)
                  {
```

```c
                // Write a blank HEADER into the file
                VZNTIFFHEADER blank;

memset(&blank,0,sizeof(VZNTIFFHEADER));

if( write(pVzn->hFile,&blank,sizeof(VZNTIFFHEADER)) < 0)
                  {
                    iRet = VZN_ERROR_WRITE;
                    goto EXIT_ERROR;
                  }
              }
          }

DWORD dwUsed;

if(pVzn->vzn.iCertificationMethod != secGenericTIFF)
          {
            if(pVzn->dwImagePos < G4VZN3_SEGMENT1_SIZE)
              {
                iRet = HandlePrimarySegment(pVzn,lpBuffer,dwLength,SegStat,dwUsed);
              }
          } if(!iRet)
          {
            switch(SegStat)
              {
                default :
                case segWrite :
                case segInPlace :
                    if( write(pVzn->hFile,lpBuffer,dwLength) < 0 )
                      {
                        iRet = VZN_ERROR_WRITE;
                        goto EXIT_ERROR;
                      }
                    break;

case segPartial :
                    // Nothing to do at this point
                    break;

case segFull :
```

```
                // Write the Primary Segment....
                if( write(pVzn->hFile,lpsPrimarySegment,iPSByteCount) < 0 )
                {
                  iRet = VZN_ERROR_WRITE;
                  goto EXIT_ERROR;
                }

// Write any possible left over data in buffer
                if( write(pVzn->hFile,((char*)lpBuffer)+dwUsed,dwLength-dwUsed) < 0 )
                {
                  iRet = VZN_ERROR_WRITE;
                  goto EXIT_ERROR;
                }

// Free the memory
                free(lpsPrimarySegment);
                lpsPrimarySegment = NULL;
                iPSByteCount = 0;
                break;
              }
            }
            else
            {
              goto EXIT_ERROR;
            } pVzn->dwImagePos += dwLength;

if(pVzn->vzn.iCertificationMethod != secGenericTIFF)
            {
              if(pVzn->dwImagePos == pVzn->vzn.dwImageDataSize)
              {
                // Done with no errors
                // Write the private area // Drop the hash cache pVzn->pCheckBlockData->hashImage.Flush
                (
                  hashCache,
                  iCacheCount,
                  dwOffDWORDStore,
```

```
            iByteCount
          );
        }
      }
    if(pVzn->dwImagePos > pVzn->vzn.dwImageDataSize)
      {
        // Used when there is written more data than
        // specified
        iRet = VZN_WARNING_IMAGE_DATA_OVERFLOW;
      }

EXIT_ERROR:

return iRet;
    }

///////////////////////////////////////////////////////////
// BuildImageDataSegment1Key :
//
// In order to insure that the image data is encoded differently every time,
// the encoder builds the RAW hash of the image data into the key value.
// This will make images that have clean tops have a different encoded
// string every time.
//
/////////////////////////////////////////////////////////// void G4VZN3Imp::BuildImageDataSegment1Key(class Vzn3 * pVzn,char * szPassword,char * szKeyBase)
    {
      ltoa(pVzn->pCheckBlockData->dwSegment1Hash,szKeyBase,16);
      strcat(szKeyBase,szPassword);
      strcat(szKeyBase,pVzn->vzn.szISII);
      strupr(szKeyBase);
    }

///////////////////////////////////////////////////////////
// CreateSegment1Hash :
//
// Used to calculate the hash (checksum) for segment 1 of the image data.
```

BANNER & ALLEGRETTI, LTD.
10 South Wacker Drive
Suite 3000
Chicago, Illinois 60606

```
//
///////////////////////////////////////////////////////////////

DWORD G4VZN3Imp::CreateSegment1Hash(DWORD * lpBuffer,int iLength)
      {
 5      int    iSegmentSize = iLength/sizeof(DWORD);
        DWORD  dwSegmentHash = G4VZN3_INITIAL_HASH_VALUE;

//
        // This is a simple 32bit hash of the data to verify the
        // consistancy of the image and to throw more randomness
10      // into the encrypted data area when security levels dictate
        // that the image data be encrypted.
        // for(;iSegmentSize--;lpBuffer++) dwSegmentHash ^= *lpBuffer;

return(dwSegmentHash);
15    }

///////////////////////////////////////////////////////////////
// G4VZN3Imp::CertifyPrimarySegment
//
//
20    //   Validate that the primary segment of the image has not been altered.
      //
/////////////////////////////////////////////////////////////// int G4VZN3Imp::CertifyPrimarySegment(class Vzn3 * pVzn)
      {
25      unsigned uSegment1Bytes = 0;
        int      iRet           = VZN_ERROR_NONE;

//------------------------------------------------------------
      // Test Segment1 HASH
      //

30    // Calculate the number of bytes for the segment 1 HASH if(pVzn->vzn.dwImageDataSize < G4VZN3_SEGMENT1_SIZE)
        {
          uSegment1Bytes = pVzn->vzn.dwImageDataSize;
```

```
        }
        else
        {
            uSegment1Bytes = G4VZN3_SEGMENT1_SIZE;
        } if(pVzn->hFile)
        {
            // We are reading data from a file char    cBuffer[G4VZN3_SEGMENT1_SIZE];

memset(cBuffer,0,G4VZN3_SEGMENT1_SIZE);

if(lseek(pVzn->hFile,pVzn->vzn.dwImageDataOffset,SEEK_SET) < 0)
            {
                iRet = VZN_ERROR_SEEK;
                goto EXIT_ERROR;
            } if( read(pVzn->hFile,cBuffer,uSegment1Bytes) == uSegment1Bytes)
            {
                char    szKey[VZN_KEY_SIZE];
                DWORD   hashTest;

switch(pVzn->vzn.iCertificationMethod)
                {
                    case secISIIVerification :
                    case secGenericTIFF :
                        break;

case secISIIPublicKey :
                        BuildImageDataSegment1Key(pVzn,VZN3_SIGNATURE,szKey);
                        Decode(szKey,cBuffer,(uSegment1Bytes/16)*16);
                        break;

case secISIIPrivateKey :
                        BuildImageDataSegment1Key(pVzn,pVzn->vzn.szPassword,szKey);
                        Decode(szKey,cBuffer,(uSegment1Bytes/16)*16);
                        break;
                }
```

```
           if(pVzn->vzn.iCertificationMethod != secGenericTIFF)
             {
                hashTest = CreateSegment1Hash((DWORD *)cBuffer,uSegment1Bytes);

if(hashTest != pVzn->pCheckBlockData->dwSegment1Hash)
 5                {
                    iRet = VZN_ERROR_CERTIFICATION_SEGMENT1;
                    goto EXIT_ERROR;
                  }
             }
10        }
         else
           {
             iRet = VZN_ERROR_READ_SEGMENT1;
             goto EXIT_ERROR;
15         }
        }
       else if(pVzn->lpImageData)
        {
         // The data is in system memory 20       if(pVzn->vzn.iCertificationMethod != secGenericTIFF)
           {
             DWORD hashTest = CreateSegment1Hash
                              (
                                                                      ( D W O R D   * )
25    ((char*)pVzn->lpImageData+pVzn->vzn.dwImageDataOffset),
                            uSegment1Bytes
                              );

if(hashTest != pVzn->pCheckBlockData->dwSegment1Hash)
                  {
30                  iRet = VZN_ERROR_CERTIFICATION_SEGMENT1;
                    goto EXIT_ERROR;
                  }
           }
        }
35     else
        {
          iRet = VZN_ERROR_NODATA;
          goto EXIT_ERROR;
        }
```

```
        EXIT_ERROR:

return iRet;
        }

////////////////////////////////////////////////////////////
5       //
        //////////////////////////////////////////////////////////// int G4VZN3Imp::GetSecurityData(class Vzn3 * pVzn)
        {
          int iRet = VZN_ERROR_NONE;

10        pVzn = pVzn;

return iRet;
        }

////////////////////////////////////////////////////////////
        //
15      //////////////////////////////////////////////////////////// int G4VZN3Imp::SetSecuirytData(class Vzn3 * pVzn)
        {
          int iRet = VZN_ERROR_NONE;

pVzn = pVzn;

20        return iRet;
        }

////////////////////////////////////////////////////////////
        //
        ////////////////////////////////////////////////////////////

25      int G4VZN3Imp::FlushWrite(class Vzn3 * pVzn)
        {
          int iRet = VZN_ERROR_NONE;

// Handle inVzn Images ...
          if(pVzn->vzn.iCertificationMethod != secGenericTIFF)
```

```
    {
    // DONE with no Errors.
    // Write the private area.

// Drop the hash cache.
    pVzn->pCheckBlockData->hashImage.Flush
      (
        hashCache,
        iCacheCount,
        dwOffDWORDStore,
        iByteCount
      );

if(lpsPrimarySegment)
    {
      // If this pointer is valid we should have an image that is
      // less than the primary segment in length.
      MangleSegmentOne(pVzn,lpsPrimarySegment,pVzn->dwImagePos);

if( write(pVzn->hFile,lpsPrimarySegment,iPSByteCount) < 0 )
      {
        iRet = VZN_ERROR_WRITE;
      }
    }
  } return iRet;
}

/////////////////////////////////////////////////////////////
/////////////////////////////////////////////////////////////
/////////////////////////////////////////////////////////////

/////////////////////////////////////////////////////////////
// ISL_TIME.CPP
//
//
// Abstraction interface for time accuisition for image format library
// to handle time coding of image creation.
//
```

```
// Time stamping operations in the first version have the following priority :
//
//   - Direct from GPS unit (timeUTC). If active and time code from GPS is
//     avilable.
//   - System clock time syncronized from GPS (timeUTC_SyncCPU)
//   - System clock time Local Time (timeCPU)
//
// This code is system and compiler
// dependant.
//
/////////////////////////////////////////////////////////////////// include "vzn3.h"          // New style VZN3 image include <time.h>
include <invzngps.h>
include <string.h> int PLATFORM Vzn3::AssembleImageTimeAndPositionCodings()
{
  int    iRet    = 0;

#if defined(_Windows) || defined(_WINDOWS)
    GPSMode    ModeInfo    = GPS_Inactive;
    char       szGPSTime    [GPS_TIME_ENCODING_SIZE];
    char       szGPSPosition [GPS_POSITION_ENCODING_SIZE];

iRet = GPSGetTime(szGPSTime,&ModeInfo);

if(ModeInfo == GPS_Inactive)
  #endif
    {
      time_t timer = time(NULL);;
      struct tm * t = localtime(&timer);

sprintf(vzn.szImageDate,"%04i%02i%02i",t->tm_year+1900,t->tm_mon+1,t->tm_mday);
      sprintf(vzn.szImageTime,"%02i%02i%02i",t->tm_hour,t->tm_min,t->tm_sec);
    }
  #if defined(_Windows) || defined(_WINDOWS)
```

```
          else
          {
            // Encode GPS_Time codes and Position data
            strncpy(vzn.szImageDate,&szGPSTime[0],8);
  5         vzn.szImageDate[8] = 0;
            strncpy(vzn.szImageTime,&szGPSTime[9],9);

switch(ModeInfo)
              {
                case GPS_UTC :
 10                 vzn.iTimeSource = timeGPS;
                    break;
                case GPS_CPUSYNCUTC :
                    vzn.iTimeSource = timeGPS_CPU_Sync;
                    break;
 15           } iRet = GPSGetPos(szGPSPosition);

if(!iRet)
              {
                strncpy(vzn.szLLA,szGPSPosition,sizeof(vzn.szLLA)-1);
 20           }
          }
        #endif return iRet;
        }

25     //////////////////////////////////////////////////////////////
        //////////////////////////////////////////////////////////////
        //////////////////////////////////////////////////////////////

//////////////////////////////////////////////////////////////
        // ISL_GPS.CPP
 30     //
        //
        //  Implements the Dynamic binding to the GPS Time and Postion sub-system.
        //
        //  This is the static "Thunk-stub" side to the Dynamic bind.
 35     //
```

```
//  Routines are designed to "gracefully" fail if the GPS system is either
//  not present (the DLL is not found) or the GPS system is not attached
//  and configured properly.
//
//////////////////////////////////////////////////////////////////// include <platform.h>
include <invzngps.h> if defined(_Windows) || defined(_WINDOWS)
static GPSINIT      _fpGPSINIT;
static GPSTIME      _fpGPSTIME;
static GPSPOS       _fpGPSPOS;
static GPSINFO      _fpGPSINFO;
static GPSKILL      _fpGPSKILL;
static HINSTANCE    _hLib;

static BOOL     _bGPSAvailible  = TRUE;
static BOOL     _bGPSActive     = FALSE;

////////////////////////////////////////////////////////////////////
// GPSKill :
//
//  Terminate session with GPS Device.
//
//////////////////////////////////////////////////////////////////// int PLATFORM GPSKill()
{
  int iRet = 0;

if(_hLib > HINSTANCE_ERROR)
    {
    if(_fpGPSKILL) (*_fpGPSKILL)();

FreeLibrary(_hLib);

_hLib      = NULL;
    _fpGPSINIT = NULL;
    _fpGPSTIME = NULL;
    _fpGPSPOS  = NULL;
```

```
            _fpGPSINFO   = NULL;
            _fpGPSKILL   = NULL;

_bGPSAvailible  = TRUE;
            _bGPSActive     = FALSE;
 5       } return iRet;
     }

//////////////////////////////////////////////////////////////////
     // GPSLoad :
10   //
     //    Attempt load and bind to GPS sub-system.
     //
     ////////////////////////////////////////////////////////////////// int PLATFORM GPSLoad()
15   {
         int      iRet  = 0;
         UINT     uSaveMode;

// Attempt to load uSaveMode = SetErrorMode(SEM_NOOPENFILEERRORBOX);

20       #ifdef __WIN32__
         _hLib = LoadLibrary("VZNGPS32.DLL");
         #else
         _hLib = LoadLibrary("INVZNGPS.DLL");
         #endif 25       SetErrorMode(uSaveMode);

if(_hLib > HINSTANCE_ERROR)
         {
             _fpGPSINIT = (GPSINIT) GetProcAddress(_hLib,"GPSINIT");

if(_fpGPSINIT)
30           {
```

- 124 -

```
        iRet = (*_fpGPSINIT)();
    }
    else
    {
      iRet = GPS_ERROR_DLL_BIND;
    } if(!iRet)
    {
      _fpGPSTIME = (GPSTIME) GetProcAddress(_hLib,"GPSTIME");
      _fpGPSPOS  = (GPSPOS) GetProcAddress(_hLib,"GPSPOS");
      _fpGPSINFO = (GPSINFO) GetProcAddress(_hLib,"GPSINFO");
      _fpGPSKILL = (GPSKILL) GetProcAddress(_hLib,"GPSKILL");

_bGPSActive    = TRUE;
      _bGPSAvailible = TRUE;
    }
    else
    {
      GPSKill();
      _bGPSActive    = FALSE;
      _bGPSAvailible = FALSE;
      //iRet = GPS_ERROR_DLL_INIT; // GPS Inactive
    }
  }
  else
  {
    iRet = GPS_ERROR_DLL_LOAD;
  } return iRet;
} define GPS_ACTIVE()                          \
    _bGPSAvailible                            \
    ?                                         \
        _bGPSActive                           \
        ?                                     \
            TRUE                              \
        :
```

```
            GPSLoad()                              \
            ?                                       \
              FALSE                                  \
            :                                         \
 5           _bGPSActive                               \
            ?                                          \
              TRUE                                      \
            :                                            \
              FALSE                                       \
10       : FALSE                                           \
                                                           \
```

```
//////////////////////////////////////////////////////////////
//
//////////////////////////////////////////////////////////////

15   int PLATFORM GPSGetTime(char * szTime,GPSMode * mode)
     {
       int iRet = GPS_ERROR_NONE;

if(GPS_ACTIVE())
         {
20         if(_fpGPSTIME)
             {
               iRet = (*_fpGPSTIME)(szTime,mode);
             }
           else
25         {
               iRet = GPS_ERROR_DLL_BIND;
             }
         }
       else
30     {
           iRet = GPS_ERROR_INACTIVE;
         } return iRet;
     }
```

BANNER & ALLEGRETTI, LTD.
10 South Wacker Drive
Suite 3000
Chicago, Illinois 60606

```
////////////////////////////////////////////////////////////////
//
//////////////////////////////////////////////////////////////// int PLATFORM GPSGetPos(char * szPos)
 5     {
         int iRet = GPS_ERROR_NONE;

if(GPS_ACTIVE())
           {
             if(_fpGPSPOS)
10             {
                 iRet = (*_fpGPSPOS)(szPos);
               }
             else
               {
15               iRet = GPS_ERROR_DLL_BIND;
               }
           }
         else
           {
20           iRet = GPS_ERROR_INACTIVE;
           } return iRet;
       }

////////////////////////////////////////////////////////////////
25   //
     //
//////////////////////////////////////////////////////////////// int PLATFORM GPSInfo(DWORD dwItem,DWORD dwValue,DWORD dwValue1)
       {
30       int iRet = GPS_ERROR_NONE;

if(GPS_ACTIVE())
           {
             if(_fpGPSINFO)
               {
35               iRet = (*_fpGPSINFO)(dwItem,dwValue,dwValue1);
               }
```

- 127 -

```
        else
          {
            iRet = GPS_ERROR_DLL_BIND;
          }
  5     }
        else
        {
          iRet = GPS_ERROR_INACTIVE;
        }

10     return iRet;

} endif _Windows

//////////////////////////////////////////////////////////////
      //////////////////////////////////////////////////////////////
 15   //////////////////////////////////////////////////////////////

//////////////////////////////////////////////////////////////////
      // VZN3PLUG.H
      //
      //   Class declaration and interface description for the inVzn ISII device.
 20   //
      ////////////////////////////////////////////////////////////////// ifndef __VZN3PLUG_H
      #define __VZN3PLUG_H include <platform.h>

25   #if !defined(RC_INVOKED)

#if !defined(_Windows)
         struct __ErrorTablePlug
           {
             unsigned int    uiErrorCode;
 30          char         *  szErrorText;
```

```
    };
        extern struct __ErrorTablePlug __ISL_PLUG_ErrorTable[];
    #endif define DEFAULT_PLUG_CACHE_SIZE 50

5   #if defined(__WIN32__)
    #include <..\plug\hrdlcknt\hlapi_c.h>
    #else
    //*****************************************************************************
    *********
10  // The following for the Hard Lock API
    //*****************************************************************************
    *********
    #if defined(__cplusplus)
    extern "C" {
15  #endif
    void HLCRYPT                        // Does a nice job of finding the hard lock
        (
            WORD * pwStatus,            // 1 if Error
            WORD * pwPort,              // Returns Port where HL is
20          WORD * pwHLAddress,         // inVzn "PIN" number
            LPSTR szTmpStr,             // Not used (Would be encrypted data)
            WORD * pwBlock              // Not used (Number of 8 byte blocks)
        );
    void INTON(void);                   // sti
25  void INTOFF(void);                  // cli
    void HLON(WORD * wpPort,WORD * wpHLAdress); // Turn me on BABY!
    void HLOFF(WORD * pwPort);          // Bummer
    void HLWSTR(WORD * pwPort,LPSTR szData);    // Writes 32 bytes
    void HLRSTR(WORD * pwPort,LPSTR szData);    // Returns 128 Bytes
30  #if defined(__cplusplus)
    }
    #endif
    #endif
```

```
                #include <combonum.h> typedef struct __ISIINumber
                {
                    char    cSeries         [1];    // Plug series
5               char    cPlugSerialNo   [7];    // Unique Plug Serial Number
                    char    cReserved       [3];    //
                    char    cImageInc       [6];    // Unique image ID
                    char    cNULL           [1];    // Allocation for null terminator } ISII, * ptrISII;

10              enum DataItem
                {
                    attrType            = 1,
                    attrSeries          = 2,
                    attrSerialNumber    = 3,
15              attrCreator         = 4,
                    attrVendorID        = 5,
                    attrLastUpdate      = 6,
                    attrExpiration      = 7,
                    attrClicksPurchased = 8,
20              attrStartVolumeID   = 9,
                    attrStartImageInc   = 10, attrExpired         = 100,
                    attrLastVolID       = 101,
                    attrLastImageInc    = 102,
25              attrClicksRemaining = 103
                };

#if defined(__WIN32__)
                #define ENUM_AS_INT
                #endif

30      /////////////////////////////////////////////////////////////////
```

BANNER & ALLEGRETTI, LTD.
10 South Wacker Drive
Suite 3000
Chicago, Illinois 60606

```
// Enum Mappings for CPP and C compilation
//
//
#if defined(__cplusplus) && !defined(ENUM_AS_INT)
#define PLUGDATA DataItem
#else
#define PLUGDATA unsigned short
endif define ISII_LENGTH_TYPE          4
define ISII_LENGTH_SERIES        1
#define ISII_LENGTH_SERIAL_NUMBER 7
#define ISII_LENGTH_CREATOR       4
#define ISII_LENGTH_VENDOR        10
#define ISII_LENGTH_UPDATE        8
#define ISII_LENGTH_EXPIRATION    8
#define ISII_LENGTH_VOLID         4
#define ISII_LENGTH_IMAGE_INC     6
#define ISII_LENGTH_EXPIRED       1

//*************************************************************
// The following structures allow access to the HARD lock data.
//************************************************************* typedef struct NEW_HARD_LOCK
{
    // Read Only Section char   cPlugType[4];       // Should contain 'PLG1'
    WORD   wReadCRC;           // CRC for READ ONLY DATA
    char   cSeries;            // Plug Series Number
    char   cSerialNumber[7];   // Plug Serial Number
```

```
        char    cPlugCreator[4];        // Initials of user creating plug
        DWORD   dwPlugOrdinal;          // Plug database record number
        char    cReserved1[6];          // Reserved for future expansion
        char    cVendorID[10];          // Vendor ID
  5     char    cUpdateDate[8];         // Date plug was last updated at inVzn
        char    cExpirationDate[8];     // Date plug will expire
        DWORD   dwClicksPurchased;      // Number of clicks purchased
        char    cStartVolID[4];         // Starting VOLID when plug was created
        char    cStartingImageInc[6];   // Starting ImageInc when plug was created
 10     char    cReserved2[28];

// Field Writable Section

WORD    wWriteCRC;              // CRC for writeable data
        char    cPlugExpired;           // Boolean flag to indicate that the plug has expired once!
        char    cLastVolID[4];          // Last VolID plug dispensed
 15     char    cLastImageInc[6];      // Last Image Increment Dispensed
        DWORD   dwPlugCounter;          // Number of "clicks" left
        char    cReserved3[15];

} HL_PLG1, * ptrHL_PLG1;

#if defined(__BORLANDC__)
 20     #if (sizeof(HL_PLG1) != 128)
        #error The Hard Lock Structure MUST be Exactly 128 Bytes!
        #endif
        #endif if defined(__cplusplus)
 25     extern "C" {
        #endif int     PLATFORM VznPlg_ChargeClick();
        int     PLATFORM VznPlg_GetISIINumber(ptrISII pISII,BOOL bChargeClick);
        int     PLATFORM VznPlg_GetVolumeID(LPSTR lpszVolID);
 30     int     PLATFORM VznPlg_FlushCache();
        int     PLATFORM VznPlg_GetUpdatePasscode(LPSTR lpszPasscode);
        int          PLATFORM   VznPlg_PurchaseClicks(LPSTR    lpszUserPasscode,DWORD
        dwClicksPurchased);
        DWORD PLATFORM VznPlg_ReadRemainingClicks();
 35     DWORD PLATFORM VznPlg_ReadRemainingISIINumbers();
```

```
     int  PLATFORM VznPlg_ReadPlugItem(PLUGDATA attr,DWORD dwItem,BOOL bNull);
     int  PLATFORM VznPlg_GetError();
     int  PLATFORM VznPlg_GetErrorString(int iError,char * szError,int iLength);
     int  PLATFORM VznPlg_SetCacheSize(WORD wSize);
5    int  PLATFORM VznPlg_GetPlug(ptrHL_PLG1 pBuffer);
     int  PLATFORM VznPlg_Reset();
     void PLATFORM VznPlg_TerminateSession();

#if defined(__cplusplus)
     }
10   #endif if defined(__cplusplus)

struct Plug
     {
        virtual void * GetPlugAddress(void * Data,DataItem attr) = 0;
15   };

#if defined(__BORLANDC__)
     #pragma warn -inl
     #endif
     struct Plug1 : public Plug
20   {
        void * GetPlugAddress(void * pData,DataItem attr)
        {
           register ptrHL_PLG1 Data = (ptrHL_PLG1) pData;

switch(attr)
25         {
             case attrType            : return  NULL;
             case attrSeries          : return  &Data->cSeries;
             case attrSerialNumber    : return  Data->cSerialNumber;
             case attrCreator         : return  Data->cPlugCreator;
30           case attrVendorID        : return  Data->cVendorID;
             case attrLastUpdate      : return  Data->cUpdateDate;
             case attrExpiration      : return  Data->cExpirationDate;
             case attrClicksPurchased : return  &Data->dwClicksPurchased;
             case attrStartVolumeID   : return  Data->cStartVolID;
35           case attrStartImageInc   : return  Data->cStartingImageInc;
```

```
              case attrExpired        : return &Data->cPlugExpired;
              case attrLastVolID      : return  Data->cLastVolID;
              case attrLastImageInc   : return  Data->cLastImageInc;
              case attrClicksRemaining: return &Data->dwPlugCounter;

5             default                 : return NULL;
          }
       };
    };

class VZN_CLASS ISIIDevice
10     {
              friend int PLATFORM VznPlg_GetPlug(ptrHL_PLG1 pBuffer);

private :
          #if !defined(__WIN32__)
          WORD wPort;
15        #endif WORD wCacheSize;

int  iError;
          BOOL bCacheReady;
          int  iCachedItems;

20        char PlugBuffer[sizeof(HL_PLG1)];

Plug * pControl;

int   ReadPlug (char * Data);
          int   WritePlug(char * Data);

int   ReadPlugData();
25        int   WritePlugData();

int   FindPlug();
          int   GetPlug(ptrHL_PLG1);
```

```
        void   InitMemberVariables();

int    PreChargeClickCache();
        int    GetImageID(LPSTR lpszImageID,BOOL bUpdate,BOOL bCharge);

int    CheckPlugCRC(char * lpBuffer);
5       WORD   MakeWriteCRC(char * lpBuffer);

DWORD  RemainingClicks(void);
        DWORD  RemainingISIINumbers(void);

public :

// Functions that will update the plug
10      int   PLATFORM ChargeClick();
        int   PLATFORM GetISIINumber(ptrISII pISII,BOOL bChargeClick = TRUE);
        int   PLATFORM GetVolumeID(LPSTR lpszVolID);

int   PLATFORM FlushCache();
        int   PLATFORM GetUpdatePasscode(LPSTR lpszPasscode);
15      int   PLATFORM PurchaseClicks(LPSTR lpszUserPasscode,DWORD dwClicksPurchased);

// Functions that let you know whats going on!

DWORD PLATFORM ReadRemainingClicks();
        DWORD PLATFORM ReadRemainingISIINumbers();
        int   PLATFORM ReadPlugItem(DataItem attr,DWORD dwItem,BOOL bNull = FALSE);
20      int   PLATFORM GetError();
        int   PLATFORM Reset();
        int   PLATFORM GetErrorString(int iError,char * szError,int iLength);

// Configuration int   PLATFORM SetCacheSize(WORD wSize);

25      PLATFORM ISIIDevice();
        PLATFORM ~ISIIDevice();
     };

ISIIDevice * PLATFORM GetISIIDevice();
```

- 135 -

```
            void PLATFORM ReleaseISIIDevice();

endif // __cplusplus endif // RC_INVOKED

//
 5          //ISII Device Errors
            //
            #define ISII_ERROR_NONE              0
            #define ISII_ERROR_NO_DEVICE         4103
            #define ISII_ERROR_WRITE_ERROR       4104
10          #define ISII_ERROR_UNSUPPORTED_DEVICE 4105
            #define ISII_ERROR_NO_CLICKS         4106
            #define ISII_ERROR_CRYPT_ERROR       4107
            #define ISII_ERROR_NOT_SUPPORTED     4108
            #define ISII_ERROR_PLUG_READ         4109
15          #define ISII_ERROR_READONLY_CRC_FAILURE 4110
            #define ISII_ERROR_RW_CRC_FAILURE    4111
            #define ISII_ERROR_NOT_IMPLEMENTED   4112
            #define ISII_ERROR_PLUG_EMPTY        4113
            #define ISII_ERROR_MEMORY_ERROR      4114

20          #endif

/////////////////////////////////////////////////////////
            /////////////////////////////////////////////////////////
            ///////////////////////////////////////////////////////// include <combonum.h>
25          #include <stdlib.h>
            #include <string.h>

/////////////////////////////////////////////////////////////
            // IncrementComboNumber : Handles incrementing of a inVzn XX99999 type number
            //
30          // szString : contains the string with the inVzn Plug Number
            // wBase36  : Number of Base36 characters
            // wBase10  : Number of Base10 characters
```

////////////////////////////////////////////////////////////////

```c
int PLATFORM IncrementComboNumber(LPSTR szString,WORD wBase36,WORD wBase10)
{
  int iRet = 0;
  LPSTR lpszTemp;

lpszTemp = (char *)calloc(1,wBase36+wBase10+2);

if(lpszTemp)
    {
      BOOL  bDone     = FALSE;
      WORD  wPosition = wBase36 + wBase10 - 1;

strncpy(lpszTemp,szString,wBase36+wBase10);

do
        {
          lpszTemp[wPosition] += 1;

if(wPosition >= wBase36)
            {
              if( (lpszTemp[wPosition] >= '0') && (lpszTemp[wPosition] <= '9') )
                {
                  bDone = TRUE;
                }
              else
                {
                  if( lpszTemp[wPosition] == ':' )
                    {
                      lpszTemp[wPosition] = '0';
                      wPosition--;
                    }
                  else
                    {
                      iRet  = COMBO_ERROR_COMBO_ERROR;
                      bDone = TRUE;
                    }
                }
            }
          else
            {
```

```
      if( ((lpszTemp[wPosition] >= '0') && (lpszTemp[wPosition] <= '9')) ||
          ((lpszTemp[wPosition] >= 'A') && (lpszTemp[wPosition] <= 'Z'))  )
      {
        bDone = TRUE;
      }
      else
      {
        if( lpszTemp[wPosition] == ':' )
        {
          lpszTemp[wPosition] = 'A';
          bDone = TRUE;
        }
        else if( lpszTemp[wPosition] == '[' )
        {
          lpszTemp[wPosition] = '0';

if(wPosition)
          {
            wPosition--;
          }
          else
          {
            iRet = COMBO_ERROR_OVERFLOW;
            bDone = TRUE;
          }
        }
        else
        {
          iRet = COMBO_ERROR_COMBO_ERROR;
          bDone = TRUE;
        }
      }
    }
    while(!bDone);

if(!iRet)
    {
      strncpy(szString,lpszTemp,wBase36+wBase10);
    } free(lpszTemp);
```

```
      }
    else
      {
        iRet = COMBO_ERROR_MEMORY_ERROR;
      } return iRet;
}

////////////////////////////////////////////////////////////
//
////////////////////////////////////////////////////////////

DWORD PLATFORM Combo2Long(LPSTR szString,WORD wBase36,WORD wBase10)
{
    DWORD   dwRet          = 0;
    int     iDigit         = wBase36 + wBase10;
    DWORD   dwMultiplier   = 1;

do
      {
        char    szDigit[2] = {szString[iDigit-1],0};
        char *  Unused;
        DWORD   dwValue;

dwValue = strtoul(szDigit,&Unused,36);

dwRet += (dwValue*dwMultiplier);

iDigit--;

if( iDigit >= wBase36 )
          {
            dwMultiplier *= 10;
          }
        else if(iDigit)
          {
            dwMultiplier *= 36;
          }
      }
    while(iDigit);
```

```
                return dwRet;
            }

5       ////////////////////////////////////////////////////////////
        ////////////////////////////////////////////////////////////
        ////////////////////////////////////////////////////////////

//////////////////////////////////////////////////////////////////
        //  VZN3PLUG.CPP
        //
        //
10      //   Implements the interface to the Hard Lock ISII device.
        //
        ////////////////////////////////////////////////////////////////// include <vzn3plug.h>
        #include <stdlib.h>
15      #include <string.h>
        #include <time.h>
        #include <stdio.h> static ISIIDevice * TheISIIDevice;

//////////////////////////////////////////////////////////////////
20      //
        ////////////////////////////////////////////////////////////////// class PlugPin
        {
            WORD wBad;

25          inline void GetThePin()
            {
                DWORD dwStart = (10603ul ^ 0xA12095E1);

wBad = dwStart ^ 0xA12095E1;
            };
```

BANNER & ALLEGRETTI, LTD.
10 South Wacker Drive
Suite 3000
Chicago, Illinois 60606                            - 140 -

```
    public:
        inline operator WORD()   { GetThePin(); return wBad; };
        inline operator WORD & () { GetThePin(); return wBad; };
        inline operator WORD * () { GetThePin(); return &wBad; };

5       inline PlugPin() { wBad = 0x8912; };
        inline ~PlugPin() { wBad = 0xA315; };
    };

//////////////////////////////////////////////////////////////////////
    //
10  ////////////////////////////////////////////////////////////////////// static inline void BumpCode(char * Buffer,BOOL bNewCode)
    {
      static DWORD dwXValue;

if(bNewCode)
15      {
        #if !defined(_Windows)
          dwXValue = 0x1340AECB;
        #else
          dwXValue = GetCurrentTime();
20      #endif
        } int iLength = sizeof(HL_PLG1);

for(;iLength/4;iLength-=4)
        {
25      *(DWORD *)Buffer = *(DWORD *)Buffer ^ dwXValue;
        Buffer += 4;
        }
    }
```

```
//////////////////////////////////////////////////////////////
//
//////////////////////////////////////////////////////////////
int ISIIDevice::FindPlug()
{
  WORD wStatus = 0;

#if !defined(__WIN32__)
  char   Unused[8] = {45,234,89,16,1,28,150,56};;
  WORD   wBlocks = 1;
  HLCRYPT(&wStatus,&wPort,PlugPin(),Unused,&wBlocks);
  #else
  char Unused[8] = {0,0,0,0,0,0,0,0};
  wStatus = HL_LOGIN(PlugPin(),LOCAL_DEVICE,Unused,Unused);
  #endif return wStatus;
}

//////////////////////////////////////////////////////////////
//
//////////////////////////////////////////////////////////////

PLATFORM ISIIDevice::ISIIDevice()
{
  InitMemberVariables();
/*
  MessageBeep(0);
  MessageBox(NULL,"ISIIDevice::ISIIDevice()","ISIIDevice",MB_OK|MB_TASKMODAL);
*/
  if(FindPlug())
    {
      iError = ISII_ERROR_NO_DEVICE;
    }
  else
    {
      iError = ReadPlugData();
    }
}
```

```
///////////////////////////////////////////////////////////
//
///////////////////////////////////////////////////////////

PLATFORM ISIIDevice::~ISIIDevice()
 5       {

//MessageBox(NULL,"ISIIDevice::~ISIIDevice()","ISIIDevice",MB_OK|MB_TASKMODAL);
           FlushCache();

#if defined(__WIN32__)
10         HL_LOGOUT();
           #endif
              //MessageBox(NULL,"ISIIDevice::~ISIIDevice() \n
           2","ISIIDevice",MB_OK|MB_TASKMODAL);
         }

15  ///////////////////////////////////////////////////////////
    //
    /////////////////////////////////////////////////////////// int PLATFORM ISIIDevice::FlushCache()
         {
20         int    iRet = ISII_ERROR_NONE;
           char   Buffer[sizeof(HL_PLG1)];
           LPSTR  lpsCacheSerial;
           LPSTR  lpsPlugSerial;

if(bCacheReady)
25         {
             BumpCode(PlugBuffer,FALSE);
             ReadPlug(Buffer);
             BumpCode(Buffer,FALSE);

lpsCacheSerial = (char *) pControl->GetPlugAddress(Buffer,attrSerialNumber);
30           lpsPlugSerial  = (char *) pControl->GetPlugAddress(Buffer,attrSerialNumber);

if(!strncmp(lpsCacheSerial,lpsPlugSerial,ISII_LENGTH_SERIAL_NUMBER))
             {
               iRet = WritePlug(PlugBuffer);
             }
```

```
         BumpCode(Buffer,TRUE);    // Don't change order!
         BumpCode(PlugBuffer,TRUE);

bCacheReady = FALSE;
       }

5    iError = iRet;

return iRet;
   }

//////////////////////////////////////////////////////////
   //
10 ////////////////////////////////////////////////////////// int PLATFORM ISIIDevice::GetError()
   {
     return iError;
   }

15 //////////////////////////////////////////////////////////
   //
   ////////////////////////////////////////////////////////// int PLATFORM ISIIDevice::Reset()
   {
20   FlushCache();

if(FindPlug())
       {
         iError = ISII_ERROR_NO_DEVICE;
       }
25   else
       {
         iError = ReadPlugData();
       }

30   return(iError);
   }
```

```
/////////////////////////////////////////////////////////////
//
///////////////////////////////////////////////////////////// void ISIIDevice::InitMemberVariables()
 5   {
       #if !defined(__WIN32__)
       wPort       = 0;
       #endif bCacheReady = FALSE;
10     wCacheSize  = DEFAULT_PLUG_CACHE_SIZE;

}

/////////////////////////////////////////////////////////////
// WritePlug : Writes data to the HardLock with verify
/////////////////////////////////////////////////////////////

15   int ISIIDevice::WritePlug(char * hlData)
     {
       char  szTemp[sizeof(HL_PLG1)];
       int   iCount = 0;
       int   iRet   = ISII_ERROR_NONE;

20     #if !defined(__WIN32__)
       HLON(&wPort,PlugPin());
       #endif do
       {
25       #if !defined(__WIN32__)
         HLWSTR(&wPort,hlData+96);
         HLRSTR(&wPort,szTemp);
         #else
         HL_WRITEBL(hlData+96);
30       HL_READBL(szTemp);
         #endif if( !memcmp(szTemp,hlData,sizeof(HL_PLG1)) )
         {
```

```
          break;
        }
      else
        {
          iCount++;
        }
    }
  while(iCount < 10);

#if !defined(__WIN32__)
  HLOFF(&wPort);
  #endif if(iCount == 10)
    {
      iRet = ISII_ERROR_WRITE_ERROR;
    }

BumpCode(szTemp,FALSE);    // Placed in to make a debuger wonder what is going on!

iError = iRet;

return iRet;
}

///////////////////////////////////////////////////////////////
//
/////////////////////////////////////////////////////////////// int ISIIDevice::CheckPlugCRC(char * lpBuffer)
{
  int    iRet  = ISII_ERROR_NONE;
  char * cWalk = &((ptrHL_PLG1)lpBuffer)->cSeries;
  int    iWalk = 0;
  WORD   wCRC  = 0;

for(iWalk=0;iWalk<90;iWalk+=2)
    {
      wCRC += (unsigned)cWalk;
    } if( ((ptrHL_PLG1)lpBuffer)->wReadCRC != wCRC )
```

```
        {
          iRet = ISII_ERROR_READONLY_CRC_FAILURE;
          goto EXIT_ERROR;
        } cWalk = &((ptrHL_PLG1)lpBuffer)->cPlugExpired;
        wCRC  = 0;

for(iWalk=0;iWalk<30;iWalk+=2)
        {
          wCRC += (unsigned)cWalk;
        } if( ((ptrHL_PLG1)lpBuffer)->wWriteCRC != wCRC )
        {
          iRet = ISII_ERROR_RW_CRC_FAILURE;
        }

EXIT_ERROR:
        iError = iRet;

return iRet;
      }

////////////////////////////////////////////////////////////
//
////////////////////////////////////////////////////////////

WORD ISIIDevice::MakeWriteCRC(char * lpBuffer)
      {
        char * cWalk = &((ptrHL_PLG1)lpBuffer)->cPlugExpired;
        WORD   wCRC  = 0;
        int    iWalk = 0;

for(;iWalk<30;iWalk+=2)
          {
            wCRC += (unsigned)cWalk;
          } return wCRC;
      }
```

- 147 -

```
//////////////////////////////////////////////////////////////////
// ReadHL : Reads the data from the HardLock
////////////////////////////////////////////////////////////////// int ISIIDevice::ReadPlug(char * hlData)
5    {
       int iRet = ISII_ERROR_NONE;
       int iTry = 0;

do
         {
10       #if !defined(__WIN32__)
         HLON(&wPort,PlugPin());
         HLRSTR(&wPort,hlData);
         HLOFF(&wPort);
         #else
15       HL_READBL(hlData);
         #endif //iRet = CheckPlugCRC(hlData);

iTry++;
         }
20     while(iRet && (iTry < 10) );

BumpCode(hlData,TRUE);

iError = iRet;

return iRet;
     }

25   //////////////////////////////////////////////////////////////////
     // PreChargeClickCache :
     //
     //     This function "charges" the user PLUG_CACHE_SIZE clicks.
     //
30   //////////////////////////////////////////////////////////////////
```

```
int ISIIDevice::PreChargeClickCache()
{
    DWORD  * lpdwPlugClick;      // Pointer to Click Field
    LPSTR    lpszPlugImageID;    // Pointer to Image ID Field
    WORD     wPreCharge;
    int      iRet = ISII_ERROR_NONE;
    char     szBuffer[sizeof(HL_PLG1)];

memcpy(szBuffer,PlugBuffer,sizeof(HL_PLG1));

lpdwPlugClick    = (DWORD*) pControl->GetPlugAddress(szBuffer,attrClicksRemaining);
    lpszPlugImageID  = (char *) pControl->GetPlugAddress(szBuffer,attrLastImageInc );

BumpCode(szBuffer,FALSE);

DWORD  dwISIINumbers  =  Combo2Long("ZZ9999",2,4) - Combo2Long(lpszPlugImageID,2,4);

if(min(*lpdwPlugClick,dwISIINumbers) >= wCacheSize)
    {
      *lpdwPlugClick -= wCacheSize;
      wPreCharge = wCacheSize;
    }
    else
    {
      wPreCharge = min(*lpdwPlugClick,dwISIINumbers);//*lpdwPlugClick;

if(*lpdwPlugClick < dwISIINumbers)
      {
        *lpdwPlugClick = 0;
      }
    } iCachedItems = wPreCharge;

if(wPreCharge)
    {
      for(;wPreCharge;wPreCharge--)
      {
        iRet = IncrementComboNumber(lpszPlugImageID,2,4);
        if(iRet) break;
      }
```

```
          if(!iRet)
            {
              iRet = WritePlug(szBuffer);
            }
          }
        else
          {
            iRet = ISII_ERROR_PLUG_EMPTY;
          }

BumpCode(szBuffer,FALSE);   // Recode buffer so it isn't sitting around
                                    // DON'T update CODE!!!!!

iError = iRet;

return iRet;
      }

/////////////////////////////////////////////////////////////////
//
///////////////////////////////////////////////////////////////// int ISIIDevice::GetPlug(ptrHL_PLG1 pBuffer)
      {
        int iRet = ISII_ERROR_NONE;

iRet = ReadPlugData();

if(!iRet || ((unsigned)iRet == ISII_ERROR_PLUG_EMPTY))
          {
            BumpCode(PlugBuffer,FALSE);
            memcpy(pBuffer,PlugBuffer,sizeof(HL_PLG1));
            BumpCode(PlugBuffer,TRUE);
          } iError = iRet;

return iRet;
      }
```

```
///////////////////////////////////////////////////////////
//
/////////////////////////////////////////////////////////// int ISIIDevice::ReadPlugData()
 5    {
        char szBuffer[130];
        int iRet = ISII_ERROR_NONE;

if(!bCacheReady)
         {
10         ReadPlug(szBuffer);

BumpCode(szBuffer,FALSE);

if(!memcmp( &szBuffer[0],"PLG1",4))
            {
              pControl = new Plug1;
15          }
           else
            {
              return ISII_ERROR_UNSUPPORTED_DEVICE;
            }

20         memcpy(PlugBuffer,szBuffer,sizeof(HL_PLG1));

BumpCode(szBuffer,TRUE);   // Just to make life interesting..
           BumpCode(PlugBuffer,TRUE);

iRet = PreChargeClickCache();

if(!iRet)
25          {
              bCacheReady = TRUE;
            }
         } iError = iRet;

30       return iRet;
      }
```

```
////////////////////////////////////////////////////////////////
//
////////////////////////////////////////////////////////////////
int ISIIDevice::WritePlugData()
{
  int iRet = ISII_ERROR_NONE;

if(!bCacheReady || !iCachedItems)
    {
      iRet = WritePlug(PlugBuffer);
      bCacheReady = FALSE;
    } iCachedItems--;

iError = iRet;

return iRet;
}

////////////////////////////////////////////////////////////////
//
////////////////////////////////////////////////////////////////

DWORD ISIIDevice::RemainingClicks(void)
{
  return * (DWORD *)pControl->GetPlugAddress(PlugBuffer,attrClicksRemaining);
}

////////////////////////////////////////////////////////////////
//
////////////////////////////////////////////////////////////////

DWORD PLATFORM ISIIDevice::ReadRemainingClicks(void)
{
  DWORD dwRet = 0;
  int   iRet = ReadPlugData();

if(!iRet || ((unsigned)iRet == ISII_ERROR_PLUG_EMPTY))
    {
```

```
         BumpCode(PlugBuffer,FALSE);
         dwRet = RemainingClicks();
         BumpCode(PlugBuffer,TRUE);
      } return dwRet;
}

///////////////////////////////////////////////////////////////
//
///////////////////////////////////////////////////////////////

DWORD ISIIDevice::RemainingISIINumbers(void)
{
      LPSTR lpsImageIncrement = (char *)
   pControl->GetPlugAddress(PlugBuffer,attrLastImageInc);

return Combo2Long("ZZ9999",2,4) - Combo2Long(lpsImageIncrement,2,4);
}

///////////////////////////////////////////////////////////////
//
///////////////////////////////////////////////////////////////

DWORD PLATFORM ISIIDevice::ReadRemainingISIINumbers()
{
  DWORD dwRet = 0;
  int   iRet  = 0;

iRet = ReadPlugData();

if(!iRet || ((unsigned)iRet == ISII_ERROR_PLUG_EMPTY))
     {
       BumpCode(PlugBuffer,FALSE);
       dwRet = RemainingISIINumbers();
       BumpCode(PlugBuffer,TRUE);
     }
```

BANNER & ALLEGRETTI, LTD.
10 South Wacker Drive
Suite 3000
Chicago, Illinois 60606

```
       return dwRet;
    }

//////////////////////////////////////////////////////////////////
    // GetVolumeID : GetVolumeID creates an inVzn 12 char volume id
 5  //
    //
    ////////////////////////////////////////////////////////////////// int PLATFORM ISIIDevice::GetVolumeID(LPSTR lpszVolID)
    {
10    int     iRet      = ISII_ERROR_NONE;

iRet = FlushCache();

if(!iRet)
        {
          iRet = ReadPlugData();

15        if(!iRet || ((unsigned)iRet == ISII_ERROR_PLUG_EMPTY))
            {
             BumpCode(PlugBuffer,FALSE);

LPSTR    l p s z P l u g V o l I D          =    ( L P S T R )
           pControl->GetPlugAddress(PlugBuffer,attrLastVolID);
20                 LPSTR    l p s S e r i a l N u m b e r      =    ( L P S T R )
           pControl->GetPlugAddress(PlugBuffer,attrSerialNumber);
             LPSTR lpsSeries    = (LPSTR) pControl->GetPlugAddress(PlugBuffer,attrSeries);

memset(lpszVolID,0,13);

strncpy(lpszVolID,lpsSeries,ISII_LENGTH_SERIES);
25           strncat(lpszVolID,lpsSerialNumber,ISII_LENGTH_SERIAL_NUMBER);
             strncat(lpszVolID,lpszPlugVolID,ISII_LENGTH_VOLID);

IncrementComboNumber(lpszPlugVolID,2,2);
             WritePlugData();

BumpCode(PlugBuffer,TRUE);
30          }
        }
```

```
         iError = iRet;

return iRet;
      }

5    ////////////////////////////////////////////////////////////////
      //
      //////////////////////////////////////////////////////////////// int PLATFORM ISIIDevice::ReadPlugItem(DataItem attr,DWORD dwItem,BOOL bNull)
      {
         int    iRet    = ISII_ERROR_NONE;

10       iRet = ReadPlugData();

if(!iRet || ((unsigned)iRet == ISII_ERROR_PLUG_EMPTY))
         {
            DWORD * lpAddress   = (DWORD*)pControl->GetPlugAddress(PlugBuffer,attr);

#define MAP_NULL(test,dest,size) if(test) memset(dest,0,size+1)
15          #define MAP_COPY(dest,data,size) strncpy((char*)dest,(char*)data,size);

if(lpAddress)
            {
              BumpCode(PlugBuffer,FALSE);

switch(attr)
20            {
                case attrType :
                    MAP_NULL(bNull,(void*) dwItem,ISII_LENGTH_TYPE);
                    MAP_COPY(dwItem,lpAddress,ISII_LENGTH_TYPE);
                    break;

25              case attrSeries :
                    MAP_NULL(bNull,(void*) dwItem,ISII_LENGTH_SERIES);
                    MAP_COPY(dwItem,lpAddress,ISII_LENGTH_SERIES);
                    break;

case attrSerialNumber :
30                  MAP_NULL(bNull,(void*) dwItem,ISII_LENGTH_SERIAL_NUMBER);
                    MAP_COPY(dwItem,lpAddress,ISII_LENGTH_SERIAL_NUMBER);
                    break;
```

```
            case attrCreator :
                MAP_NULL(bNull,(void*) dwItem,ISII_LENGTH_CREATOR);
                MAP_COPY(dwItem,lpAddress,ISII_LENGTH_CREATOR);
                break;

case attrVendorID :
                MAP_NULL(bNull,(void*) dwItem,ISII_LENGTH_VENDOR);
                MAP_COPY(dwItem,lpAddress,ISII_LENGTH_VENDOR);
                break;

case attrLastUpdate :
                MAP_NULL(bNull,(void*) dwItem,ISII_LENGTH_UPDATE);
                MAP_COPY(dwItem,lpAddress,ISII_LENGTH_UPDATE);
                break;

case attrExpiration :
                MAP_NULL(bNull,(void*) dwItem,ISII_LENGTH_EXPIRATION);
                MAP_COPY(dwItem,lpAddress,ISII_LENGTH_EXPIRATION);
                break;

case attrClicksPurchased :
                *(DWORD*)dwItem = *(DWORD*)lpAddress;
                break;

case attrStartVolumeID :
                MAP_NULL(bNull,(void*) dwItem,ISII_LENGTH_VOLID);
                MAP_COPY(dwItem,lpAddress,ISII_LENGTH_VOLID);
                break;

case attrStartImageInc :
                MAP_NULL(bNull,(void*) dwItem,ISII_LENGTH_IMAGE_INC);
                MAP_COPY(dwItem,lpAddress,ISII_LENGTH_IMAGE_INC);
                break;

case attrExpired :
                MAP_NULL(bNull,(void*) dwItem,ISII_LENGTH_EXPIRED);
                MAP_COPY(dwItem,lpAddress,ISII_LENGTH_EXPIRED);
                break;

case attrLastVolID :
                MAP_NULL(bNull,(void*) dwItem,ISII_LENGTH_VOLID);
                MAP_COPY(dwItem,lpAddress,ISII_LENGTH_VOLID);
```

```
                    break;

case attrLastImageInc :
                MAP_NULL(bNull,(void*) dwItem,ISII_LENGTH_IMAGE_INC);
                MAP_COPY(dwItem,lpAddress,ISII_LENGTH_IMAGE_INC);
                break;

case attrClicksRemaining :
                *(DWORD*)dwItem = *(DWORD*)lpAddress;
                break;
            }
            BumpCode(PlugBuffer,TRUE);
        }
        else
        {
            iRet = ISII_ERROR_NOT_SUPPORTED;
        }
    } iError = iRet;

return iRet;
}

//////////////////////////////////////////////////////////////
//
////////////////////////////////////////////////////////////// int ISIIDevice::GetImageID(LPSTR lpszImageID,BOOL bUpdate,BOOL bChargeClick)
{
    int      iRet       = ISII_ERROR_NONE;
    LPSTR    lpszPlugImageID;
    DWORD    * lpdwPlugClick;

iRet = ReadPlugData();

if(!iRet || ((unsigned)iRet == ISII_ERROR_PLUG_EMPTY))
    {
        lpdwPlugClick           = ( D W O R D * )
pControl->GetPlugAddress(PlugBuffer,attrClicksRemaining);
        lpszPlugImageID = (char *) pControl->GetPlugAddress(PlugBuffer,attrLastImageInc );
```

```
      BumpCode(PlugBuffer,FALSE);
      if(bUpdate)
        {
          if(*lpdwPlugClick)
            {
              if(bChargeClick) (*lpdwPlugClick)--;

iRet = IncrementComboNumber(lpszPlugImageID,2,4);

if(!iRet)
                {
                  WritePlugData();
                }
              else
                {
                  iRet = ISII_ERROR_PLUG_EMPTY;
                }
            }
          else
            {
              iRet = ISII_ERROR_NO_CLICKS;
            }
        } memset(lpszImageID,0,ISII_LENGTH_IMAGE_INC + 1);
      strncpy(lpszImageID,lpszPlugImageID,ISII_LENGTH_IMAGE_INC);

BumpCode(PlugBuffer,TRUE);
    } iError = iRet;

return iRet;
}

/////////////////////////////////////////////////////////////////
//
///////////////////////////////////////////////////////////////// int PLATFORM ISIIDevice::ChargeClick()
{
```

```
        DWORD   * lpdwPlugClick;
        int     iRet = ISII_ERROR_NONE;

iRet = ReadPlugData();

if(!iRet || ((unsigned)iRet == ISII_ERROR_PLUG_EMPTY))
5       {
                lpdwPlugClick           = ( D W O R D * )
        pControl->GetPlugAddress(PlugBuffer,attrClicksRemaining);

BumpCode(PlugBuffer,FALSE);

if(*lpdwPlugClick)
10        {
            (*lpdwPlugClick)--;

iRet = WritePlugData();
          }
          else
15        {
            iRet = ISII_ERROR_NO_CLICKS;
          }

BumpCode(PlugBuffer,TRUE);
        }

20      iError = iRet;

return iRet;
        }

////////////////////////////////////////////////////////////
        //
25      //////////////////////////////////////////////////////////// int PLATFORM ISIIDevice::GetISIINumber(ptrISII pISII,BOOL bChargeClick)
        {
          int     iRet = 0;
          char    szTemp[36];
30        LPSTR              lpsSerialNumber          = ( c h a r  * )
        pControl->GetPlugAddress(PlugBuffer,attrSerialNumber);
          LPSTR   lpsSeries  = (char *) pControl->GetPlugAddress(PlugBuffer,attrSeries);
```

BANNER & ALLEGRETTI, LTD.
10 South Wacker Drive
Suite 3000
Chicago, Illinois 60606

```
        memset(szTemp,0,sizeof(szTemp));

iRet = ReadPlugData();

BumpCode(PlugBuffer,FALSE);   // Decode if(!iRet || ((unsigned)iRet == ISII_ERROR_PLUG_EMPTY))
 5        {
          szTemp[0] = *lpsSeries;
          strncat(szTemp,lpsSerialNumber,ISII_LENGTH_SERIAL_NUMBER);
          strcat(szTemp,"000");

BumpCode(PlugBuffer,FALSE);       // Recoded
10        iRet = GetImageID(&szTemp[11],TRUE,bChargeClick);
         } if(!iRet)
          {
          strcpy((char *)pISII,szTemp);
15        } iError = iRet;

return(iRet);
        }

//////////////////////////////////////////////////////////////////
20      //
        ////////////////////////////////////////////////////////////////// int PLATFORM ISIIDevice::SetCacheSize(WORD wSize)
        {
          wCacheSize = wSize;

25        return ISII_ERROR_NONE;
        }

//////////////////////////////////////////////////////////////////
        //
```

BANNER & ALLEGRETTI, LTD.
10 South Wacker Drive
Suite 3000
Chicago, Illinois 60606

- 160 -

```
//////////////////////////////////////////////////////////////// int PLATFORM ISIIDevice::PurchaseClicks(LPSTR,DWORD)
{
  return ISII_ERROR_NOT_IMPLEMENTED;
}

////////////////////////////////////////////////////////////////
//
//////////////////////////////////////////////////////////////// int PLATFORM ISIIDevice::GetUpdatePasscode(LPSTR)
{
  return ISII_ERROR_NOT_IMPLEMENTED;
}

////////////////////////////////////////////////////////////////
//
////////////////////////////////////////////////////////////////
#if defined(_Windows) || defined(_WINDOWS)
extern "C" HINSTANCE _hInstance;
endif int PLATFORM ISIIDevice::GetErrorString(int iCode,char * szBuffer,int iLength)
{
  #if !defined(_Windows) && !defined(_WINDOWS)
  int iWalk = 0;
  do
    {
      if(__ISL_PLUG_ErrorTable[iWalk].uiErrorCode == iCode)
        {
          strncpy(szBuffer,__ISL_PLUG_ErrorTable[iWalk].szErrorText,iLength);
          break;
        }
      iWalk++;
    }
  while(__ISL_PLUG_ErrorTable[iWalk].uiErrorCode < 0xFFFF);
  #else
  LoadString(_hInstance,VZN_ERROR_BASE + iCode,szBuffer,iLength);
  #endif
```

```
      return(FALSE);
    }

////////////////////////////////////////////////////////////////
    //
5   ////////////////////////////////////////////////////////////////

ISIIDevice * PLATFORM GetISIIDevice()
    {
      if(!TheISIIDevice)
        {
10        TheISIIDevice = new ISIIDevice;
        } return TheISIIDevice;
    }

////////////////////////////////////////////////////////////////
15  //
    //////////////////////////////////////////////////////////////// void PLATFORM ReleaseISIIDevice()
    {
      if(TheISIIDevice)
20      {
          delete TheISIIDevice;

TheISIIDevice = NULL;
        }
    }

25  ////////////////////////////////////////////////////////////////
    ////////////////////////////////////////////////////////////////
    ////////////////////////////////////////////////////////////////

////////////////////////////////////////////////////////////////
    //
30  //
    //
    ////////////////////////////////////////////////////////////////
```

BANNER & ALLEGRETTI, LTD.
10 South Wacker Drive
Suite 3000
Chicago, Illinois 60606

```
#include <isl_hash.h>

//////////////////////////////////////////////////////////////////
//
//////////////////////////////////////////////////////////////////
HASH::HASH()
  {
  regA = 0xEE1994EE;
  regB = 0xDDFF4422;
  regC = 0x009922EE;
  regD = 0xFFDDBB99;
  regE = 0x77553311;
  }

//////////////////////////////////////////////////////////////////
//
//////////////////////////////////////////////////////////////////
HASH::HASH(DWORD A,DWORD B,DWORD C,DWORD D,DWORD E)
  {
  regA = A;
  regB = B;
  regC = C;
  regD = D;
  regE = E;
  }

//////////////////////////////////////////////////////////////////
//
//////////////////////////////////////////////////////////////////
void HASH::Flush
    (
     struct HASH  & cache,       // Storage for Left overs !
     int          & leftover,    // Number of leftovers
     DWORD        & align,       // Storage to bytes not aligned
     int          & number       // Number of bytes mis aligned
    )
  {
  char szFlush[sizeof(HASH)*3];

memset(szFlush,0,sizeof(szFlush));
```

```
      AddBuffer(cache,leftover,align,number,(DWORD*)szFlush,sizeof(szFlush));
    }

///////////////////////////////////////////////////////////////////////
    //
    /////////////////////////////////////////////////////////////////////// void HASH::AddBuffer
        (
        struct HASH  & cache,        // Storage for Left overs !
        int          & leftover,     // Number of leftovers
        DWORD        & align,        // Storage to bytes not aligned
        int          & number,       // Number of bytes mis aligned
        void *       lpBuffer,       // New data
        DWORD        dwByteCount     // Amount of new data in bytes
        )
    {
      HASH       * walk;
      char       * lpcWalkBuffer  = (char*)lpBuffer;
      DWORD        dwWalkCount    = 0;
      DWORD      * lpdwEmptyCache = (DWORD *) &cache;
      DWORD      * lpdwFill       = (DWORD *) this;
      int          iBytePos       = 0;

// Insert the left over odd data from the last call into the cache
      // area and pad whats left to DWORD size.

if( (number + dwByteCount) >= sizeof(DWORD) )
      {
        while(number--)
        {
          AddByte(leftover,iBytePos,cache,*((char *)&align+iBytePos));
          iBytePos++;
        } while(iBytePos < sizeof(DWORD))
        {
          AddByte(leftover,iBytePos,cache,*(char*)lpcWalkBuffer);

lpcWalkBuffer++;
          iBytePos++;
          dwByteCount--;  // We are using up a byte
```

```
          }
          // If we have added data to the hash cache tell somebody!

leftover++;
        }
5       if(dwByteCount + (leftover * sizeof(DWORD)) >= sizeof(HASH))
        {
          while(leftover--)
          {
            *(lpdwFill++) ^= *(lpdwEmptyCache++);
10          dwWalkCount++;
          } while(dwWalkCount++ < sizeof(HASH)/sizeof(DWORD) )
          {
            *(lpdwFill++) ^= *(DWORD*)lpcWalkBuffer;

15          lpcWalkBuffer += sizeof(DWORD);
            dwByteCount   -= sizeof(DWORD);
          }
        } walk = (HASH *) lpcWalkBuffer;

20      while( (long)(dwByteCount - sizeof(HASH)) >= 0 )
        {
          regA ^= walk->regA;
          regB ^= walk->regB;
          regC ^= walk->regC;
25        regD ^= walk->regD;
          regE ^= walk->regE;

walk++;
          dwByteCount-=sizeof(HASH);
        }

30      if(leftover < 0) leftover = 0;

lpdwFill    = (DWORD *) &cache;
```

```
        lpdwEmptyCache  = (DWORD *) walk;

lpdwFill       += leftover;

// if((long)dwByteCount < 0) exit(0);

while(dwByteCount >= sizeof(DWORD))
   5    {
           *(lpdwFill++) = *(lpdwEmptyCache++);

leftover++;
           dwByteCount-=sizeof(DWORD);
        }

10    if(number < 0) number = 0;

// Stash left over bytes for next call if(dwByteCount)
        {
           char * into = (char*) &align;

15       memcpy(into+number,lpdwEmptyCache,dwByteCount);

number += dwByteCount;
         }
     }

/////////////////////////////////////////////////////////////
  20 //
     ///////////////////////////////////////////////////////////// void HASH::AddByte(int iReg,int iBytePos,HASH & cache,char cByte)
     {
        *( ((char *) (((DWORD *) &cache)+iReg)) + iBytePos) = cByte;
  25 };

/////////////////////////////////////////////////////////
     /////////////////////////////////////////////////////////
     /////////////////////////////////////////////////////////

/////////////////////////////////////////////////////////
```

BANNER & ALLEGRETTI, LTD.
10 South Wacker Drive
Suite 3000
Chicago, Illinois 60606

```
// VZNTIFF.H
//
// This file assists with the manipulation of TIFF-like image
// files
//
//////////////////////////////////////////////////////////////// ifndef _VZNTIFF_H
define _VZNTIFF_H include <platform.h> define TIFF_ERROR_NONE 0 if defined(__MSC__)
prgama pack (1)
endif

////////////////////////////////////////////////////////////////
// TIFF Tags
//////////////////////////////////////////////////////////////// enum TiffTag
{
    tagNewSubfileType   = 254,
    tagSubfileType      = 255,
    tagImageWidth       = 256,
    tagImageLength      = 257,
    tagBitsPerSample    = 258,
    tagCompression      = 259,
    tagPhotometricInterp = 262,
    tagFillOrder        = 266,
    tagDocumentName     = 269,
    tagImageDescription = 270,
    tagStripOffsets     = 273,
    tagOrientation      = 274,
    tagSamplesPerPixel  = 277,
    tagRowsPerStrip     = 278,
    tagStripByteCounts  = 279,
    tagXResolution      = 282,
```

```
        tagYResolution      = 283,
        tagPageName         = 285,
        tagXPosition        = 286,
        tagYPosition        = 287,
5       tagPageNumber       = 297,
        tagSoftware         = 305,
        tagDateTime         = 306,
        tagArtist           = 315,
        tagINVZNISII        = (int)0x8732,
10      tagINVZNPrivateArea = (int)0x8733,
        tagINVZNReserved1   = (int)0x8734,
        tagINVZNReserved2   = (int)0x8735,
        tagINVZNReserved3   = (int)0x8736
     };

15   typedef struct __Rational
     {
       DWORD n;  // Numerator
       DWORD d;  // denominator
     } RATIONAL, * ptrRATIONAL;

20   /*
     typedef struct __TiffIFD
     {
       DWORD    dwImageWidth;
       DWORD    dwImageLength;
25     DWORD    dwBitsPerSample;
       WORD     wCompression;
       WORD     wPhotometricInterp;
       WORD     wFillOrder;
       char *   lpszDocumentName;
30     char *   lpszImageDescription;
       DWORD *  lpdwStripOffsets;          // See also Strip Byte Counts
       WORD     wOrientation;
       // tagSamplesPerPixel
       DWORD    dwRowsPerStrip;
35     DWORD *  lpdwStripByteCounts;
       RATIONAL rXResolution;
       RATIONAL rYResolution;
       char *   lpszPageName;
       // tagXPosition
```

```
       // tagYPosition
       char  *  lpszPageNumber;
       char  *  lpszSoftware;
       char  *  lpszDateTime;
 5     char  *  lpszArtist;
       char  *  lpszINVZNISII;

BOOL     bGeneratePrivateArea;

// tagINVZNReserved1
       // tagINVZNReserved2
10     // tagINVZNReserved3

} TiffIFD, * ptrTiffIFD;
     */

////////////////////////////////////////////////////////////
     // Tag Types
15   //////////////////////////////////////////////////////////// enum TagType
     {
       ttByte = 1,
       ttASCII,
20     ttShort,
       ttLong,
       ttRational,
       ttSByte,     // See documentation page 16
       ttUndefined,
25     ttSShort,
       ttSRational,
       ttFloat,     // Single precision IEEE
       ttDouble     // Double precision IEEE
     };

30   #define RATIONAL_SIZE 8

////////////////////////////////////////////////////////////
     // Compression Method
     //////////////////////////////////////////////////////////// enum CompressionMethod
```

```
        {
          compNoCompression = 1,
          compCCITTG3      = 2,
          compCCITTG3_T4   = 3,
5         compCCITTG4_T6   = 4,
          compLZW          = 5,
          compJPEG         = 6,
          compPackBits     = (int)0x8005

};

10  ///////////////////////////////////////////////////////////
    // TiffRotation
    /////////////////////////////////////////////////////////// enum TiffRotation
        {
15        rot0        = 1,
          rot0Flip    = 2,
          rot180      = 3,
          rot180Flip  = 4,
          rot270Flip  = 5,
20        rot90       = 6,
          rot90Flip   = 7,
          rot270      = 8

};

///////////////////////////////////////////////////////////
25  // InVzn Private Tiff Like Tags
    /////////////////////////////////////////////////////////// enum VznPrivateTags
        {
          vptImageType         = 1,
30        vptSecurityMethod    = 2,
          vptISIIVerificationData = 3,
          vptThumbnail         = 4,
          vptUserDefinedText   = 5,
          vptSoftwareVersion   = 6,
35        vptLibraryVersion    = 7,
```

```
            vptRequiredLegend    = 8,
            vptImageFlags        = 9,
            vptLLA               = 10,
            vptTimeSource        = 11, 5           vptEndTag
        };

//////////////////////////////////////////////////////////////
        // InVzn Internal Image Type
        //////////////////////////////////////////////////////////////

10      enum VznImageType
        {
            typeG4VZN2      = 0,    // Old style images not based on TIFF
            typeG4VZN3      = 1,    // Group 4 VZN
            typeG4_Intel    = 2,    // Group 4 TIFF intel order
15          typeG4_Motorola = 3,    // Group 4 TIFF Motorola order
            typeCOLORVZN3   = 4,    // LZW?
            typeJPEGVZN3    = 5,    //
            typeMPEGVZN3    = 6,    // typeMaxType
20      };

//////////////////////////////////////////////////////////////
        // inVzn Security Method
        ////////////////////////////////////////////////////////////// enum VznSecurity
25      {
            secGenericTIFF      = 0,    // Image doesn't contain inVzn Extensions
            secISIIVerification = 1,    // Image is under ISII certification
            secISIIPublicKey    = 2,    // Image is encrypted, but with private inVzn Password
            secISIIPrivateKey   = 3,    // Image is encrypted with USER password
30          secISIIBinaryKey    = 4,    // Image is encrypted with a binary key
        };

//////////////////////////////////////////////////////////////
        // Time Source
        //////////////////////////////////////////////////////////////
```

```
enum VznTimeSource
{
  timeCPU            = 0,   // Time was generated from CPU time
  timeGPS            = 1,   // Time was accuired directly from GPS reciever (UTC)
  timeGPS_CPU_Sync   = 2,   // Time based on time sync with GPS reciever
};

#if defined(__WIN32__)
#define ENUM_AS_INT
#endif

////////////////////////////////////////////////////////////////
// Enum Mappings for CPP and C compilation
//
//
#if defined(__cplusplus) && !defined(ENUM_AS_INT)
#define TIFFTAG TiffTag
#else
#define TIFFTAG unsigned short
endif if defined(__cplusplus) && !defined(ENUM_AS_INT)
define TAGTYPE TagType
#else
#define TAGTYPE unsigned short
endif if defined(__cplusplus) && !defined(ENUM_AS_INT)
define COMPMETHOD CompressionMethod
#else
#define COMPMETHOD unsigned short
endif if defined(__cplusplus) && !defined(ENUM_AS_INT)
define PRIVATETAG VznPrivateTags
#else
#define PRIVATETAG unsigned short
#endif
```

```
    #if defined(__cplusplus) && !defined(ENUM_AS_INT)
    #define IMAGETYPE VznImageType
    #else
    #define IMAGETYPE unsigned short
5   #endif if defined(__cplusplus) && !defined(ENUM_AS_INT)
    #define SECURITYMETHOD VznSecurity
    #else
    #define SECURITYMETHOD unsigned short
10  #endif if defined(__cplusplus) && !defined(ENUM_AS_INT)
    #define INVZNSOFTWARE VznSoftware
    #else
    #define INVZNSOFTWARE unsigned short
15  #endif if defined(__cplusplus) && !defined(ENUM_AS_INT)
    #define TIMESOURCE VznTimeSource
    #else
    #define TIMESOURCE unsigned short
20  #endif typedef struct __Tag
    {
        TIFFTAG     Tag;
        TAGTYPE     Type;
25      DWORD       Count;

union
         {
           DWORD    Long;
           WORD     Short;
30       } VO;

} TAG, * ptrTAG;

////////////////////////////////////////////////
    // __Fixup : Used to handle dynamic mapping of TIFF
```

```
//         TAGS.
///////////////////////////////////////////
typedef struct __Fixup
{
  DWORD  dwSize;
  TAG   * tagFixup;
  void  * data;
} FIXUP, * ptrFIXUP;

//
// Max tags used for CALLOCs this is the maximum number of tags
// to allocate room for....
// define MAX_TAGS 200

///////////////////////////////////////////////////////////////
// VZNTIFFHEADER
//
//
/////////////////////////////////////////////////////////////// typedef struct __VZNTIFFHEADER
{
  char    cByteOrder[2];   // 'II'
  WORD    uFortyTwo;       // 42
  DWORD   dwFirstIFD;      // 16
  char    szSignature[8];  // "INVZN94\0"

} VZNTIFFHEADER, * ptrVZNTIFFHEADER;

//
// Signature for VZN3 Images/Invzn Private area
//
#define VZN3_SIGNATURE         "INVZN94"
#define VZN3_LIBRARY_VERSION   0x0001
define VZN3_SOFTWARE_VERSION  0x0001 endif
///////////////////////////////////////////////////////////
```

BANNER & ALLEGRETTI, LTD.
10 South Wacker Drive
Suite 3000
Chicago, Illinois 60606

We claim:

1. A method for a computer to store an image data stream on a medium, comprising, in combination:
   receiving an image identification code and time data from at least one trusted source;
   combining said time data and image identification code to generate a key;
   creating an associated directory and inserting said time data and image identification code into said associated directory;
   generating a verification code from said image data stream;
   creating a private area and inserting said verification code into said private area;
   encrypting said private area with said key; and
   storing said image data stream, associated directory, and private area on said medium.

2. A method as claimed in claim 1 wherein said key is comprised of said image identification code, time data, and a password.

3. A method as claimed in claim 2 wherein said password is substantially fixed.

4. A method as claimed in claim 2 wherein said password supplied by a user.

5. A method as claimed in claim 1 wherein said image data stream defines an image data size and said verification code includes a number corresponding to said image data size.

6. A method as claimed in claim 1 wherein said verification code includes a number corresponding to a hash of a segment of said image data stream.

7. A method as claimed in claim 1 wherein said verification code includes a number corresponding to a hash of said image data stream.

8. A method as claimed in claim 1 wherein said image data stream is recorded on said medium in a tagged image file format.

9. A method as claimed in claim 1 wherein a header is created for said image data stream, said header includes a pointer to an associated directory, and said associated directory includes a pointer to said private area.

10. A method as claimed in claim 8 wherein said image data stream is recorded according to a CCITT Group 4 Standard.

11. A method as claimed in claim 1 wherein said time data comprises a calendar and clock designation of when said image data stream is recorded on said medium.

12. A method as claimed in claim 1 wherein said trusted source comprises a remote computer interconnected to said computer with a digital transmission facility.

13. A method as claimed in claim 1 wherein said time data comprises a clock designation of when said image data stream is recorded on said medium.

14. A method as claimed in claim 13 further comprising:
   detecting a changed image data stream;
   receiving a new image identification code and new time data from said at least one trusted source for said changed image data stream;
   combining said new time data and new image identification code to generate a new key;
   inserting said new key into said associated directory;
   generating a new verification code from said changed image data stream;
   inserting said new verification code into said private area;
   encrypting said private area with said new key; and
   storing said changed image data stream, associated directory, and private area on said medium, whereby said key and new key provide an audit trail for changes to said image data stream.

15. A method as claimed in claim 14 further comprising
   detecting how said image data stream was changed to make said changed image data stream; and
   storing in said associated directory an indication of how said image data was changed.

16. A method for a computer to store an image data stream on a medium, and comprising, in combination:
   receiving time data and image identification code from at least one trusted source;
   receiving a password from a user;
   combining said time data, image identification code, and password to generate a key;
   creating an associated directory and adding said time data and image identification code to said associated directory;
   generating a verification code from said image data stream;
   creating a private area and inserting said verification code into said private area;
   encrypting said private area with said key;
   encrypting at least a portion of said image data stream with said key to develop a ciphertext;
   recording said ciphertext, associated directory, and private area on said medium.

17. A method as claimed in claim 16 wherein said ciphertext defines an image data size and said verification code includes a number corresponding to said image data size.

18. A method as claimed in claim 16 wherein said verification code includes a number corresponding to a hash of a segment of said ciphertext.

19. A method as claimed in claim 16 wherein said verification code includes a number corresponding to a hash of said ciphertext.

20. A method as claimed in claim 16 wherein said image data stream is recorded on said medium in a tagged image file format.

21. A method as claimed in claim 20 wherein a header is created for said image data stream, said header includes a pointer to said associated directory, and said associated directory includes a pointer to said private area.

22. A method as claimed in claim 16 wherein said image data stream is recorded according to a CCITT Group 4 Standard.

23. A method as claimed in claim 16 wherein said time data comprises a calendar and clock designation of when said ciphertext is filed on said electronic medium.

24. A method as claimed in claim 16 wherein said trusted source comprises a remote computer interconnected to said computer with a digital transmission facility.

25. A method as claimed in claim 16 wherein said trusted source comprises a global positioning system.

26. A method as claimed in claim 16 wherein said trusted source provides location data to said computer and said computer adds said location data to said private area.

27. A method as claimed in claim 26 wherein said location data includes a latitude and longitude designation for said computer.

28. A method as claimed in claim 27 wherein said location data includes a height designation relative to sea level.

29. A method as claimed in claim 16 wherein said trusted source provides a precise time designation to said computer, said precise time designation representing clock time in increments of less than a second, and wherein said computer inserts said precise time designation into said private area.

30. A method as claimed claim 16 further comprising detecting a source of said image data stream and encoding an indication if said source in said associated directory.

31. A method for retrieving an image data stream on a medium, said medium including a public area associated with said image data stream, said public area having an image identification code, time data relating when said image data stream was recorded on said medium, and a pointer to a private area, said private area including a verification code corresponding to recorded parameters of a prior image data stream, comprising, in combination:

reading said public header;

decrypting said private area with a key comprised of said image identification code and time data;

reading said verification code in said private area;

reading said image data stream and determining new parameters of said image data stream;

comparing said new parameters of said data image stream with said recorded parameters of said prior image data stream; and certifying said image data stream when said recorded parameters correspond to said old parameters.

32. A method as claimed in claim 31 wherein said key further includes a password supplied by a user.

33. A method as claimed in claim 31 wherein said image data stream defines an image data size and said verification code includes a number corresponding to said image data size.

34. A method as claimed in claim 31 wherein said verification code includes a number corresponding to a hash of a segment of said image data stream.

35. A method as claimed in claim 31 wherein said verification code includes a number corresponding to a hash of said image data stream.

36. A method as claimed in claim 31 wherein said image data stream is recorded on said medium in a tagged image file format.

37. A method as claimed in claim 36 wherein said image data stream is recorded according to a CCITT Group 4 Standard.

38. A method as claimed in claim 31 wherein new time data and a new image identification code are in said public area and a new verification code is in said private area, said new time data, identification, and verification codes corresponding to a changed data image stream, said method further comprising:

reading said new image identification code for said changed image data stream;

reading said new verification code for said changed image data stream; and generating a statement corresponding to said time data and said new time data, whereby an audit trail for said changed data image stream is generated.

39. A method as claimed in claim 38 wherein said public area further includes an indication of how said image data stream was modified to make said changed image data stream and said method further comprises reading said indication and generating a statement how said image data stream was modified.

40. A method as claimed in claim 31 wherein the step of certifying said image data stream comprises publishing a notice of certification.

41. A method as claimed in claim 40 further comprising printing a copy of said image data stream and wherein the step of certifying said image data stream comprises publishing a notice of certification on said copy of said image data stream.

\* \* \* \* \*